US007981486B2

(12) United States Patent
Sasada

(10) Patent No.: US 7,981,486 B2
(45) Date of Patent: Jul. 19, 2011

(54) COMPOUND HAVING ALKYL ON BENZENE RING, LIQUID CRYSTAL COMPOSITION HAVING THE COMPOUND, AND LIQUID CRYSTAL DISPLAY DEVICE HAVING THE LIQUID CRYSTAL COMPOSITION

(75) Inventor: Yasuyuki Sasada, Chiba (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/406,541

(22) Filed: Mar. 18, 2009

(65) Prior Publication Data

US 2009/0230356 A1 Sep. 17, 2009

Related U.S. Application Data

(62) Division of application No. 11/269,827, filed on Nov. 9, 2005, now Pat. No. 7,846,513.

(30) Foreign Application Priority Data

Nov. 9, 2004 (JP) ................................ 2004-324580

(51) Int. Cl.

| | |
|---|---|
| ***C09K 19/30*** | (2006.01) |
| ***C09K 19/34*** | (2006.01) |
| ***C09K 19/12*** | (2006.01) |
| ***C09K 19/20*** | (2006.01) |
| ***C07C 43/225*** | (2006.01) |
| ***C07C 25/13*** | (2006.01) |

(52) U.S. Cl. ............... 428/1.1; 252/299.61; 252/299.63; 252/299.66; 252/299.67; 568/655; 568/656; 568/661; 570/126; 570/127; 570/129; 570/130; 570/131

(58) Field of Classification Search ............. 252/299.63, 252/299.66, 299.61, 299.62, 299.67; 428/1.1; 568/655, 656, 661; 570/126, 127, 129, 130, 570/131

See application file for complete search history.

(56) References Cited

U.S. PATENT DOCUMENTS

| | | | | |
|---|---|---|---|---|
| 6,844,032 | B2 | 1/2005 | Miyazawa et al. | 428/1.1 |
| 7,348,043 | B2 | 3/2008 | Fujita et al. | 428/1.1 |
| 7,846,513 | B2 * | 12/2010 | Sasada | 428/1.1 |

FOREIGN PATENT DOCUMENTS

| | | |
|---|---|---|
| JP | 08003181 A * | 1/1996 |
| JP | 10-291945 | 11/1998 |

OTHER PUBLICATIONS

CAPLUS 1953:18902.*
CAPLUS 1986: 68552.*

* cited by examiner

*Primary Examiner* — Shean C Wu
(74) *Attorney, Agent, or Firm* — Hogan Lovells US LLP

(57) ABSTRACT

A compound represented by the following formula (1), a liquid crystal composition containing the compound and a liquid crystal display device containing the composition:

(1)

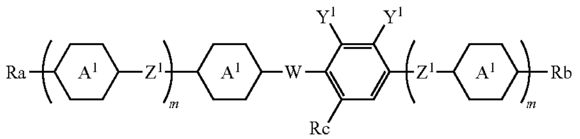

all the symbols in the formula (1) are defined in the specification.

30 Claims, No Drawings

COMPOUND HAVING ALKYL ON BENZENE RING, LIQUID CRYSTAL COMPOSITION HAVING THE COMPOUND, AND LIQUID CRYSTAL DISPLAY DEVICE HAVING THE LIQUID CRYSTAL COMPOSITION

CROSS REFERENCE TO RELATED APPLICATIONS

This application is a Continuation of co-pending U.S. patent application Ser. No. 11/269,827 (filed Nov. 9, 2005); which claims priority to Japanese Patent Application JP2004-324580 (filed Nov. 9, 2004), each of which application is expressly incorporated herein by reference in their entirety.

BACKGROUND OF THE INVENTION

1. Field of the Invention

The invention relates to a liquid crystal compound, a liquid crystal composition, and a liquid crystal display device. More specifically, it relates to a styrene compound, a liquid crystal composition containing the compound and having a nematic phase and a liquid crystal display device containing the composition.

2. Related Art

Based on an operation mode of liquid crystal, liquid crystal display devices are classified into phase change (PC), twisted nematic (TN), super twisted nematic (STN), bistable twisted nematic (BTN), electrically controlled birefringence (ECB), optically compensated bend (OCB), in-plane switching (IPS), vertical alignment (VA) and the like. Based on a driving mode of an element, liquid crystal display devices can also be classified into a passive matrix (PM) and an active matrix (AM). PM is further classified into static, multiplex and the like, and AM is classified into a thin film transistor (TFT), a metal insular metal (MIM) and the like.

Ordinary properties that are necessary for a compound as a component of the composition include: (1) chemical and physical stability, (2) a high clearing point (the clearing point is a transition temperature of a liquid crystal phase and an isotropic phase), (3) a low lower limit temperature of a liquid crystal phase (the liquid crystal phase means a nematic phase, a smectic phase and the like), (4) a small viscosity, (5) a suitable optical anisotropy, (6) a suitable dielectric anisotropy (a compound having a large dielectric anisotropy often has a large viscosity) and (7) a large specific resistance.

The composition is prepared by mixing various kinds of compounds that preferably have good miscibility with each other. Since a device is used at subfreezing temperature in some cases, compounds having good compatibility with each other at low temperatures are preferably used. A compound having a high clearing point or a low lower limit temperature of a liquid crystal phase contributes to a wide temperature range of a nematic phase of the composition. A preferred composition has a small viscosity and an optical anisotropy suitable for the mode of the device. A large dielectric anisotropy of the compound contributes to a low threshold voltage of the composition. By using the composition, a device having desirable characteristics can be obtained including, for example, a wide usable temperature range, a short response time, a large contrast ratio, a small driving voltage, a small electric power consumption and a large voltage holding ratio.

As a compound having a benzene ring having an alkyl group, the following compound (A) has been reported (for example, in JP H10-291945 A), but the compound has poor liquid crystallinity.

(A)

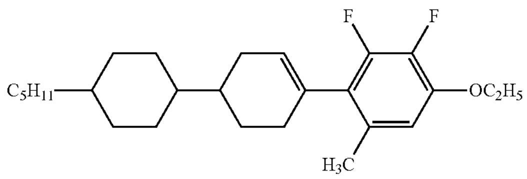

C 90.7 N 97.7 Iso (° C.)

SUMMARY OF THE INVENTION

The invention concerns a compound represented by the following formula (1):

(1)

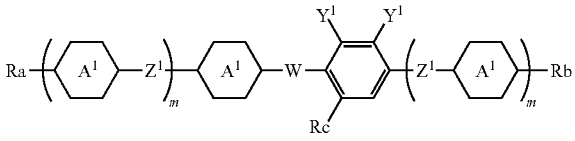

wherein Ra and Rb are independently hydrogen or alkyl having from 1 to 20 carbons, provided that in the alkyl arbitrary $—CH_2—$ may be replaced by —O—, —S—, —CO— or $—SiH_2—$, arbitrary $—(CH_2)_2—$ may be replaced by —CH═CH— or —C≡C—, and arbitrary hydrogen may be replaced by halogen; ring $A^1$ is independently 1,4-cyclohexylene, 1,4-phenylene, pyridine-2,5-diyl, pyridazine-3,6-diyl, decahydronaphthalene-2,6-diyl, 1,2,3,4-tetrahydronaphthalene-2,6-diyl or naphthalene-2,6-diyl, provided that in these rings arbitrary $—CH_2—$ may be replaced by —O—, —S—, —CO— or $—SiH_2—$, and arbitrary $—(CH_2)_2—$ may be replaced by —CH═CH—, and in these rings arbitrary hydrogen may be replaced by halogen, $—CF_3$, $—CHF_2$, $—CH_2F$, $—OCF_3$, $—OCHF_2$ or $—OCH_2F$; $Z^1$ is independently a single bond or alkylene having from 1 to 4 carbons, provided that in the alkylene arbitrary $—CH_2—$ may be replaced by —O—, —S—, —CO— or $—SiH_2—$, arbitrary $—(CH_2)_2—$ may be replaced by —CH═CH— or —C≡C—, and arbitrary hydrogen may be replaced by halogen; W is alkylene having from 2 to 4 carbons, provided that in the alkylene arbitrary $—CH_2—$ may be replaced by —O—, —S—, —CO— or $—SiH_2—$, arbitrary $—(CH_2)_2—$ may be replaced by —CH═CH— or —C≡C—, and arbitrary hydrogen may be replaced by halogen; $Y^1$ is independently hydrogen, halogen, —CN, $—CF_3$, $—CHF_2$, $—CH_2F$, $—OCF_3$, $—OCHF_2$ or $—OCH_2F$, provided that one of $Y^1$ is halogen, $—CF_3$, $—CHF_2$, $—CH_2F$, $—OCF_3$, $—OCHF_2$ or $—OCH_2F$; Rc is alkyl having from 1 to 4 carbons, provided that in the alkyl arbitrary $—CH_2—$ may be replaced by —O—, —S—, —CO— or $—SiH_2—$, arbitrary $—(CH_2)_2—$ may be replaced by —CH═CH— or —C≡C—; and m is independently 0, 1 or 2, provided that a sum of plural numbers of m is 0, 1 or 2.

The invention also concerns a liquid crystal composition comprising the compound, a liquid crystal display device comprising the liquid crystal composition, and so forth.

DETAILED DESCRIPTION OF THE INVENTION

The terms used in the specification are defined as follows. A liquid crystal compound is a general term for a compound having a liquid crystal phase, such as a nematic phase and a smectic phase, and a compound having no liquid crystal phase but being useful as a component of the liquid crystal composition. The liquid crystal compound, the liquid crystal composition and the liquid crystal display device may occasionally be abbreviated as a compound, a composition and a device, respectively. A liquid crystal display device is a general term for a liquid crystal display panel and a liquid crystal display module. The higher limit temperature of a nematic phase is a phase transition temperature going from the nematic phase to the isotropic phase and may be occasionally abbreviated as a higher limit temperature. The lower limit temperature of a nematic phase may be occasionally abbreviated as a lower limit temperature. At least one compound selected from a group of compounds represented by the formula (1) may be occasionally abbreviated as a compound (1). The compounds represented by any other formula, such as the formula (2), may also be occasionally abbreviated in the same manner. In the formulae (1) to (14), the symbols $A^1$, B, E and the like surrounded by hexagons correspond to the ring $A^1$, ring B, ring E and the like. The proportions (in terms of percentage) of the compounds are in terms of percentage by weight (% by weight) based on the total weight of the composition. The plural same symbols, such as $A^1$, $Y^1$ and B, are used in the same formula or different formulae, and these may be the same as or different from each other. The invention will be described in detail below.

The invention advantageously provides a liquid crystal compound that has ordinary properties necessary for a liquid crystal compound, stability to heat and light, a small viscosity, a suitable optical anisotropy, a suitable dielectric anisotropy, a wide temperature range of a nematic phase, an excellent compatibility with other liquid crystal compounds, and, in particular, provides a liquid crystal compound that has a wide temperature range of a nematic phase.

The invention also provides a liquid crystal composition that contains the liquid crystal compound and has a high higher limit temperature of a nematic phase, a low lower limit temperature of a nematic phase, a small viscosity, a suitable optical anisotropy, a low threshold voltage, and, in particular, provides a liquid crystal composition that has a high higher limit temperature of a nematic phase and a low lower limit temperature of a nematic phase.

The invention also provides a liquid crystal display device that contains the composition and has a wide usable temperature range, a short response time, a small electric power consumption, a large contrast, a low driving voltage, and, in particular, provides a liquid crystal display device that has a wide usable temperature range.

The aforementioned and other objects of the invention will be apparent from the following description.

1. A compound represented by the following formula (1):

(1)

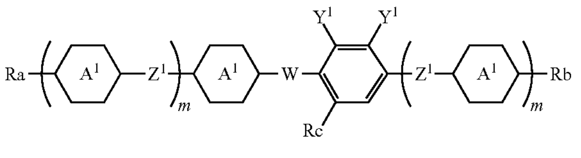

wherein Ra and Rb are independently hydrogen, alkyl having from 1 to 20 carbons, provided that in the alkyl arbitrary $—CH_2—$ may be replaced by —O—, —S—, —CO— or $—SiH_2—$, arbitrary $—(CH_2)_2—$ may be replaced by —CH═CH— or —C≡C—, and arbitrary hydrogen may be replaced by halogen.

An example of the meaning expressed by the phrase "in the alkyl arbitrary $—CH_2—$ may be replaced by —O— or the like, and arbitrary $—(CH_2)_2—$ may be replaced by —CH═CH— or the like" will be described. Examples of the group obtained from $CH_3(CH_2)_3—$ by substituting arbitrary $—CH_2—$ therein by —O— and substituting arbitrary $—(CH_2)_2—$ therein by —CH═CH— include $CH_3(CH_2)_2O—$, $CH_3—O—(CH_2)_2—$, $CH_3—O—CH_2—O—$, $H_2C═CH—(CH_2)_2—$, $CH_3—CH═CH—CH_2—$ and $CH_3—CH═CH—O—$. Accordingly, the term "arbitrary" means "at least one that is selected with no distinction." Taking the stability of the compound into consideration, for example, $CH_3—O—CH_2—O—$ where two oxygens are not adjacent to each other is preferred to $CH_3—O—O—CH_2—$ where two oxygens are adjacent to each other.

Examples of Ra and Rb include hydrogen, alkyl, alkoxy, alkoxyalkyl, alkoxyalkoxy, alkylthio, alkhlthioalkoxy, acyl, acylalkyl, acyloxy, acyloxyalkyl, alkoxycarbonyl, alkoxycarbonylalkyl, alkenyl, alkenyloxy, alkenyloxyalkyl, alkoxyalkenyl, alkynyl, alkynyloxy, silaalkyl and disilaalkyl. A group obtained by substituting at least one hydrogen by halogen is also preferred. Preferred examples of the halogen include fluorine and chlorine. More preferred examples of the halogen include fluorine. These groups are preferably linear rather than branched. A branched group for Ra and Rb is preferred when the group is optically active.

Preferred examples of Ra and Rb include alkyl, alkoxy, alkoxyalkyl, alkenyl, polyfluoroalkyl and polyfluoroalkoxy.

More preferred examples of Ra and Rb include alkyl, alkoxy, alkoxyalkyl, alkenyl, $—CH_2F$ and $—OCH_2F$.

Further preferred examples of Ra and Rb include alkyl, alkoxy, alkoxyalkyl and alkenyl.

A preferred steric configuration of —CH═CH— in alkenyl depends on the position of the double bond. A trans configuration is preferred for such alkenyl having a double bond at an odd number position, such as $—CH═CHCH_3$, $—CH═CHC_2H_5$, $—CH═CHC_3H_7$, $—CH═CHC_4H_9$, $—C_2H_4CH═CHCH_3$ and $—C_2H_4CH═CHC_2H_5$. A cis configuration is preferred for such alkenyl having a double bond at an even number position, such as $—CH_2CH═CHCH_3$, $—CH_2CH═CHC_2H_5$ and $—CH_2CH═CHC_3H_7$.

Specific examples of the alkyl include $—CH_3$, $—C_2H_5$, $—C_3H_7$, $—C_4H_9$, $—C_5H_{10}$, $—C_6H_{13}$, $—C_7H_{15}$ and $—C_8H_{17}$. Specific examples of the alkoxy include $—OCH_3$, $—OC_2H_5$, $—OC_3H_7$, $—OC_4H_9$, $—OC_5H_{10}$, $—OC_6H_{13}$ and $—OC_7H_{15}$. Specific examples of the alkoxyalkyl include $—CH_2OCH_3$, $—CH_2OC_2H_5$, $—CH_2OC_3H_7$, $—(CH_2)_2OCH_3$, $—(CH_2)_2OC_2H_5$, $—(CH_2)_2OC_3H_7$, $—(CH_2)_3OCH_3$, $—(CH_2)_4OCH_3$ and $—(CH_2)_5OCH_3$.

Specific examples of the alkenyl include $—CH═CH_2$, $—CH═CHCH_3$, $—CH_2CH═CH_2$, $—CH═CHC_2H_5$, $—CH_2CH═CHCH_3$, $—(CH_2)_2CH═CH_2$, $—CH═CHC_3H_7$, $—CH_2CH═CHC_2H_5$, $—(CH_2)_2CH═CHCH_3$ and $—(CH_2)_3CH═CH_2$. Specific examples of the alkenyloxy include $—OCH_2CH═CH_2$, $—OCH_2CH═CHCH_3$ and $—OCH_2CH═CHC_2H_5$. Specific examples of the alkynyl include $—C≡CCH_3$ and $—C≡CC_3H_7$.

Specific examples of the alkyl, at least one hydrogen of which is replaced by halogen, include $—CH_2F$, $—CHF_2$, $—CF_3$, $—(CH_2)_2F$, $—CF_2CH_2F$, $—CF_2CHF_2$, $—CH_2CF_3$, $—CF_2CF_3$, $—(CH_2)_3F$, $—(CF_2)_2CF_3$, $—CF_2CHFCF_3$ and $—CHFCF_2CF_3$. Specific examples of the alkoxy, at least one hydrogen of which is replaced by halogen, include $—OCF_3$, $—OCHF_2$, $—OCH_2F$, $—OCF_2CF_3$, $—OCF_2CHF_2$, $—OCF_2CH_2F$, $—OCF_2CF_2CF_3$, $—OCF_2CHFCF_3$ and $—OCHFCF_2CF_3$. Specific examples of the alkenyl, at least one hydrogen of which is replaced by halogen, include $—CH{=}CHF$, $—CH{=}CF_2$, $—CF{=}CHF$, $—CH{=}CHCH_2F$, $—CH{=}CHCF_3$ and $—(CH_2)_2CH{=}CF_2$.

Preferred specific examples of Ra and Rb include $—CH_3$, $—C_2H_5$, $—C_3H_7$, $—C_4H_9$, $—C_5H_{10}$, $—OCH_3$, $—OC_2H_5$, $—OC_3H_7$, $—OC_4H_9$, $—OC_5H_{10}$, $—CH_2OCH_3$, $—(CH_2)_2OCH_3$, $—(CH_2)_3OCH_3$, $—CH{=}CH_2$, $—CH{=}CHCH_3$, $—CH_2CH{=}CH_2$, $—CH{=}CHC_2H_5$, $—CH_2CH{=}CHCH_3$, $—(CH_2)_2CH{=}CH_2$, $—CH{=}CHC_3H_7$, $—CH_2CH{=}CHC_2H_5$, $—(CH_2)_2CH{=}CHCH_3$, $—(CH_2)_3CH{=}CH_2$, $—OCH_2CH{=}CH_2$, $—OCH_2CH—CHCH_3$, $—OCH_2CH{=}CHC_2H_5$, $—CF_3$, $—CHF_2$, $—CH_2F$, $—OCF_3$, $—OCHF_2$, $—OCH_2F$, $—OCF_2CF_3$, $—OCF_2CHF_2$, $—OCF_2CH_2F$, $—OCF_2CF_2CF_3$, $—OCF_2CHFCF_3$ and $—OCHFCF_2CF_3$.

More preferred specific examples of Ra and Rb include $—CH_3$, $—C_2H_5$, $—C_3H_7$, $—C_4H_9$, $—C_5H_{10}$, $—OCH_3$, $—OC_2H_5$, $—OC_3H_7$, $—OC_4H_9$, $—OC_5H_{10}$, $—CH_2OCH_3$, $—CH{=}CH_2$, $—CH{=}CHCH_3$, $—CH_2CH{=}CH_2$, $—CH{=}CHC_2H_5$, $—CH_2CH{=}CHCH_3$, $—(CH_2)_2CH{=}CH_2$, $—CH{=}CHC_3H_7$, $—CH_2CH{=}CHC_2H_5$, $—(CH_2)_2CH{=}CHCH_3$, $—(CH_2)_3CH{=}CH_2$, $—CH_2F$ and $—OCH_2F$.

Further preferred specific examples of Ra and Rb include $—CH_3$, $—C_2H_5$, $—C_3H_7$, $—C_4H_9$, $—C_5H_{10}$, $—OCH_3$, $—OC_2H_5$, $—OC_3H_7$, $—CH_2OCH_3$, $—CH{=}CH_2$, $—CH{=}CHCH_3$, $—(CH_2)_2CH{=}CH_2$ and $—(CH_2)_2CH{=}CHCH_3$.

Ring $A^1$ is independently 1,4-cyclohexylene, 1,4-phenylene, pyridine-2,5-diyl, pyridazine-3,6-diyl, decahydronaphthalene-2,6-diyl, 1,2,3,4-tetrahydronaphthalene-2,6-diyl or naphthalene-2,6-diyl, provided that in these rings arbitrary $—CH_2—$ may be replaced by —O—, —S—, —CO— or $—SiH_2—$, and arbitrary $—(CH_2)_2—$ may be replaced by —CH=CH—, and in these rings arbitrary hydrogen may be replaced by halogen, $—CF_3$, $—CHF_2$, $—CH_2F$, $—OCF_3$, $—OCHF_2$ or $—OCH_2F$.

Examples of the ring, in which the conditions described as "in these rings arbitrary $—CH_2—$ may be replaced by —O—, —S—, —CO— or $—SiH_2—$, and arbitrary $—(CH_2)_2—$ may be replaced by —CH=CH—" are applied, include the following rings (15-1) to (15-48). Preferred examples of the ring include the rings (15-1), (15-2), (15-3), (154), (15-15), (15-23), (15-31), (15-32), (15-33), (15-40), (15-43) and (15-48).

(15-1)

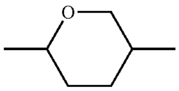

(15-2)

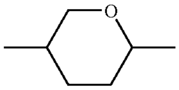

(15-3)

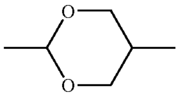

(15-4)

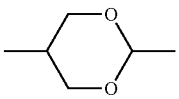

-continued (15-5)

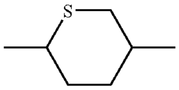

(15-6)

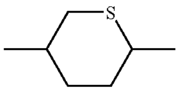

(15-7)

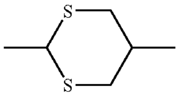

(15-8)

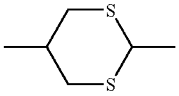

(15-9)

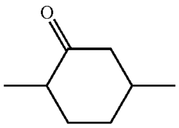

(15-10)

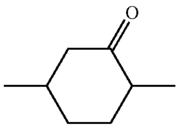

(15-11)

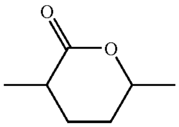

(15-12)

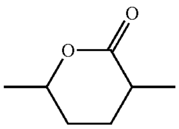

(15-13)

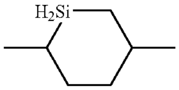

(15-14)

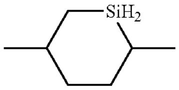

(15-15)

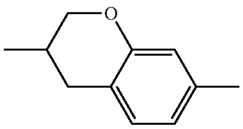

(15-16)

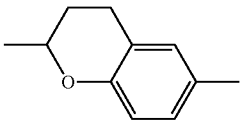

(15-17)

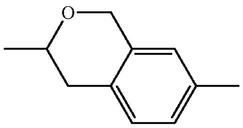

-continued
(15-18)
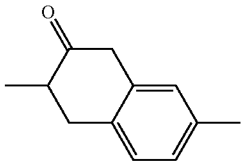
(15-19)
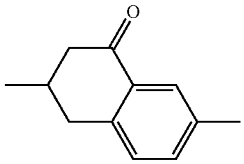
(15-20)
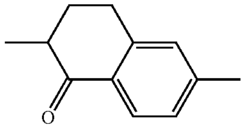
(15-21)
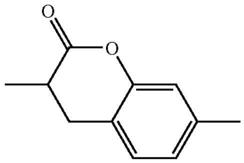
(15-22)
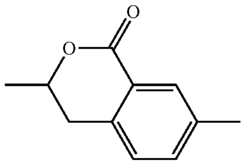
(15-23)
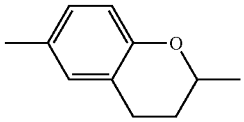
(15-24)
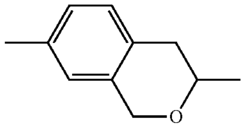
(15-25)
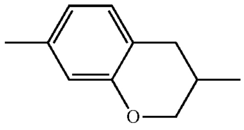
(15-26)
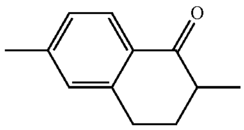
(15-27)
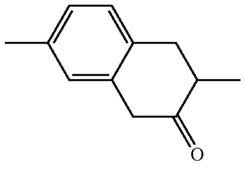
-continued
(15-28)
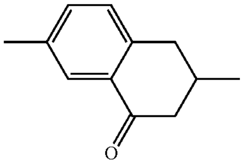
(15-29)
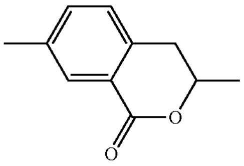
(15-30)
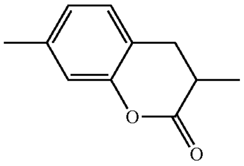
(15-31)
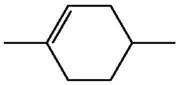
(15-32)
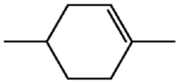
(15-33)
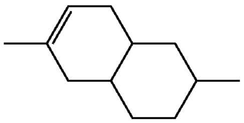
(15-34)
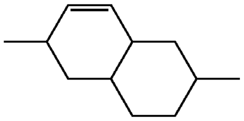
(15-35)
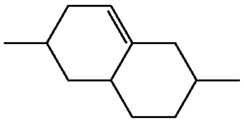
(15-36)
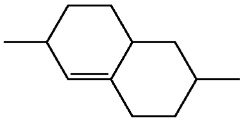
(15-37)
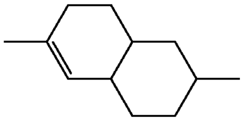
(15-38)
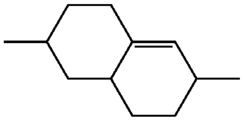

-continued
(15-39)
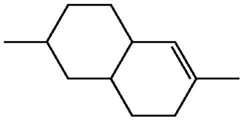
(15-40)
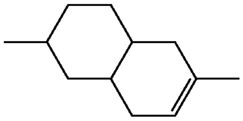
(15-41)
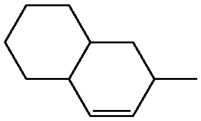
(15-42)
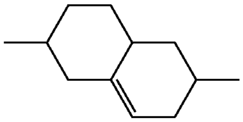
(15-43)
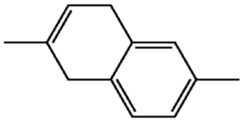
(15-44)
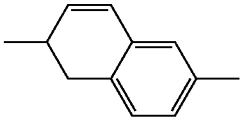
(15-45)
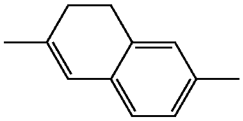
(15-46)
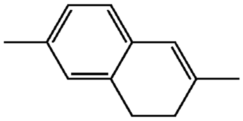
(15-47)
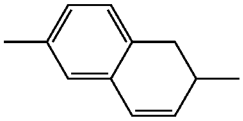
(15-48)
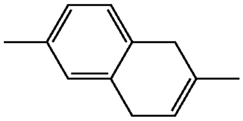
Examples of the ring, in which the condition described as "in these rings arbitrary hydrogen may be replaced by halogen, —$CF_3$, —$CHF_2$, —$CH_2F$, —$OCF_3$, —$OCHF_2$ or —$OCH_2F$" is applied, include the following rings (16-1) to (16-71). Preferred examples of the ring include (16-1), (16-2), (16-3), (16-4), (16-6), (16-10), (16-11), (16-12), (16-13), (16-14), (16-15), (16-54), (16-55), (16-56), (16-57), (16-58) and (16-59).
(16-1)
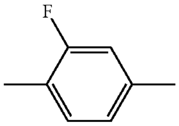
(16-2)
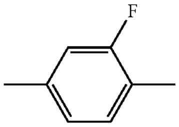
(16-3)
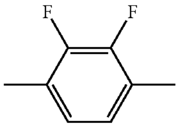
(16-4)
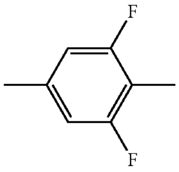
(16-5)
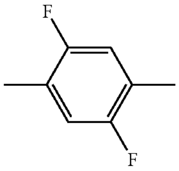
(16-6)
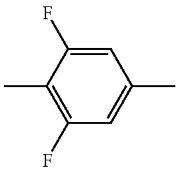
(16-7)
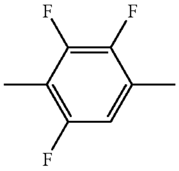
(16-8)
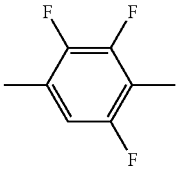
(16-9)
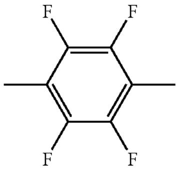
(16-10)
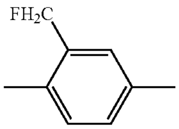

-continued
(16-11)
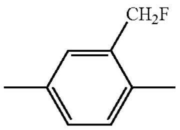
(16-12)
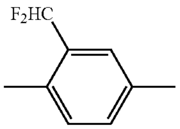
(16-13)
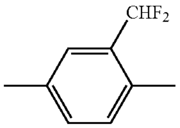
(16-14)
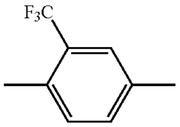
(16-15)
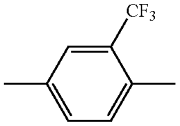
(16-16)
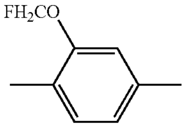
(16-17)
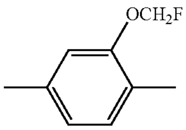
(16-18)
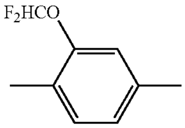
(16-19)
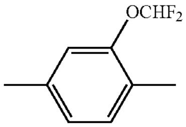
(16-20)
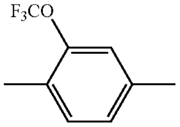
(16-21)
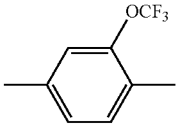
-continued
(16-22)
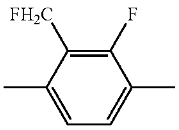
(16-23)
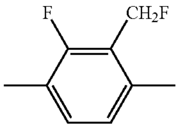
(16-24)
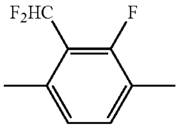
(16-25)
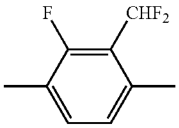
(16-26)
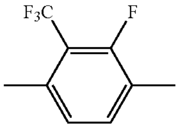
(16-27)
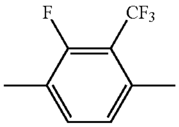
(16-28)
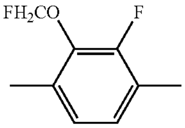
(16-29)
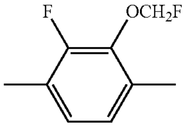
(16-30)
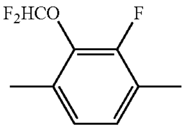
(16-31)
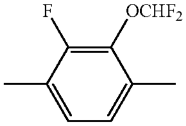
(16-32)
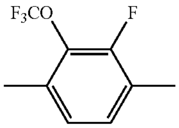

-continued
(16-33)
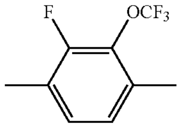
(16-34)
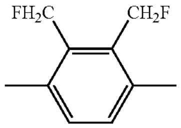
(16-35)
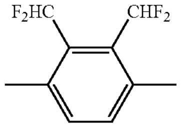
(16-36)
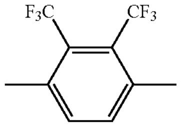
(16-37)
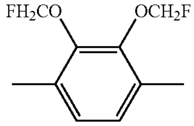
(16-38)
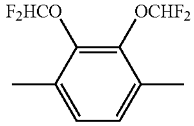
(16-39)
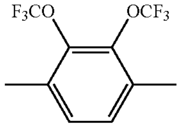
(16-40)
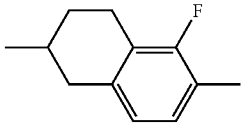
(16-41)
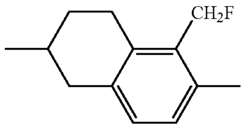
(16-42)
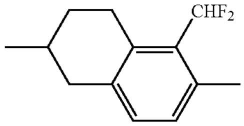
(16-43)
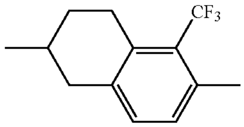
-continued
(16-44)
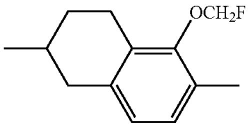
(16-45)
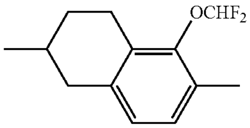
(16-46)
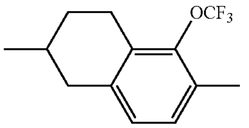
(16-47)
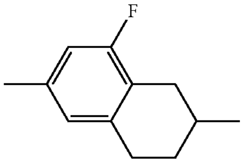
(16-48)
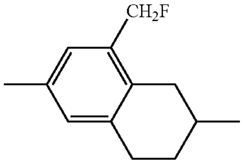
(16-49)
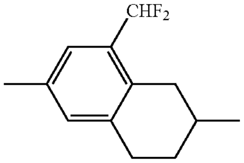
(16-50)
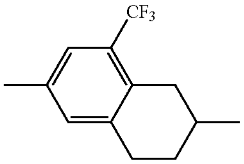
(16-51)
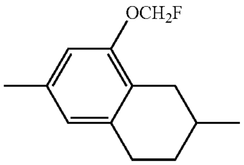
(16-52)
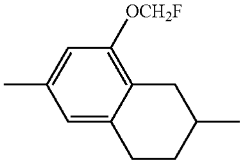
(16-53)
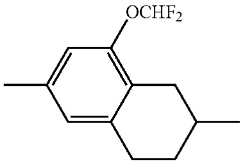

-continued (16-54)

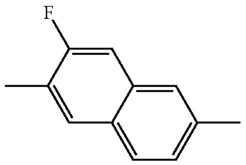

(16-55)

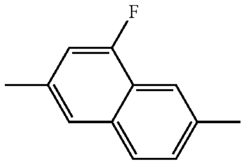

(16-56)

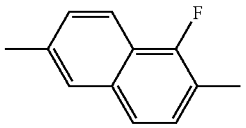

(16-57)

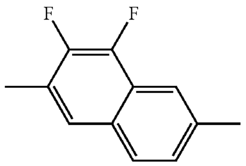

(16-58)

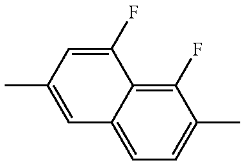

(16-59)

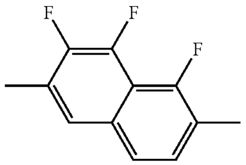

(16-60)

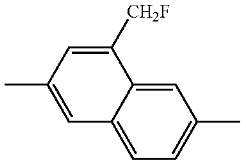

(16-61)

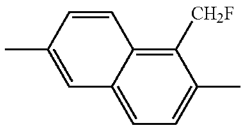

(16-62)

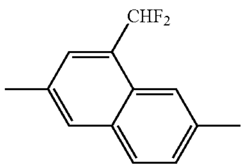

(16-63)

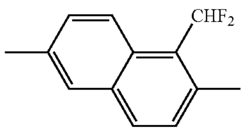

-continued (16-64)

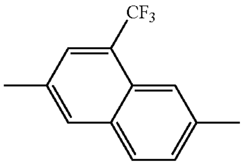

(16-65)

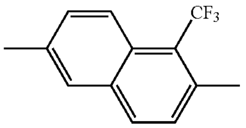

(16-66)

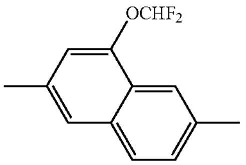

(16-67)

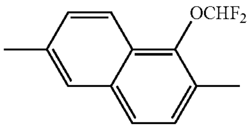

(16-68)

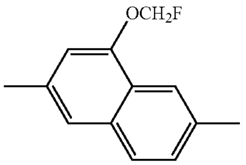

(16-69)

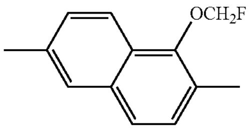

(16-70)

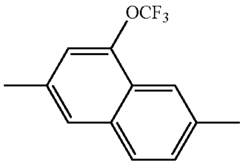

(16-71)

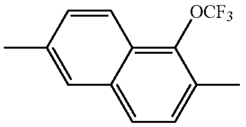

Examples of ring $A^1$ include 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyridine-2,5-diyl, 6-fluoropyridine-2,5-diyl, pyridazine-2,5-diyl, decahydronaphthalene-2,6-diyl, 1,2,3,4-tetrahydronaphthalene-2,6-diyl and naphthalene-2,6-diyl. The steric configuration of 1,4-cyclohexylene and 1,3-dioxane-2,5-diyl is preferably trans configuration rather than cis configuration. 1,3-dioxane-2,5-diyl is the same as 4,6-dioxane-2,5-diyl in terms of structure, and thus the later is not exemplified. This rule is also applied to 2-fluoro-1,4-phenylene, 2,6-difluoro-1,4-phenylene and so forth.

Preferred examples of ring $A^1$ include 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl and pyridazine-2,5-diyl.

More preferred examples of ring $A^1$ include 1,4-cyclohexylene, 1,4-phenylene, 2-fluoro-1,4-phenylene, 2,3-difluoro-1,4-phenylene, 2,5-difluoro-1,4-phenylene and 2,6-difluoro-1,4-phenylene.

Further preferred examples of ring $A^1$ include 1,4-cyclohexylene, 1,4-phenylene, 2-fluoro-1,4-phenylene and 2,3-difluoro-1,4-phenylene.

$Z^1$ is independently a single bond or alkylene having from 1 to 4 carbons, provided that in the alkylene arbitrary $—CH_2—$ may be replaced by —O—, —S—, —CO— or $—SiH_2—$, arbitrary $—(CH_2)_2—$ may be replaced by —CH═CH— or —C≡C—, and arbitrary hydrogen may be replaced by halogen.

Examples of $Z^1$ include a single bond, $—(CH_2)_2—$, —COO—, —OCO—, $—CH_2O—$, $—OCH_2—$, $—CF_2O—$, $—OCF_2—$, —CH═CH—, —CH═CF—, —CF═CH—, —CF═CF—, —C≡C—, $—CH_2CO—$, $—COCH_2—$, $—CH_2SiH_2—$, $—SiH_2CH_2—$, $—(CH_2)_4—$, $—(CH_2)_2COO—$, $—OCO(CH_2)_2—$, $—(CH_2)_2CF_2O—$, $—(CH_2)_2OCF_2—$, $—CF_2—O—(CH_2)_2—$, $—OCF_2(CH_2)_2—$, $—CH═CH—CH_2O—$ and $—OCH_2—CH═CH_2$. The steric configuration of the bonding groups having a double bond, such as —CH═CH—, —CF═CF—, —CH═CH—$CH_2O$— and $—OCH_2—CH═CH_2—$, is preferably trans configuration rather than cis configuration.

Preferred examples of $Z^1$ include a single bond, $—(CH_2)_2—$, —COO—, —OCO—, $—CH_2O—$, $—OCH_2—$, $—CF_2O—$, $—OCF_2—$, —CH═CH—, —CF═CF—, —C≡C—, $—CH_2CO—$, $—COCH_2—$, $—CH_2SiH_2—$, $—SiH_2CH_2—$ and $—(CH_2)_4—$.

More preferred examples of $Z^1$ include a single bond, $—(CH_2)_2—$, —COO—, —OCO—, $—CH_2O—$, $—OCH_2—$, $—CF_2O—$, $—OCF_2—$, —CH═CH— and —C≡C—.

Further preferred examples of $Z^1$ include a single bond and $—(CH_2)_2—$.

W is alkylene having from 2 to 4 carbons, provided that in the alkylene arbitrary $—CH_2—$ may be replaced by —O—, —S—, —CO— or $—SiH_2—$, arbitrary $—(CH_2)_2—$ may be replaced by —CH═CH— or —C≡C—, and arbitrary hydrogen may be replaced by halogen.

Examples of W include $—(CH_2)_2—$, —COO—, —OCO—, $—CH_2O—$, $—OCH_2—$, $—CF_2O—$, $—OCF_2—$, —CH═CH—, —CH═CF—, —CF═CH—, —CF═CF—, —C≡C—, $—CH_2CO—$, $—COCH_2—$, $—CH_2SiH_2—$, $—SiH_2CH_2—$, $—(CH_2)_4—$, $—(CH_2)_2COO—$, $—OCO(CH_2)_2—$, $—(CH_2)_2CF_2O—$, $—(CH_2)_2OCF_2—$, $—CF_2—O—(CH_2)_2—$, $—OCF_2(CH_2)_2—$, $—CH═CH—CH_2O—$ and $—OCH_2—CH═CH—$. The steric configuration of the bonding groups having a double bond, such as —CH═CH—, —CF═CF—, $—CH═CH—CH_2O—$ and $—OCH_2—CH═CH—$, is preferably trans configuration rather than cis configuration.

Preferred examples of W include $—(CH_2)_2—$, —COO—, —OCO—, $—CH_2O—$, $—OCH_2—$, $—CF_2O—$, $—OCF_2—$, —CH═CH—, —CF═CF—, —C≡C—, $—CH_2CO—$, $—COCH_2—$, $—(CH_2)_2CF_2O—$, $—OCF_2(CH_2)_2—$ and $—(CH_2)_4—$.

More preferred examples of W include $—(CH_2)_2—$, $—CH_2O—$, $—OCH_2—$, $—CF_2O—$, $—OCF_2—$, $—(CH_2)_2CF_2O—$, $—OCF_2(CH_2)_2—$ and —CH═CH—.

Further preferred examples of W include $—(CH_2)_2—$ and $—CH_2O—$.

$Y^1$ is independently hydrogen, halogen, —CN, $—CF_3$, $—CHF_2$, $—CH_2F$, $—OCF_3$, $—OCHF_2$ or $—OCH_2F$, provided that one of $Y^1$ is halogen, $—CF_3$, $—CHF_2$, $—CH_2F$, $—OCF_3$, $—OCHF_2$ or $—OCH_2F$. Preferred examples of the halogen include fluorine and chlorine. More preferred examples of the halogen include fluorine. Preferred examples of $Y^1$ include hydrogen, fluorine, chlorine, $—CF_3$, $—CHF_2$, $—CH_2F$, $—OCF_3$, $—OCHF_2$ and $—OCH_2F$. More preferred examples of $Y^1$ include hydrogen, fluorine, chlorine, $—CF_3$, $—CHF_2$, $—OCF_3$ and $—OCHF_2$. Further preferred examples of $Y^1$ include hydrogen, fluorine, and $—CF_3$.

Preferred examples of the partial structure of the formula (1) represented by the following formula (17) include structures represented by the following formulae (17-1) to (17-41). More preferred examples thereof include structures represented by the formulae (17-1) to (17-8), (17-18) to (17-26) and (17-32) to (17-41). Further preferred examples thereof include the structures represented by the formulae (17-1) to (17-3).

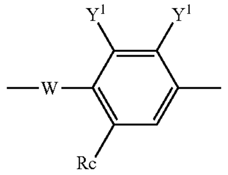

(17)

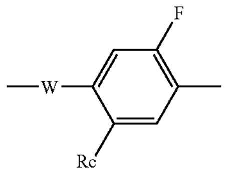

(17-1)

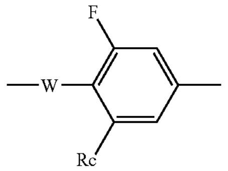

(17-2)

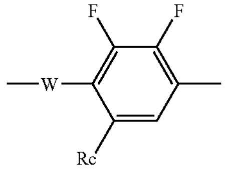

(17-3)

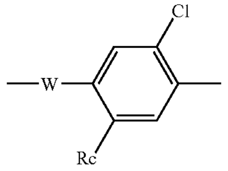

(17-4)

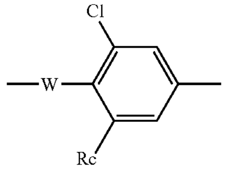

(17-5)

-continued
(17-6)
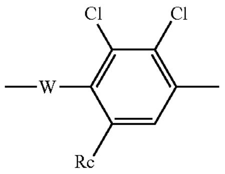
(17-7)
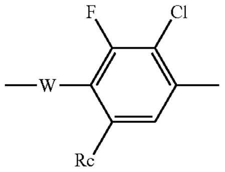
(17-8)
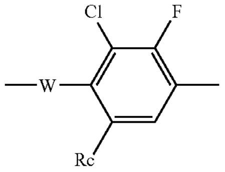
(17-9)
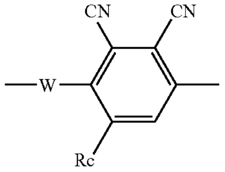
(17-10)
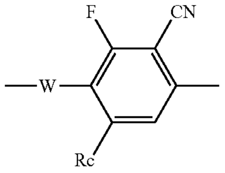
(17-11)
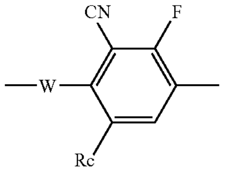
(17-12)
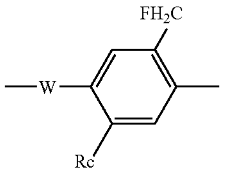
(17-13)
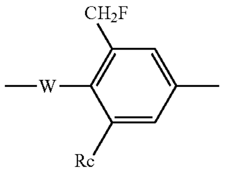
(17-14)
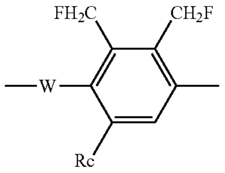
-continued
(17-15)
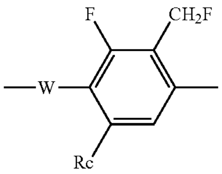
(17-16)
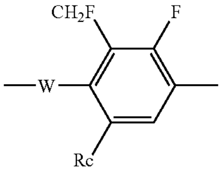
(17-17)
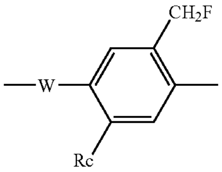
(17-18)
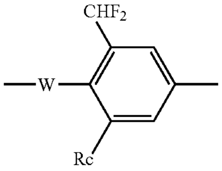
(17-19)
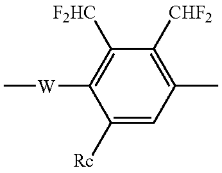
(17-20)
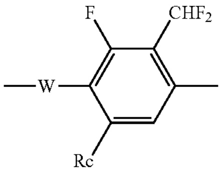
(17-21)
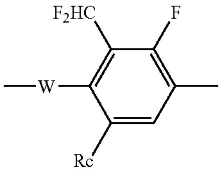
(17-22)
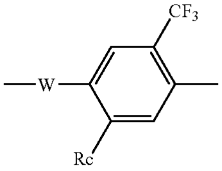
(17-23)
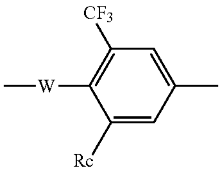

-continued
(17-24)
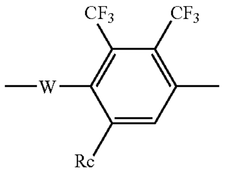
(17-25)
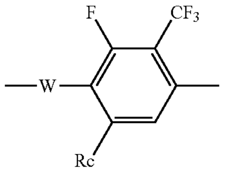
(17-26)
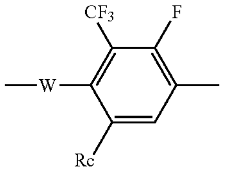
(17-27)
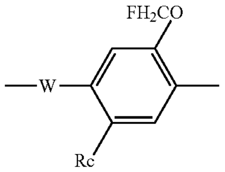
(17-28)
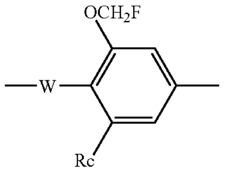
(17-29)
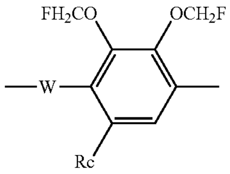
(17-30)
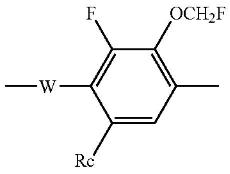
(17-31)
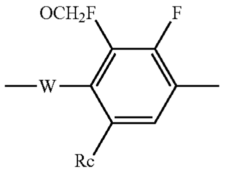
(17-32)
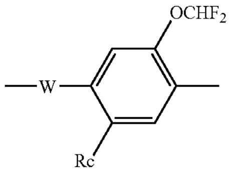
-continued
(17-33)
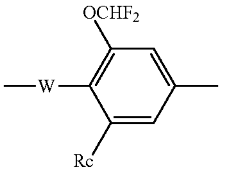
(17-34)
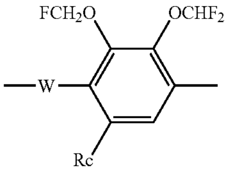
(17-35)
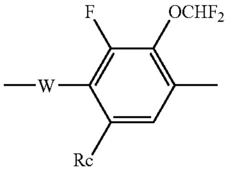
(17-36)
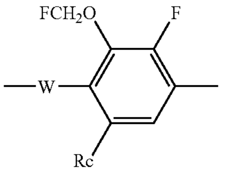
(17-37)
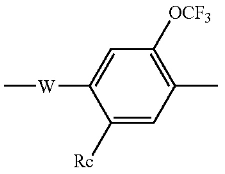
(17-38)
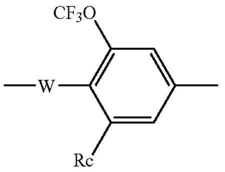
(17-39)
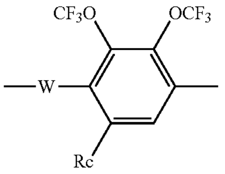
(17-40)
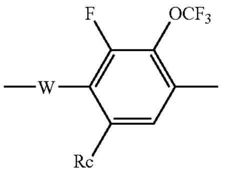
(17-41)
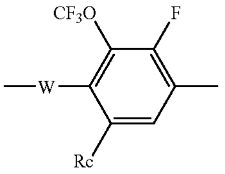

Rc is alkyl having from 1 to 4 carbons, provided that in the alkyl arbitrary —$CH_2$— may be replaced by —O—, —S—, —CO— or —$SiH_2$—, and arbitrary —$(CH_2)_2$— may be replaced by —CH═CH— or —C≡C—.

Examples of Rc include hydrogen, alkyl, alkoxy, alkoxyalkyl, alkoxyalkoxy, alkylthio, alkylthioalkoxy, acyl, acylalkyl, acyloxy, acyloxyalkyl, alkoxycarbonyl, alkoxycarbonylalkyl, alkenyl, alkenyloxy, alkenyloxyalkyl, alkoxyalkenyl, alkynyl, alkynyloxy, silaalkyl and disilaalkyl. These groups are preferably linear rather than branched.

Preferred examples of Rc include alkyl, alkoxy, alkoxyalkyl and alkenyl. More preferred examples of Rc include alkyl, alkoxy and alkenyl. Further preferred examples of Rc include alkyl.

Specific examples of the alkyl include —$CH_3$, —$C_2H_5$, —$C_3H_7$ and —$C_4H_9$. Specific examples of the alkoxy include —$OCH_3$, —$OC_2H_5$ and —$OC_3H_7$. Specific examples of the alkoxyalkyl include —$CH_2OCH_3$, —$CH_2OC_2H_5$ and —$(CH_2)_2OCH_3$.

Specific examples of the alkenyl include —CH═$CH_2$, —CH═$CHCH_3$, —$CH_2$CH═$CH_2$, —CH═$CHC_2H_5$, —$CH_2$CH═$CHCH_3$, —$(CH_2)_2$CH═$CH_2$ and —CH═CHCH═$CH_2$. Specific examples of the alkenyloxy include —OCH═$CH_2$ and —$OCH_2$CH═$CH_2$. Specific examples of the alkynyl include —C≡CH.

Preferred examples of Rc include —$CH_3$, —$C_2H_5$, —$C_3H_7$, —$C_4H_9$, —$OCH_3$, —$OC_2H_5$, —$OC_3H_7$, —$CH_2OCH_3$, —$CH_2OC_2H_5$, —$(CH_2)_2OCH_3$, —CH═$CH_2$, —CH═$CHCH_3$, —$CH_2$CH═$CH_2$, —CH═$CHC_2H_5$, —$CH_2$CH═$CHCH_3$, —$(CH_2)_2$CH═$CH_2$, —OCH═$CH_2$ and —$OCH_2$CH═$CH_2$.

More preferred examples of Rc include —$CH_3$, —$C_2H_5$, —$OCH_3$ and —CH═$CH_2$. Further preferred examples of Rc include —$CH_3$.

m is independently 0, 1 or 2, provided that a sum of plural numbers of m is 0, 1 or 2.

The compound (1) may contain isotopes, such as $^2H$ (deuterium) and $^{13}C$ in an amount larger than the natural abundance, since they do not largely change the properties of the compound.

2. The compound according to item 1, wherein in the formula (1), Ra and Rb are independently alkyl having from 1 to 20 carbons, alkoxy having from 1 to 19 carbons, alkoxyalkyl having from 2 to 19 carbons, alkenyl having from 2 to 20 carbons, polyfluoroalkyl having from 1 to 20 carbons or polyfluoroalkoxy having from 1 to 19 carbons; ring $A^1$ is independently 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-3,6-diyl; $Z^1$ is independently a single bond, —$(CH_2)_2$—, —COO—, —OCO—, —$CH_2$O—, —$OCH_2$—, —$CF_2$O—, —$OCF_2$—, —CH═CH—, —CF═CF—, —C≡C—, —$CH_2$CO—, —$COCH_2$—, —$CH_2SiH_2$—, —$SiH_2CH_2$—, —$(CH_2)_2$COO—, —OCO$(CH_2)_2$—, —$(CH_2)_2CF_2$O—, —$OCF_2(CH_2)_2$—, —$(CH_2)_3$ O—, —O$(CH_2)_3$— or —$(CH_2)_4$—; W is —COO—, —OCO—, —$CH_2$O—, —$OCH_2$—, —CH═CH—, —CF═CF—, —C≡C—, —$CF_2$O—, —$OCF_2$—, —$(CH_2)_2$COO—, —OCO$(CH_2)_2$—, —$(CH_2)_3$O—, —O$(CH_2)_3$—, —$(CH_2)_2CF_2$O—, —$OCF_2$$(CH_2)_2$— or —$(CH_2)_4$—; $Y^1$ is independently hydrogen, fluorine, chlorine, —$CF_3$, —$CHF_2$, —$CH_2F$, —$OCF_3$, —$OCHF_2$ or —$OCH_2F$, provided that one of $Y^1$ is fluorine, chlorine, —$CF_3$, —$CHF_2$, —$CH_2F$, —$OCF_3$, —$OCHF_2$ or —$OCH_2F$; and Rc is alkyl having from 2 to 4 carbons, alkoxy having from 2 to 3 carbons, alkoxyalkyl having from 2 to 3 carbons or alkenyl having from 2 to 4 carbons.

3. The compound according to item 1, wherein in the formula (1), Ra and Rb are independently alkyl having from 1 to 20 carbons, alkoxy having from 1 to 19 carbons, alkoxyalkyl having from 2 to 19 carbons, alkenyl having from 2 to 20 carbons, polyfluoroalkyl having from 1 to 20 carbons or polyfluoroalkoxy having from 1 to 19 carbons; ring $A^1$ is independently 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-3,6-diyl; $Z^1$ is independently a single bond, —$(CH_2)_2$—, —COO—, —OCO—, —$CH_2$O—, —$OCH_2$—, —$CF_2$O—, —$OCF_2$—, —CH═CH—, —CF═CF—, —C≡C—, —$CH_2$CO—, —$COCH_2$—, —$CH_2SiH_2$—, —$SiH_2CH_2$—, —$(CH_2)_2$COO—, —OCO$(CH_2)_2$—, —$(CH_2)_2CF_2$O—, —$OCF_2(CH_2)_2$—, —$(CH_2)_3$O—, —O$(CH_2)_3$— or —$(CH_2)_4$—; W is —$(CH_2)_2$—; $Y^1$ is independently hydrogen, fluorine, chlorine, —$CF_3$, —$CHF_2$, —$CH_2F$, —$OCF_3$, —$OCHF_2$ or —$OCH_2F$, provided that one of $Y^1$ is chlorine, —$CF_3$, —$CHF_2$, —$CH_2F$, —$OCF_3$, —$OCHF_2$ or —$OCH_2F$; and Rc is alkyl having from 2 to 4 carbons, alkoxy having from 2 to 3 carbons, alkoxyalkyl having from 2 to 3 carbons or alkenyl having from 2 to 4 carbons.

4. The compound according to item 1, wherein in the formula (1), Ra and Rb are independently is alkyl having from 1 to 8 carbons, alkoxy having from 1 to 7 carbons, alkoxyalkyl having from 2 to 7 carbons or alkenyl having from 2 to 8 carbons; ring $A^1$ is independently 1,4-cyclohexylene, 1,4-phenylene, 2-fluoro-1,4-phenylene or 2,3-difluoro-1,4-phenylene; $Z^1$ is independently a single bond or —$(CH_2)_2$—; W is —$(CH_2)_4$—, —$CH_2$O—, —$OCH_2$—, —CH═CH— or —C≡C—; $Y^1$ is independently hydrogen, fluorine, —$CH_2F$ or —$CF_3$, provided that one of $Y^1$ is fluorine, —$CH_2F$ or —$CF_3$; and Rc is —$CH_3$.

5. The compound according to item 1, wherein in the formula (1), Ra and Rb are independently alkyl having from 1 to 8 carbons, alkoxy having from 1 to 7 carbons, alkoxyalkyl having from 2 to 7 carbons or alkenyl having from 2 to 8 carbons; ring $A^1$ is independently 1,4-cyclohexylene, 1,4-phenylene, 2-fluoro-1,4-phenylene or 2,3-difluoro-1,4-phenylene; $Z^1$ is independently a single bond or —$(CH_2)_2$—; W is —$(CH_2)_2$—; $Y^1$ is independently hydrogen, fluorine, —$CH_2H$ or —$CF_3$, provided that one of $Y^1$ is —$CF_2H$ or —$CF_3$; and Rc is —$CH_3$.

6. A compound represented by any one of the following formulae (1-1) to (1-6):

(1-1)

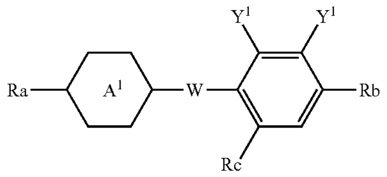

-continued (1-2)

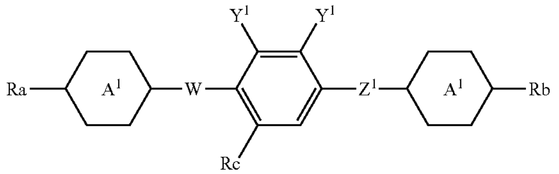

(1-3)

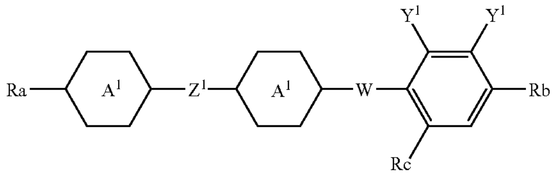

(1-4)

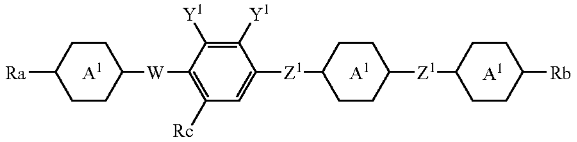

(1-5)

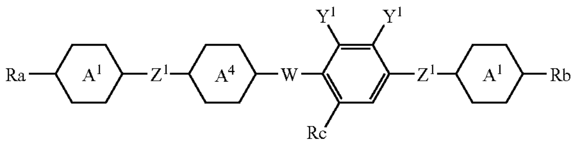

(1-6)

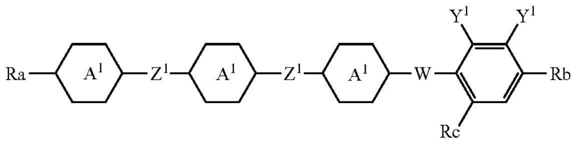

wherein Ra and Rb are independently hydrogen or alkyl having from 1 to 10 carbons, provided that in the alkyl arbitrary —$CH_2$— may be replaced by —O—, arbitrary —$(CH_2)_2$— may be replaced by —CH═CH— or —C≡C—, and arbitrary hydrogen may be replaced by halogen; ring $A^1$ is independently 1,4-cyclohexylene, 1,4-phenylene, decahydronaphthalene-2,6-diyl, 1,2,3,4-tetrahydronaphthalene-2,6-diyl or naphthalene-2,6-diyl, provided that in these rings arbitrary —$CH_2$— may be replaced by —O—, and arbitrary —$(CH_2)_2$— may be replaced by —CH═CH—, and in these rings arbitrary hydrogen may be replaced by halogen, —$CF_3$, —$CHF_2$ or —$CH_2F$; $Z^1$ is independently a single bond or alkylene having from 1 to 4 carbons, provided that in the alkylene arbitrary —$CH_2$— may be replaced by —O— or —CO—, arbitrary —$(CH_2)_2$— may be replaced by —CH═CH— or —C≡C—, and arbitrary hydrogen may be replaced by halogen; W is —$(CH_2)_2$—, —COO—, —OCO—, —$CH_2O$—, —$OCH_2$—, —CH═CH—, —CF═CF—, —C≡C—, —$CF_2O$—, —$OCF_2$—, —$(CH_2)_2$ COO—, —$OCO(CH_2)_2$—, —$(CH_2)_3O$—, —$O(CH_2)_3$—, —$(CH_2)_2CF_2O$—, —$OCF_2(CH_2)_2$— or —$(CH_2)_4$—; $Y^1$ is independently hydrogen, halogen, —$CF_3$, —$CHF_2$ or —$CH_2F$; and Rc is alkyl having from 1 to 4 carbons, provided that in the alkyl arbitrary —$CH_2$— may be replaced by —O—, and arbitrary —$(CH_2)_2$— may be replaced by —CH═CH— or —C≡C—.

7. The compound according to item 6, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons, polyfluoroalkyl having from 1 to 10 carbons or polyfluoroalkoxy having from 2 to 10 carbons; ring $A^1$ is independently 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene or 2,6-difluoro-1,4-phenylene; $Z^1$ is independently a single bond, —$(CH_2)_2$—, —COO—, —OCO—, —$CH_2O$—, —$OCH_2$—, —$CF_2O$—, —$OCF_2$—, —CH═CH—, —CF═CF—, —C≡C—, —$(CH_2)_2COO$—, —$OCO(CH_2)_2$—, —$(CH_2)_2CF_2O$—, —$OCF_2(CH_2)_2$—, —$(CH_2)_3$ O—, —$O(CH_2)_3$— or —$(CH_2)_4$—; W is —COO—, —OCO—, —$CH_2O$—, —$OCH_2$—, —CH═CH—, —CF═CF—, —C≡C—, —$CF_2O$—, —$OCF_2$—, —$(CH_2)_2COO$—, —$OCO(CH_2)_2$—, —$(CH_2)_3$ O—, —$O(CH_2)_3$—, —$(CH_2)_2CF_2O$—, —$OCF_2(CH_2)_2$— or —$(CH_2)_4$—; $Y^1$ is independently hydrogen, fluorine, chlorine, —$CF_3$, —$CHF_2$ or —$CH_2F$, provided that one of $Y^1$ is chlorine, —$CF_3$, —$CHF_2$ or —$CH_2F$; and Rc is alkyl having from 1 to 4 carbons, alkoxy having from 2 to 4 carbons, alkoxyalkyl having from 2 to 4 carbons or alkenyl having from 2 to 4 carbons.

8. The compound according to item 6, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons, polyfluoroalkyl having from 1 to 10 carbons or polyfluoroalkoxy having from 2 to 10 carbons; ring $A^1$ is independently 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene or 2,6-difluoro-1,4-phenylene; $Z^1$ is independently a single bond, —$(CH_2)_2$—, —COO—, —OCO—, —$CH_2O$—, —$OCH_2$—, —$CF_2O$—, —$OCF_2$—, —CH═CH—, —CF═CF—, —C≡C—, —$(CH_2)_2COO$—, —$OCO(CH_2)_2$—, —$(CH_2)_2CF_2O$—, —$OCF_2(CH_2)_2$—, —$(CH_2)_3$ O—, —$O(CH_2)_3$— or —$(CH_2)_4$—; W is —$(CH_2)_2$—; $Y^1$ is independently hydrogen, fluorine, chlorine, —$CF_3$, —$CHF_2$ or —$CH_2F$, provided that one of $Y^1$ is chlorine, —$CF_3$, —$CHF_2$ or —$CH_2F$; and Rc is alkyl having from 1 to 4 carbons, alkoxy having from 2 to 4 carbons, alkoxyalkyl having from 2 to 4 carbons or alkenyl having from 2 to 4 carbons.

9. The compound according to item 7, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons, —$CH_2F$ or —$OCH_2F$; ring $A^1$ is independently 1,4-cyclohexylene, 1,4-phenylene, 2-fluoro-1,4-phenylene, 2,3-difluoro-1,4-phenylene, 2,5-difluoro-1,4-phenylene or 2,6-difluoro-1,4-phenylene; $Z^1$ is independently a single bond, —$(CH_2)_2$—, —COO—, —OCO—, —$CH_2O$—, —$OCH_2$—, —$CF_2O$—, —$OCF_2$—, —CH═CH— or —C≡C—; W is —COO—, —OCO—, —$CH_2O$—, —$OCH_2$—, —CH═CH—, —CF═CF—, —C≡C—, —$(CH_2)_2COO$—, —$OCO(CH_2)_2$—, —$(CH_2)_3O$—, —$O(CH_2)_3$— or —$(CH_2)_4$—; $Y^1$ is independently fluorine, chlorine, —$CF_3$ or —$CHF_2$, provided that one of $Y^1$ is chlorine, —$CF_3$ or —$CHF_2$; and Rc is alkyl having from 1 to 4 carbons.

10. The compound according to item 7, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons; ring $A^1$ is independently 1,4-cyclohexylene, 1,4-phenylene, 2-fluoro-1,4-phenylene or 2,3-difluoro-1,4-phenylene; $Z^1$ is independently a single bond or $-(CH_2)_2-$; W is $-(CH_2)_4-$, $-CH_2O-$, $-OCH_2-$, $-CH{=}CH-$ or $-C{\equiv}C-$; $Y^1$ is independently fluorine, hydrogen, $-CF_2H$ or $-CF_3$, provided that one of $Y^1$ is fluorine, $-CF_2H$ or $-CF_3$; and Rc is $-CH_3$.

11. The compound according to item 7, wherein in the formulae (1-1) to (1-6), W is $-CH_2O-$; and $Y^1$ is independently fluorine, $-CF_3$ or $-CF_2H$.

12. The compound according to item 7, wherein in the formulae (1-1) to (1-6), W is $-CH_2O-$; and each $Y^1$ is fluorine.

13. The compound according to item 8, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons, $-CH_2F$ or $-OCH_2F$; ring $A^1$ is independently 1,4-cyclohexylene, 1,4-phenylene, 2-fluoro-1,4-phenylene, 2,3-difluoro-1,4-phenylene, 2,5-difluoro-1,4-phenylene or 2,6-difluoro-1,4-phenylene; $Z^1$ is independently a single bond, $-(CH_2)_2-$, $-COO-$, $-OCO-$, $-CH_2O-$, $-OCH_2-$, $-CF_2O-$, $-OCF_2-$, $-CH{=}CH-$ or $-C{\equiv}C-$; $Y^1$ is independently fluorine, chlorine, $-CF_3$ or $-CHF_2$, provided that one of $Y^1$ is chlorine, $-CF_3$ or $-CHF_2$; and Rc is alkyl.

14. The compound according to item 8, wherein in the formulae (1-1) to (1-6), Ra and Rb are independently alkyl having from 1 to 8 carbons, alkoxy having from 1 to 7 carbons, alkoxyalkyl having from 2 to 7 carbons or alkenyl having from 2 to 8 carbons; ring $A^1$ is independently 1,4-cyclohexylene, 1,4-phenylene, 2-fluoro-1,4-phenylene or 2,3-difluoro-1,4-phenylene; $Z^1$ is independently a single bond or $-(CH_2)_2-$; $Y^1$ is independently hydrogen, fluorine or $-CF_3$, provided that one of $Y^1$ is $-CF_3$; and Rc is $-CH_3$.

15. A compound represented by any one of the following formulae (I) to (IX):

(I)

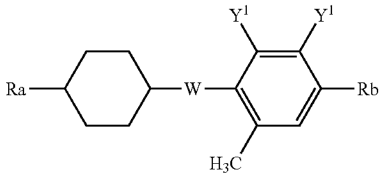

(II)

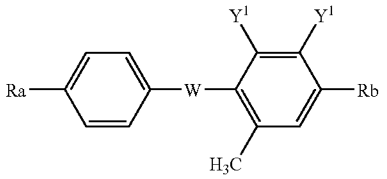

(III)

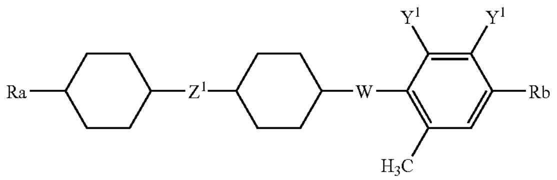

-continued (IV)

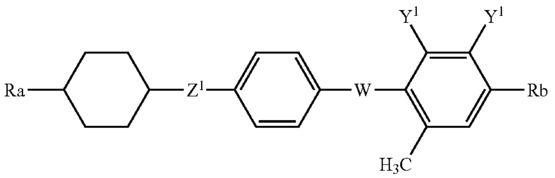

(V)

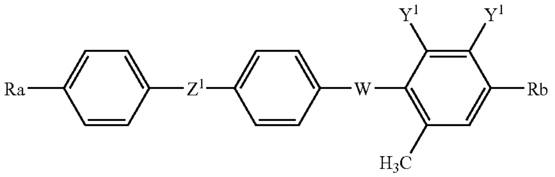

(VI)

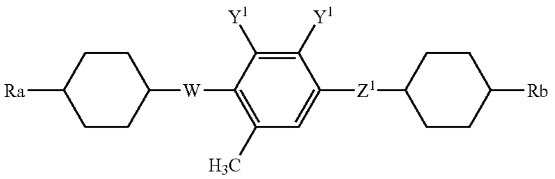

(VII)

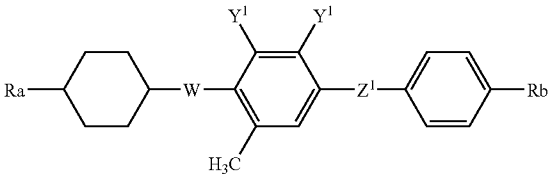

(VIII)

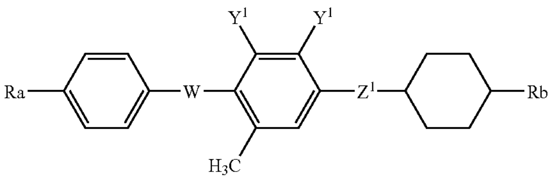

(IX)

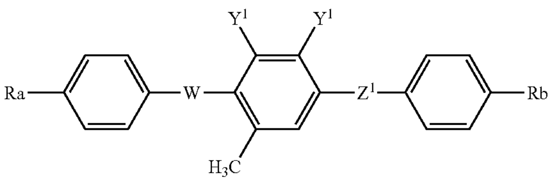

wherein Ra and Rb are independently hydrogen or alkyl having from 1 to 10 carbons, provided that in the alkyl arbitrary $-CH_2-$ may be replaced by $-O-$, and arbitrary $-(CH_2)_2-$ may be replaced by $-CH{=}CH-$; $Z^1$ is independently a single bond, $-(CH_2)_2-$, $-COO-$, $-OCO-$, $-CH_2O-$, $-OCH_2-$, $-CF_2O-$, $-OCF_2-$, $-CH{=}CH-$, $-CF{=}CF-$, $-C{\equiv}C-$, $-(CH_2)_2COO-$, $-OCO(CH_2)_2-$, $-(CH_2)_2CF_2O-$, $-(CH_2)_3O-$, $-O(CH_2)_3-$ or $-(CH_2)_4-$; W is $-(CH_2)_2-$, $-(CH_2)_4-$, $-CH_2O-$, $-OCH_2-$, $-CH{=}CH-$ or $-C{\equiv}C-$; and $Y^1$ is independently hydrogen, fluorine, chlorine, $-CF_3$ or $-CF_2H$.

16. The compound according to item 15, wherein in the formulae (I) to (IX), Ra and Rb are independently alkyl having from 1 to 10 carbons, alkoxy having from 1 to 9 carbons or alkenyl having from 2 to 10 carbons; $Z^1$ is independently a single bond, $—(CH_2)_2—$, —CH═CH— or $—(CH_2)_4—$; W is $—CH_2O—$ or —CH═CH—; and $Y^1$ is independently hydrogen, fluorine, chlorine, $—CF_3$, or $—CHF_2$, provided that one of $Y^1$ is fluorine, chlorine, $—CF_3$, $—CHF_2$ or $—CH_2F$.

17. The compound according to item 15, wherein in the formulae (I) to (IX), Ra and Rb are independently alkyl having from 1 to 10 carbons, alkoxy having from 1 to 9 carbons or alkenyl having from 2 to 10 carbons; $Z^1$ is independently a single bond, $—(CH_2)_2—$, —CH═CH— or $—(CH_2)_4—$; W s $—(CH_2)_2—$; and $Y^1$ are independently hydrogen, fluorine, $—CF_3$ or $—CF_2H$, provided that one of $Y^1$ is $—CF_3$ or $—CF_2H$.

18. The compound according to item 16, wherein in the formulae (I) to (IX), $Z^1$ is independently a single bond or —CH═CH—; W is $—CH_2O—$; and $Y^1$ is independently hydrogen, fluorine or $—CF_3$, provided that one of $Y^1$ is fluorine or $—CF_3$.

19. The compound according to item 16, wherein in the formulae (I) to (IX), $Z^1$ is a single bond; and $Y^1$ is independently fluorine or $—CF_3$.

20. The compound according to item 16, wherein in the formulae (I) to (IX), $Z^1$ is a single bond; and each $Y^1$ is fluorine.

21. The compound according to item 16, wherein in the formulae (I) to (IX), $Z^1$ is a single bond; and each $Y^1$ is $—CF_3$.

22. The compound according to item 16, wherein in the formulae (I) to (III), Ra is alkyl having from 1 to 6 carbons or alkenyl; Rb is alkoxy having from 1 to 4 carbons; $Z^1$ is a single bond; W is $—CH_2O—$; and each $Y^1$ is fluorine.

23. A liquid crystal composition comprising at least one compound selected from the group consisting of the compounds according to any one of items 1 to 22.

24. The liquid crystal composition according to item 23, wherein the liquid crystal composition further comprises at least one compound selected from the group consisting of compounds represented by the following formulae (2), (3) and (4):

(2)

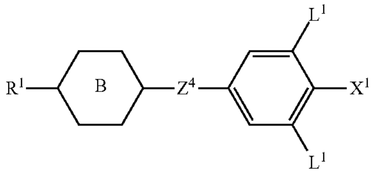

(3)

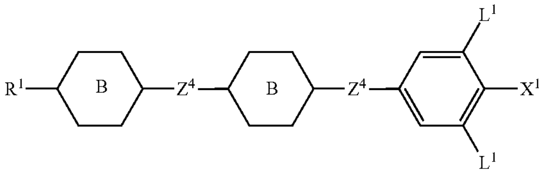

(4)

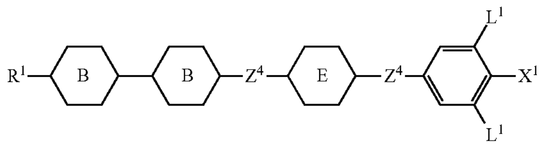

wherein $R^1$ is alkyl having from 1 to 10 carbons, provided that in the alkyl arbitrary $—CH_2—$ may be replaced by —O— or —CH═CH—, and arbitrary hydrogen may be replaced by fluorine; $X^1$ is fluorine, chlorine, $—OCF_3$, $—OCHF_2$, $—CF_3$, $—CHF_2$, $—CH_2F$, $—OCF_2CHF_2$ or $—OCF_2CHFCF_3$; ring B is independently 1,4-cyclohexylene, 1,3-dioxane-2,5-diyl or 1,4-phenylene, arbitrary hydrogen of which may be replaced by fluorine; ring E is 1,4-cyclohexylene or 1,4-phenylene, arbitrary hydrogen of which may be replaced by fluorine; $Z^4$ is independently $—(CH_2)_2—$, $—(CH_2)_4—$, —COO—, $—CF_2O—$, $—OCF_2—$, —CH═CH— or a single bond; and $L^1$ is independently hydrogen or fluorine.

25. The liquid crystal composition according to item 23, wherein the liquid crystal composition further comprises at least one compound selected from the group consisting of compounds represented by the following formulae (5) and (6):

(5)

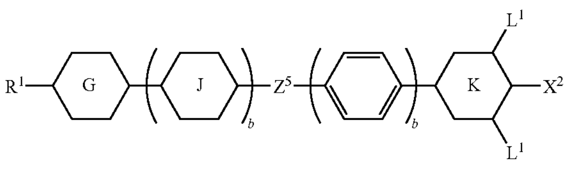

(6)

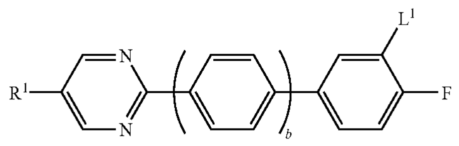

wherein $R^1$ is alkyl having from 1 to 10 carbons, provided that in the alkyl arbitrary $—CH_2—$ may be replaced by —O— or —CH═CH—, and arbitrary hydrogen may be replaced by fluorine; $X^2$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4-phenylene, arbitrary hydrogen of which may be replaced by fluorine; ring K is 1,4-cyclohexylene or 1,4-phenylene; $Z^5$ is $—(CH_2)_2—$, —COO—, $—CF_2O—$, $—OCF_2—$ or a single bond; $L^1$ is independently hydrogen or fluorine; and b is independently 0 or 1.

26. The liquid crystal composition according to item 23, wherein the liquid crystal composition further comprises at least one compound selected from the group consisting of compounds represented by the following formulae (7), (8), (9), (10) and (11):

(7)

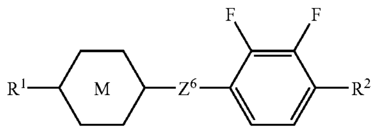

(8)

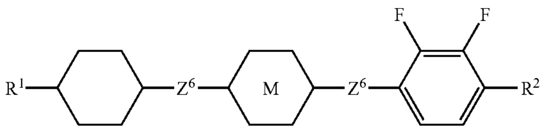

-continued (9)

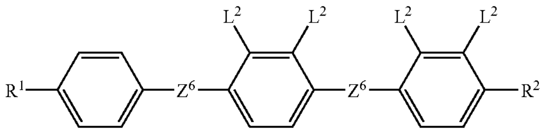

(10)

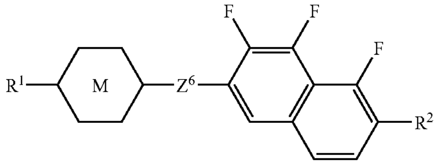

(11)

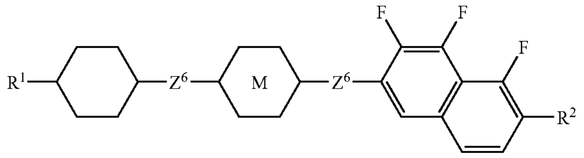

wherein $R^1$ is alkyl having from 1 to 10 carbons, provided that in the alkyl arbitrary $—CH_2—$ may be replaced by —O— or —CH═CH—, and arbitrary hydrogen may be replaced by fluorine; $R^2$ is fluorine or alkyl having from 1 to 10 carbons, provided that in the alkyl arbitrary $—CH_2—$ may be replaced by —O— or —CH═CH—, and arbitrary hydrogen may be replaced by fluorine; ring M is independently 1,4-cyclohexylene, 1,4-phenylene or decahydro-2,6-naphthalene; $Z^6$ is independently $—(CH_2)_2—$, —COO— or a single bond; and $L^2$ is independently hydrogen or fluorine, provided that at least one of $L^2$ is fluorine.

27. The liquid crystal composition according to item 23, wherein the liquid crystal composition further comprises at least one compound selected from the group consisting of compounds represented by the following formulae (12), (13) and (14):

(12)

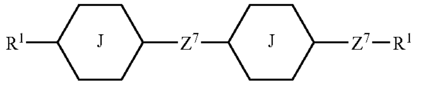

(13)

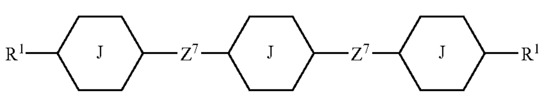

(14)

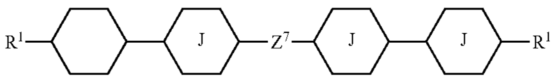

wherein $R^1$ is alkyl having from 1 to 10 carbons, provided that in the alkyl arbitrary $—CH_2—$ may be replaced by —O— or —CH═CH—, and arbitrary hydrogen may be replaced by fluorine; ring J is independently 1,4-cyclohexylene, pyrimidine-2,5-diyl or 1,4-phenylene, arbitrary hydrogen of which may be replaced by fluorine; and $Z^7$ is independently —C≡C—, —COO—, $—(CH_2)_2—$, —CH═CH— or a single bond.

28. The liquid crystal composition according to item 24, wherein the liquid crystal composition further comprises at least one compound selected from the group of the compounds represented by the formulae (5) and (6) in item 25.

29. The liquid crystal composition according to item 24, wherein the liquid crystal composition further comprises at least one compound selected from the group of the compounds represented by the formulae (12), (13) and (14) in item 27.

30. The liquid crystal composition according to item 25, wherein the liquid crystal composition further comprises at least one compound selected from the group of the compounds represented by the formulae (12), (13) and (14) in item 27.

31. The liquid crystal composition according to item 26, wherein the liquid crystal composition further comprises at least one compound selected from the group of the compounds represented by the formulae (12), (13) and (14) in item 27.

32. The liquid crystal composition according to any one of items 23 to 31, wherein the liquid crystal composition further comprises an optically active compound.

33. A liquid crystal display device comprising at least one liquid crystal composition selected from the group consisting of the compositions according to any one of items 23 to 32.

The compounds of the invention have ordinary properties necessary for a liquid crystal compound, including, for example, stability to heat and light, a small viscosity, a suitable optical anisotropy, a suitable dielectric anisotropy, a wide temperature range of a nematic phase and an excellent compatibility with other liquid crystal compounds. In particular, the compounds have a wide temperature range of a nematic phase. The liquid crystal compositions of the invention contain at least one of the compounds described herein and have a high higher limit temperature of a nematic phase, a low lower limit temperature of a nematic phase, a small viscosity, a suitable optical anisotropy and a low threshold voltage. In particular, the composition has a high higher limit temperature of a nematic phase and a low lower limit temperature of a nematic phase. The liquid crystal display devices of the invention contain at least one composition described herein and have a wide usable temperature range, a short response time, a small electric power consumption, a large contrast and a low driving voltage.

Firstly, the compound (1) of the invention will be described in more detail. A condensed ring, such as a naphthalene ring, is counted as one ring. The compound (1) includes a two-ring, three-ring or four-ring compound having an alkyl group having 2 or more carbons. The compound is significantly physically and chemically stable under the conditions under which the device is normally used, and is good in compatibility with another liquid crystal compound. A composition containing the compound is stable under the conditions under which the device is normally used. Even when the composition is stored at a low temperature, the compound is not deposited as crystals (or a smectic phase). The compound has ordinary properties that are necessary for the compound to function (e.g., a suitable optical anisotropy and a suitable dielectric anisotropy).

The end groups, the rings and the bonding groups of the compound (1) can be appropriately selected to enable arbitrary control of the properties, such as the optical anisotropy and the dielectric anisotropy. The effects of the end groups Ra and Rb, the ring $A^1$ and the bonding group $Z^1$ on the properties of the compound (1) will be described below.

The compound (1) has a large negative dielectric anisotropy. A compound having a large negative dielectric anisotropy is a component for decreasing the threshold voltage of the composition. In the case where Ra and Rb are hydrogen, alkyl, alkoxy or the like, and $Y^1$ is halogen or the like, the compound has a large negative dielectric anisotropy.

In the case where Ra or Rb is in a linear form, the compound has a wide temperature range of the liquid crystal phase and has a small viscosity. In the case where Ra or Rb is in a branched form, the compound exhibits good compatibility with another liquid crystal compounds. In the case where Ra or Rb is an optically active group, the compound is useful as a chiral dopant. By adding the compound to the composition, a reverse twisted domain occurring in the device can be prevented. The compound having Ra or Rb that is not an optically active group is useful as a component of the composition. In the case where Ra or Rb is alkenyl, a preferred steric configuration of the compound depends on the position of the double bond. An alkenyl compound having a preferred steric configuration has a high higher limit temperature or a wide temperature range of the liquid crystal phase. This behavior is described in detail in *Mol. Cryst. Lig. Crvst*., vol. 131, p. 109 (1985) and *Mol. Cryst. Liq. Cryst*., vol. 131, p. 327 (1985).

In the case where the ring $A^1$ is 1,4-phenylene, and where hydrogens at the 2- and 3-positions are replaced by halogen or the like, the compound has a large negative dielectric anisotropy. In the case where the ring $A^1$ is 1,4-phenylene, pyridine-2,5-diyl, pyrimidine-2,5-diyl or pyridazine-3,6-diyl, and where arbitrary hydrogen may be replaced by halogen, the compound has a large optical anisotropy. In the case where the ring $A^1$ is 1,4-cyclohexylene, 1,4-cyclohexenylene or 1,3-dioxane-2,5-diyl, the compound has a small optical anisotropy.

In the case where at least two rings are 1,4-cyclohexylene, the compound has a high higher limit temperature, a small optical anisotropy and a small viscosity. In the case where at least one ring is 1,4-phenylene, the compound has a relatively large optical anisotropy and a large orientational order parameter. In the case where at least two rings are 1,4-phenylene, the compound has a large optical anisotropy, a wide temperature range of the liquid crystal phase and a high higher limit temperature.

In the case where the bonding group $Z^1$ is a single bond, $—(CH_2)_2—$, $—CH_2O—$, $—OCH_2—$, $—CF_2O—$, $—OCF_2—$, $—CH{=}CH—$, $—CF{=}CF—$ or $—(CH_2)_4—$, the compound has a small viscosity. In the case where the bonding group is a single bond, $—(CH_2)_2—$, $—CF_2O—$, $—OCF_2—$ or $—CH{=}CH—$, the compound has a smaller viscosity. In the case where the bonding group is $—CH{=}CH—$, the compound has a wide temperature range of the liquid crystal phase and a large elastic constant ratio $K_{33}/K_{11}$($K_{33}$: bend elastic constant, $K_{11}$: splay elastic constant). In the case where the bonding group is $—C{\equiv}C—$, the compound has a large optical anisotropy.

In the case where the bonding group W is $—(CH_2)_2—$, $—CH_2O—$, $—OCH_2—$, $—CF_2O—$, $—OCF_2—$, $—CH{=}CH—$, $—CF{=}CF—$ or $—(CH_2)_4—$, the compound has a small viscosity. In the case where the bonding group W is $—(CH_2)_2—$, $—CF_2O—$, $—OCF_2—$ or $—CH{=}CH—$, the compound has a smaller viscosity. In the case where the bonding group W is $—CH{=}CH—$, the compound has a wide temperature range of the liquid crystal phase, a high clearing point thereof, a large negative $\Delta\in$, a small viscosity and a large elastic constant ratio $K_{33}/K_{11}$ ($K_{33}$: bend elastic constant, $K_{11}$: splay elastic constant). In the case where the bonding group W is $—(CH_2)_2—$, the compound has a wider temperature range of the liquid crystal phase, a high clearing point thereof, a large negative $\Delta\in$ and a small viscosity. In the case where the bonding group W is $—CH_2O—$, the compound has a wider temperature range of the liquid crystal phase, a high clearing point thereof, a large negative $\Delta\in$ and a smaller viscosity.

In the case where one of the substituents $Y^1$ is hydrogen, and the other of $Y^1$ is halogen, —CN, $—CF_3$, $—CF_2H$, $—OCF_3$ or $—OCF_2H$, the compound has a large negative dielectric anisotropy. In the case where both the substituents $Y^1$ are halogen, —CN, $—CF_3$, $—CF_2H$, $—OCF_3$ or $—OCF_2H$, the compound has a larger negative dielectric anisotropy. In the case where $Y^1$ is halogen, $—CF_3$ or $—CF_2H$, the compound has a wide temperature range of the liquid crystal phase.

In the case where the compound (1) has a two-ring or three-ring structure, the compound has a small viscosity. In the case where the compound (1) has a three-ring or four-ring structure, the compound has a high higher limit temperature. As having been described, a compound having target properties can be obtained by appropriately selecting the kinds of end groups, the rings and the bonding groups and the number of the rings. Therefore, the compound (1) is useful as a component of a compound used in various devices including PC, TN, STN, ECB, OCB, IPS and VA.

Preferred examples of the compound (1) include the compounds (1-1) to (1-6) described in the item 6. More specific examples thereof include the following compounds (1-1-1) to (1-6-3). The meanings of the symbols Ra, Rb, $A^1$ and $Z^1$ in these compounds are the same as those described in the item 6. $Y^1$ is halogen, —CN, $—CF_3$, $—CHF_2$, $—CH_2F$, $—OCF_3$, $—OCHF_2$ or $—OCH_2F$. Rc is alkyl having from 1 to 4 carbons, provided that in the alkyl arbitrary $—CH_2—$ may be replaced by —O—, —S—, —CO— or $—SiH_2—$, and arbitrary $—(CH_2)_2—$ may be replaced by $—CH{=}CH—$ or $—C{\equiv}C—$.

(1-1-1)

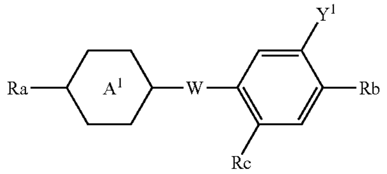

(1-1-2)

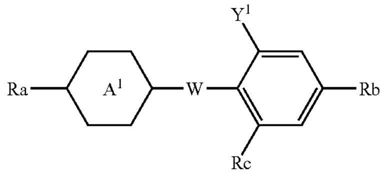

(1-1-3)

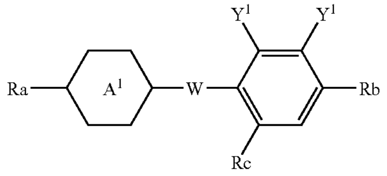

(1-2-1)

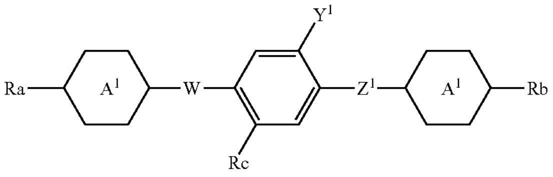

-continued (1-2-2)

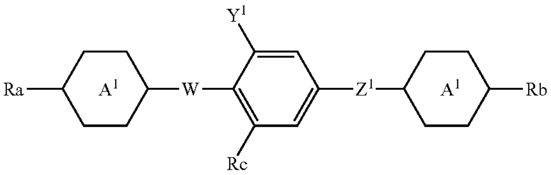

(1-2-3)

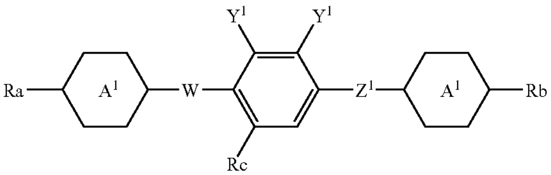

(1-3-1)

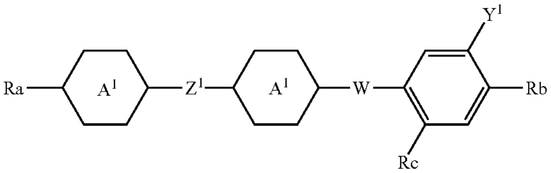

(1-3-2)

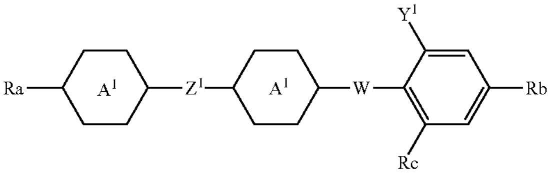

(1-3-3)

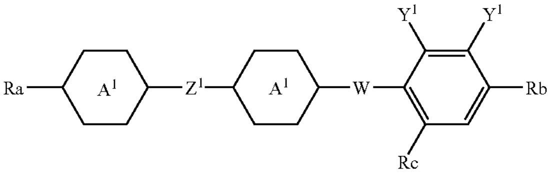

(1-4-1)

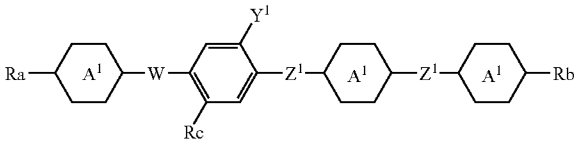

(1-4-2)

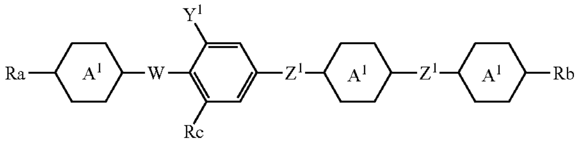

(1-4-3)

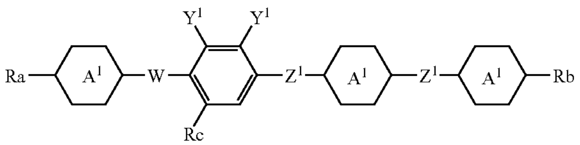

-continued (1-5-1)

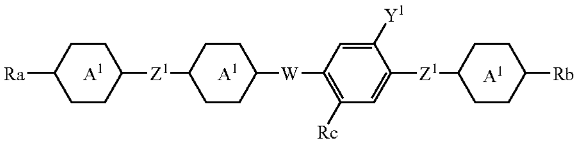

(1-5-2)

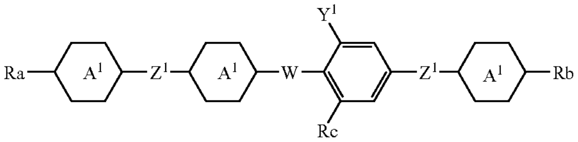

(1-5-3)

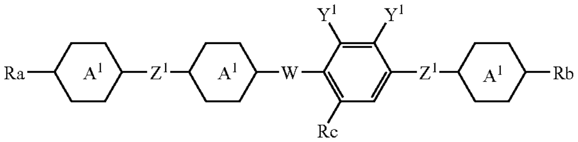

(1-6-1)

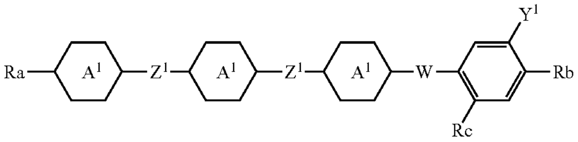

(1-6-2)

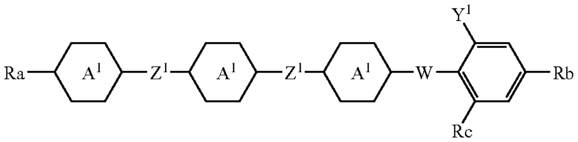

(1-6-3)

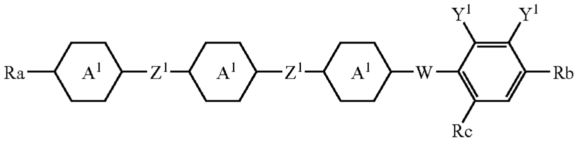

The compound (1) can be synthesized by appropriately combining the methods known in the filed of synthetic organic chemistry. The methods for introducing the target end group, ring and bonding group to the starting material are disclosed in known publications, such as *Organic Synthesis*, published by John Wiley & Sons, Inc., *Organic Reactions*, published by John Wiley & Sons, Inc., *Comprehensive Organic Synthesis*, published by Pergamon Press, and *Shin Jikken Kagaku Koza* (Lectures on New Experimental Chemistry), published by Maruzen, Inc.

An example of the method for forming the bonding group $Z^1$ will be described with reference firstly to a reaction scheme and then to the items (I) to (XI) for describing the scheme. In the scheme, $MSG^1$ and $MSG^2$ each represents a monovalent organic group having at least one ring. The plural groups represented by $MSG^1$ (or MSG 2) used in the scheme may be the same as or different from each other. The compounds (1A) to (1K) correspond to the compound (1).

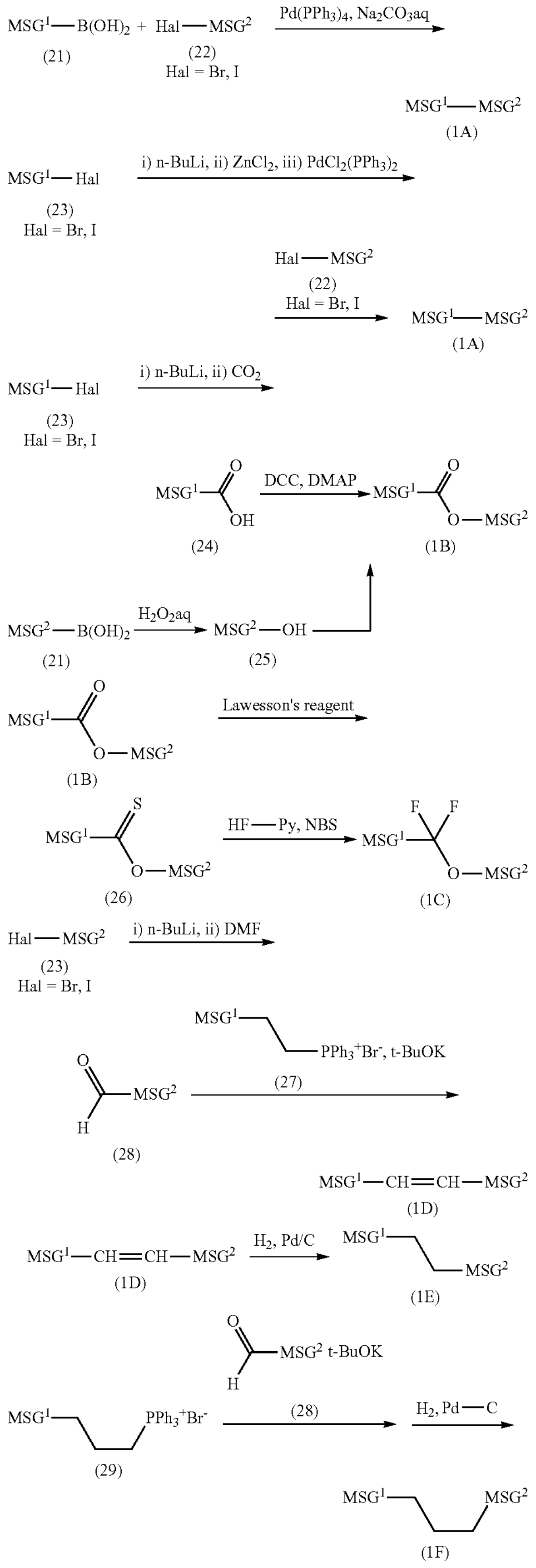

(21) (22) (1A) (23) (22) (1A) (23) (24) (1B) (21) (25) (1B) (26) (1C) (23) (27) (28) (1D) (1D) (1E) (28) (29) (1F)

-continued

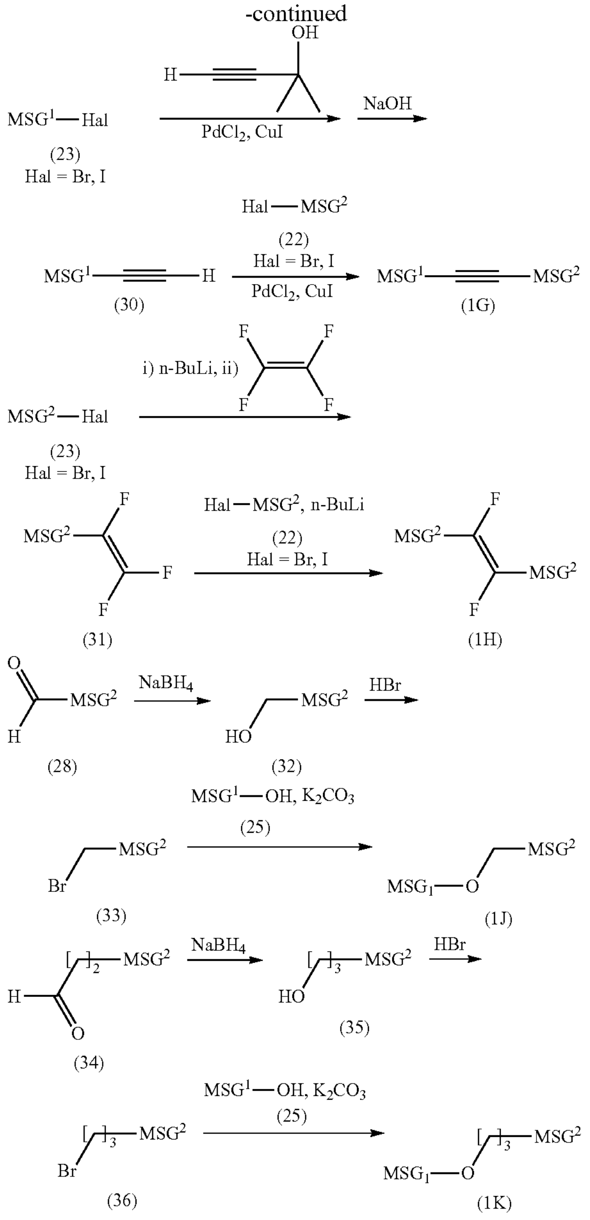

(23) (22) (30) (1G) (23) (31) (22) (1H) (28) (32) (25) (33) (1J) (34) (35) (36) (25) (1K)

(I) Formation of Single Bond

Arylboric acid (21) and a compound (22), which is synthesized in the known method, are reacted in the presence of a carbonate aqueous solution and a catalyst, such as tetrakis (triphenylphosphine)palladium, to synthesize a compound (1A). The compound (1A) can also be synthesized in such a manner that a compound (23), which is synthesized in the known method, is reacted with n-butyllithium and then with zinc chloride, and then reacted with a compound (22) in the presence of a catalyst, such as dichloro-bis(triphenylphosphine)palladium.

(II) Formation of —COO— and —OCO—

A compound (23) is reacted with n-butyllithium and then with carbon dioxide to obtain a carboxylic acid (24). The compound (24) and a phenol compound (25), which is synthesized in the known method, are subjected to dehydration in the presence of DDC (1,3-dicyclohexylcarbodiimide) and DMAP (4-dimethylaminopyridine) to synthesize a compound (1B) having —COO—. A compound having —OCO— is produced in the same manner.

(III) Formation of —$CF_2O$— and —$OCF_2$—

A compound (1B) is treated with a sulfurating agent, such as Lawson reagent, to obtain a compound (26). The compound (26) is fluorinated with hydrogen fluoride pyridine complex and NBS (N-bromosuccinimide) to synthesize a compound (1C) having —$CF_2O$—. The reaction is described in M. Kuroboshi, et al., *Chem. Lett.,* 1992, p. 827. The compound (1C) can also be synthesized by fluorinating the compound (26) with (diethylamino)sulfur trifluoride (DAST). The reaction is described in W. H. Bunnelle, et al., *J. Org. Chem., vol.* 55, p. 768 (1990). A compound having —$OCF_2$— is produced in the same manner. These bonding groups can also be formed by the method described in Peer. Kirsch, et al., *Anbew. Chem. Int. Ed*., vol. 40, p. 1480 (2001).

(IV) Formation of —CH═CH—

A compound (23) is treated with n-butyllithium and then reacted with a formamide, such as N,N-dimethylformamide (DMF), to obtain an aldehyde compound (28). A phosphonium salt (27), which is synthesized in the known method, is treated with a base, such as potassium tert-butoxide, to form phosphoylide, which is then reacted with the aldehyde compound (28) to synthesize a compound (1D). A cis-compound is formed depending on the reaction conditions, and the cis-compound is isomerized to a trans-compound by the known method depending on necessity.

(V) Formation of —$(CH_2)_2$—

A compound (1D) is hydrogenated in the presence of a catalyst, such as palladium charcoal, to synthesize a compound (1E).

(VI) Formation of —$(CH_2)_4$—

A compound having —$(CH_2)_2$—CH═CH— is obtained in the same manner as described in the item (IV) by using a phosphonium salt (29) instead of the phosphonium salt (27). The compound is subjected catalytic hydrogenation to synthesize a compound (1F).

(VII) Formation of —C≡C—

A compound (23) is reacted with 2-methyl-3-butyne-2-ol in the presence of a catalyst containing dichloropalladium and copper halogenide and then deprotected under the basic conditions to obtain a compound (30). The compound (30) is reacted with a compound (22) in the presence of a catalyst containing dichloropalladium and copper halogenide to synthesize a compound (1G).

(VIII) Formation of —CF═CF—

A compound (23) is treated with n-butyllithium and then reacted with tetrafluoroethylene to obtain a compound (31). A compound (22) is treated with n-butyllithium and then reacted with the compound (31) to synthesize a compound (1H).

(IX) Formation of —$CH_2O$— or —$OCH_2$—

A compound (28) is reduced with a reducing agent, such as sodium borohydride, to obtain a compound (32), which is then halogenated with hydrobromic acid or the like to obtain a compound (33). The compound (33) is reacted with a compound (25) in the presence of potassium carbonate or the like to synthesize a compound (1J).

(X) Formation of —$(CH_2)_3O$— or —$O(CH_2)_3$—

A compound (1 K) is synthesized in the same manner as in the item (IX) except that a compound (34) is used instead of the compound (28).

(XI) Formation of —$(CF_2)_2$—

A diketone (—COCO—) is fluorinated with sulfur tetrafluoride in the presence of a hydrogen fluoride catalyst according to the method described in *J. Am. Chem. Soc*., vol. 123, p. 5414 (2001) to obtain a compound having —$(CF_2)_2$—.

Secondly, the composition of the invention will be described in more detail. The composition may contain only plural compounds selected from the compound (1). A preferred example of the composition contains at least one compound selected from the compounds (1) in a proportion of from approximately 1% to approximately 99%. The composition mainly contains a component selected from the compounds (2) to (14). Upon preparing the composition, the components are selected taking the dielectric anisotropy of the compound (1) into consideration.

A preferred example of the composition containing the compound (1) having a large positive dielectric anisotropy is as follows. An example of the preferred composition contains at least one compound selected from the group of the compounds (2), (3) and (4). Another example of the preferred composition contains at least one compound selected from the group of the compounds (5) and (6). Still another example of the preferred composition contains at least two compounds selected from the aforementioned two groups, respectively. These compositions may further contain at least one compound selected from the group of the compounds (12), (13) and (14) for such purposes as adjustments of the temperature range of the liquid crystal phase, the viscosity, the optical anisotropy, the dielectric anisotropy and the threshold voltage. The compositions may further contain at least one compound selected from the group of the compounds (7) to (11) for further adjusting the properties. The compositions may further contain another liquid crystal compound and a compound, such as an additive, for optimizing to an AM-TN device and an STN device.

A further example of the preferred composition contains at least one compound selected from the group of the compounds (12), (13) and (14). The composition may further contain at least one compound selected from the group of the compounds (7) to (11) for further adjusting the properties. The composition may further contain another liquid crystal compound and a compound, such as an additive, for optimizing to an AM-TN device and an STN device.

A preferred example of the composition containing the compound (1) having a large negative dielectric anisotropy is as follows. An example of the preferred composition contains at least one compound selected from the group of the compounds (7) to (11). The composition may further contain at least one compound selected from the group of the compounds (12), (13) and (14). The composition may further contain at least one compound selected from the group of the compounds (2) to (6) for further adjusting the properties. The composition may further contain another liquid crystal compound and a compound, such as an additive, for optimizing to a VA device.

Another example of the preferred composition contains at least one compound selected from the group of the compounds (12), (13) and (14). The composition may further contain at least one compound selected from the group of the compounds (7) to (11). The composition may further contain at least one compound selected from the group of the compounds (2) to (6). The composition may further contain another liquid crystal compound and a compound, such as an additive.

A preferred example of the composition containing the compound (1) having a small dielectric anisotropy is as follows. An example of the preferred composition contains at least one compound selected from the group of the compounds (2), (3) and (4). Another example of the preferred composition contains at least one compound selected from the group of the compounds (5) and (6). Still another example of the preferred composition contains at least two compounds selected from the aforementioned two groups, respectively. These compositions may further contain at least one compound selected from the group of the compounds (12), (13) and (14) for such purposes as adjustments of the temperature range of the liquid crystal phase, the viscosity, the optical anisotropy, the dielectric anisotropy and the threshold voltage. The compositions may further contain at least one compound selected from the group of the compounds (7) to (11) for further adjusting the properties. The compositions may further contain another liquid crystal compound and a compound, such as an additive, for optimizing to an AM-TN device and an STN device.

A further example of the preferred composition contains at least one compound selected from the group of the compounds (7) to (11). The composition may further contain at least one compound selected from the group of the compounds (12), (13) and (14). The composition may further contain at least one compound selected from the group of the compounds (2) to (6) for further adjusting the properties. The composition may further contain another liquid crystal compound and a compound, such as an additive, for optimizing to a VA device.

The compounds (2), (3) and (4) are used mainly in a composition for an AM-TN device owing to the large positive dielectric anisotropy thereof. In the composition, the amount of these compounds is generally from approximately 1% to approximately 99%, preferably from approximately 10% to approximately 97%, and more preferably from approximately 40% to approximately 95%. In the case where the compounds (12), (13) and (14) are further added to the composition, the amount of these compounds is preferably approximately 60% or less, and more preferably approximately 40% or less.

The compounds (5) and (6) are used mainly in a composition for an STN device owing to the extremely large positive dielectric anisotropy thereof. In the composition, the amount of these compounds is generally from approximately 1% to approximately 99%, preferably from approximately 10% to approximately 97%, and more preferably from approximately 40% to approximately 95%. In the case where the compounds (12), (13) and (14) are further added to the composition, the amount of these compounds is preferably approximately 60% or less, and more preferably approximately 40% or less.

The compounds (7), (8), (9), (10) and (11) are used mainly in a composition for a VA device owing to the negative dielectric anisotropy thereof. In the composition, the amount of these compounds is preferably approximately 80% or less, and more preferably from approximately 40% to approximately 80%. In the case where the compounds (12), (13) and (14) are further added to the composition, the amount of these compounds is preferably approximately 60% or less, and more preferably approximately 40% or less.

The compounds (12), (13) and (14) have a small dielectric anisotropy. The compound (12) is used mainly for adjusting the viscosity or the optical anisotropy. The compounds (13) and (14) increase the higher limit temperature and expand the temperature range of the liquid crystal phase. The compounds (13) and (14) are also used for adjusting the optical anisotropy. By increasing the amount of the compounds (12), (13) and (14), the threshold voltage of the composition is increased and the viscosity thereof is decreased. Therefore, these compounds may be used in a large amount as far as a desired value of the threshold voltage of the composition is satisfied.

Preferred examples of the compounds (2) to (14) include the compounds (2-1) to (2-9), the compounds (3-1) to (3-97), the compounds (4-1) to (4-33), the compounds (5-1) to (5-56), the compounds (6-1) to (6-3), the compounds (7-1) to (7-4), the compounds (8-1) to (8-6), the compounds (9-1) to (9-4), the compound (10-1), the compound (11-1), the compounds (12-1) to (12-11), the compounds (13-1) to (13-21) and the compounds (14-1) to (14-6), shown below. In the compounds, the symbols $R^1$, $R^2$, $X^1$ and $X^2$ have the same meanings as those in the compounds (2) to (14).

(2-1)
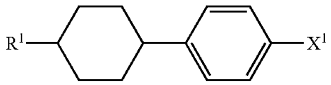

(2-2)
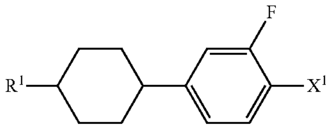

(2-3)
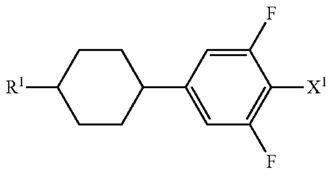

(2-4)
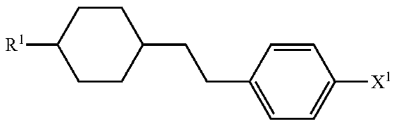

(2-5)
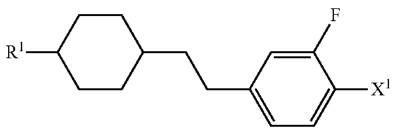

(2-6)
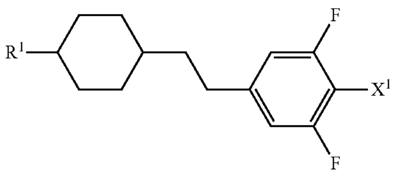

(2-7)
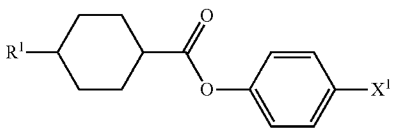

(2-8)
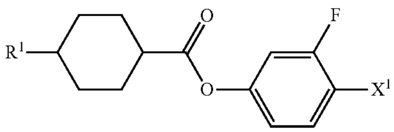

-continued
(2-9)
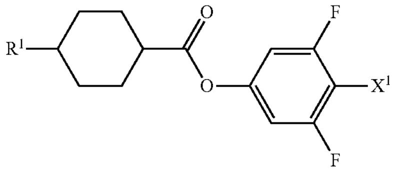
(3-2)
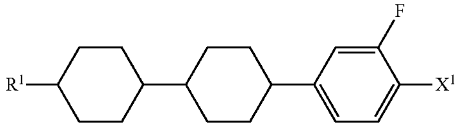
(3-4)
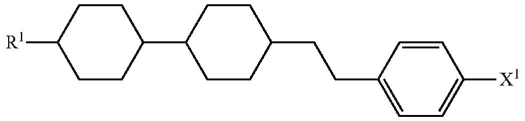
(3-6)
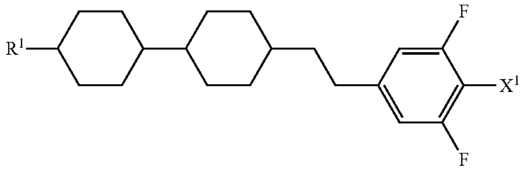
(3-8)
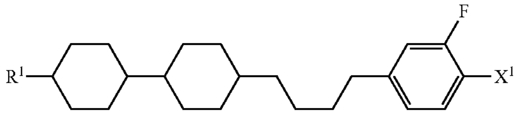
(3-10)
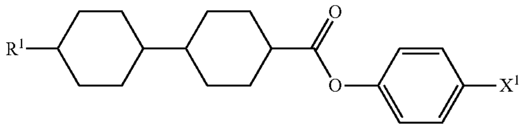
(3-12)
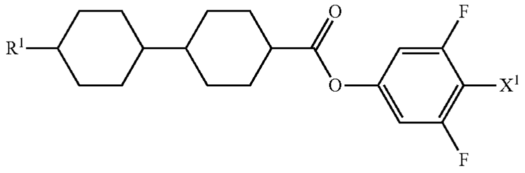
(3-14)
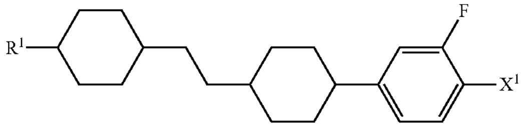
(3-16)
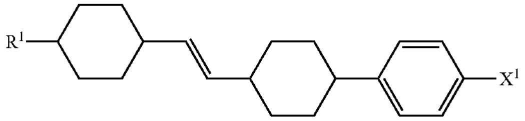
(3-1)
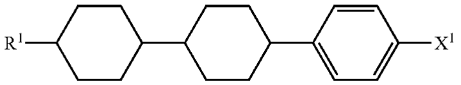
(3-3)
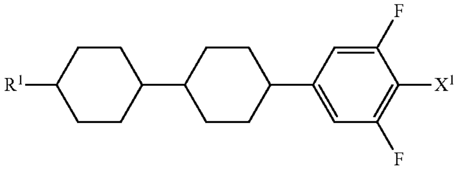
(3-5)
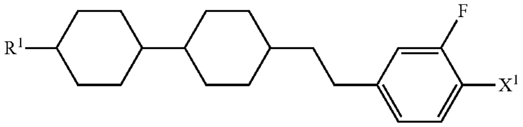
(3-7)
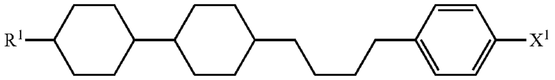
(3-9)
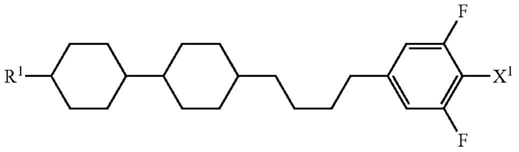
(3-11)
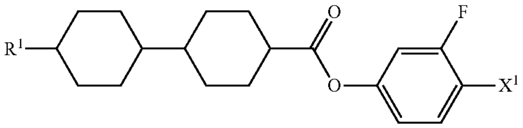
(3-13)
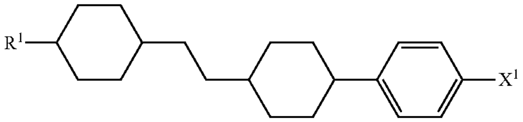
(3-15)
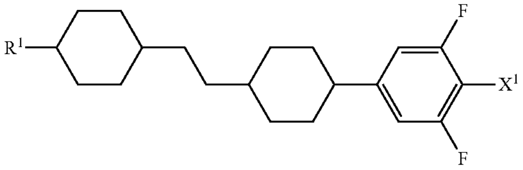
(3-17)
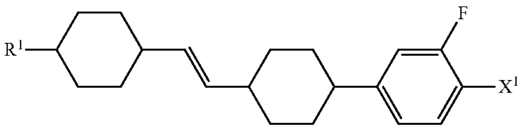

-continued
(3-18)
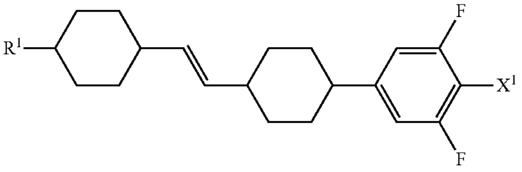
(3-19)
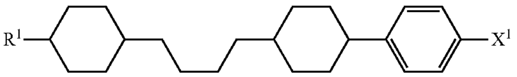
(3-20)
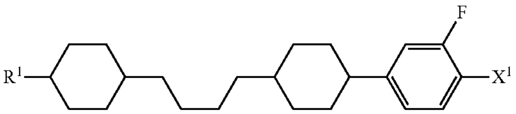
(3-21)
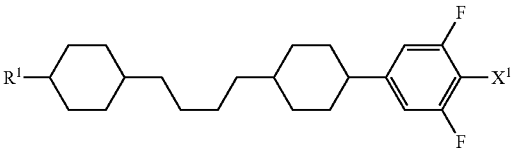
(3-22)
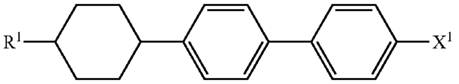
(3-23)
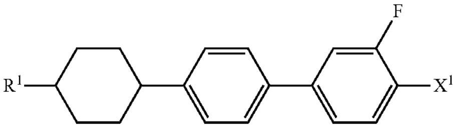
(3-24)
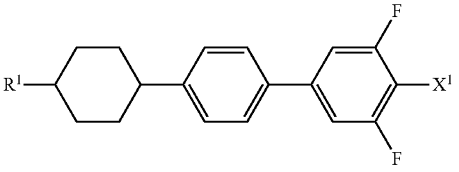
(3-25)
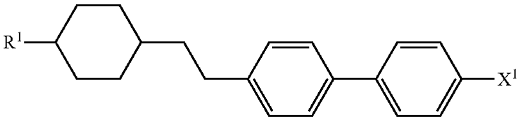
(3-26)
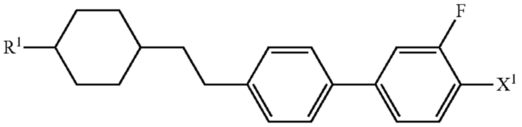
(3-27)
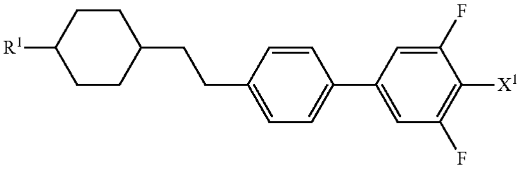
(3-28)
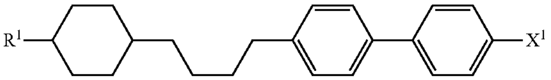
(3-29)
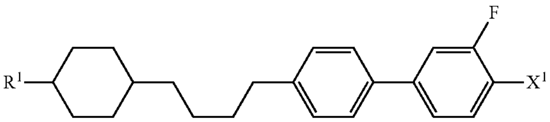
(3-30)
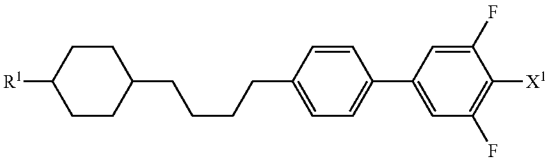
(3-31)
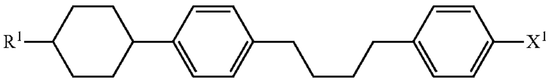
(3-32)
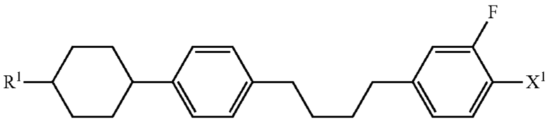
(3-33)
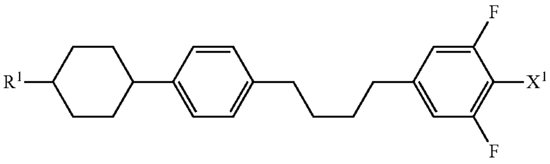

-continued
(3-34)
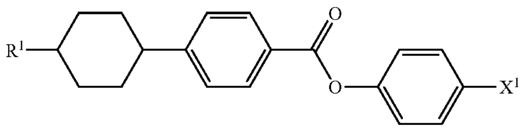
(3-35)
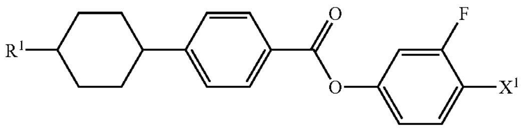
(3-36)
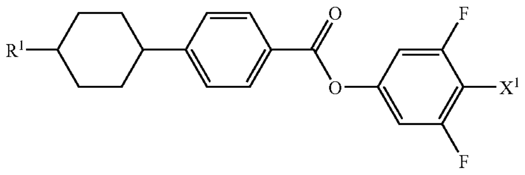
(3-37)
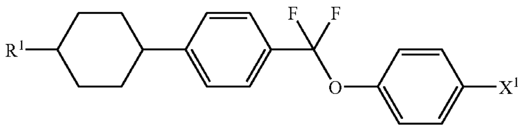
(3-38)
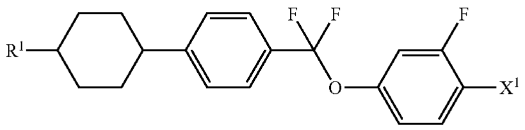
(3-39)
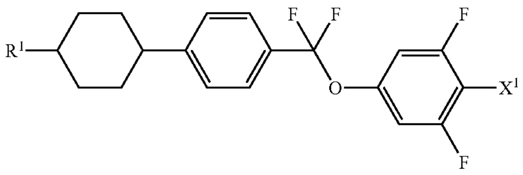
(3-40)
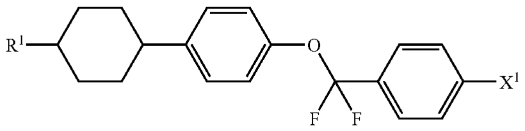
(3-41)
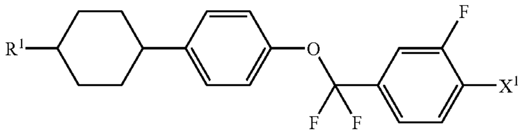
(3-42)
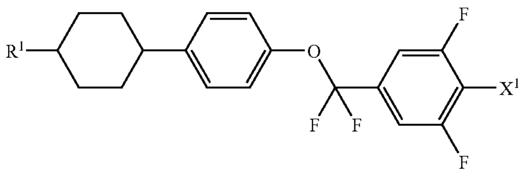
(3-43)
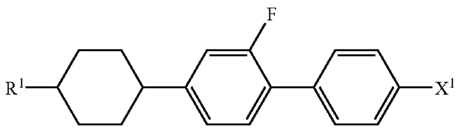
(3-44)
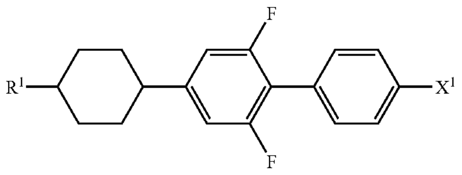
(3-45)
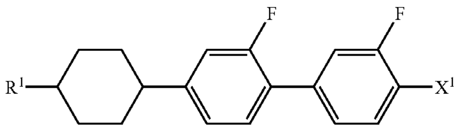
(3-46)
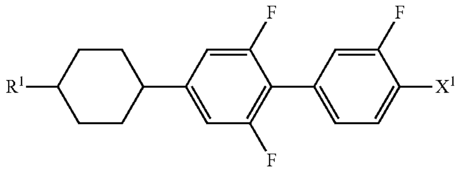
(3-47)
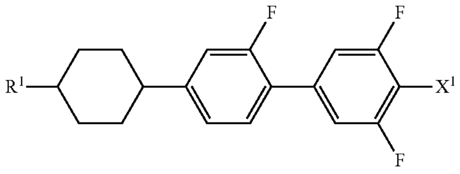
(3-48)
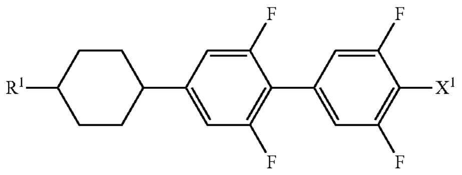
(3-49)
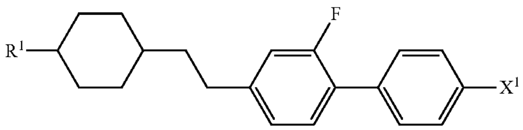

-continued
(3-50)
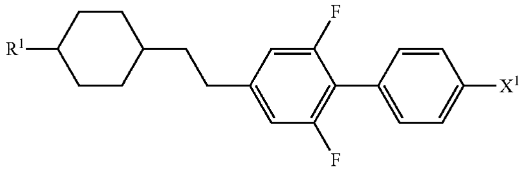
(3-51)
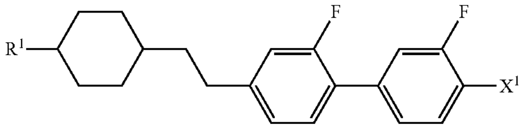
(3-52)
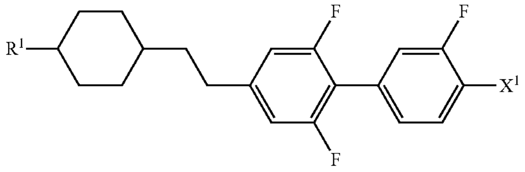
(3-53)
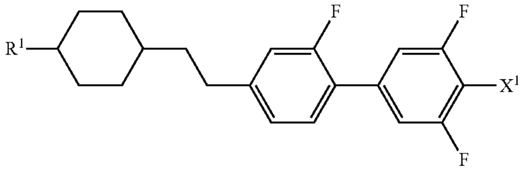
(3-54)
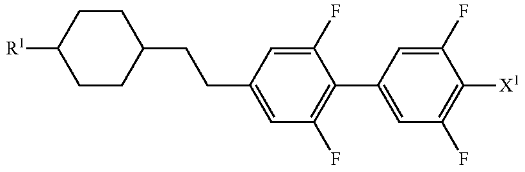
(3-55)
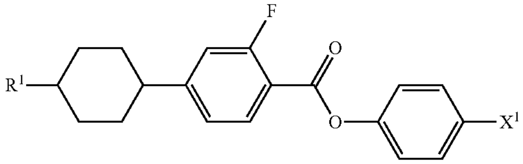
(3-56)
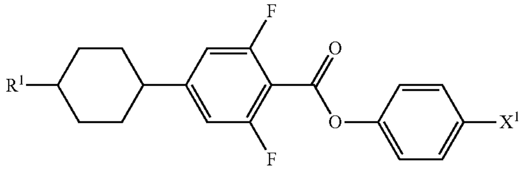
(3-57)
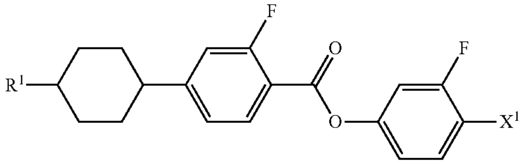
(3-58)
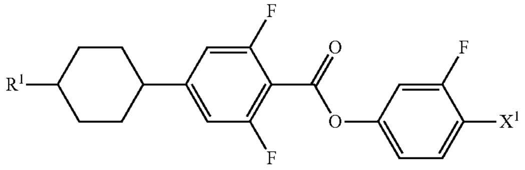
(3-59)
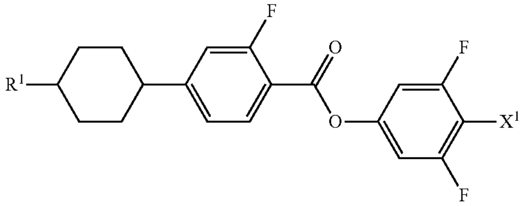
(3-60)
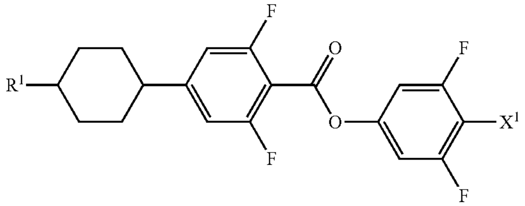
(3-61)
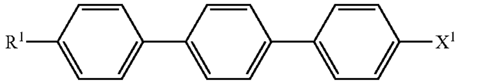
(3-62)
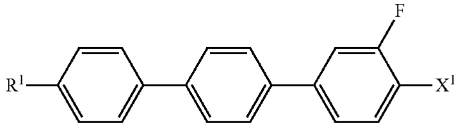
(3-63)
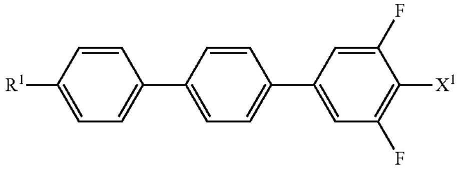
(3-64)
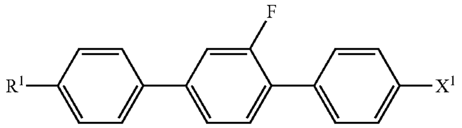
(3-65)
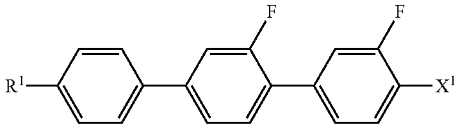

-continued
(3-66)
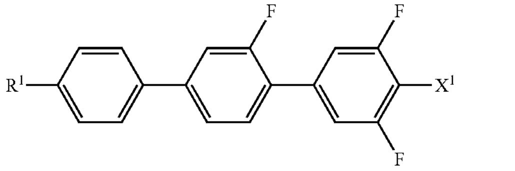
(3-67)
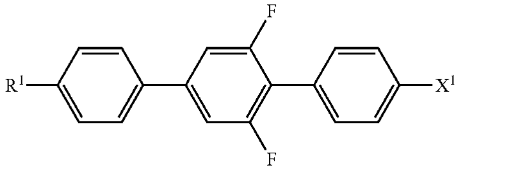
(3-68)
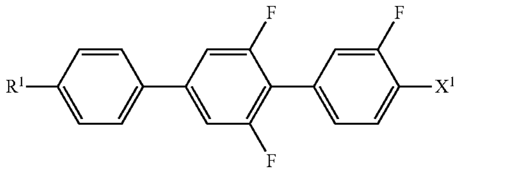
(3-69)
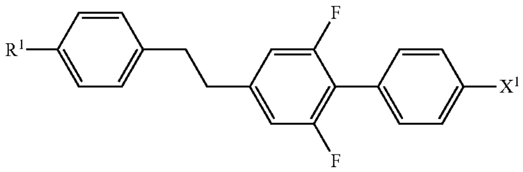
(3-70)
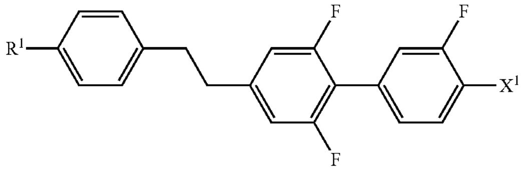
(3-71)
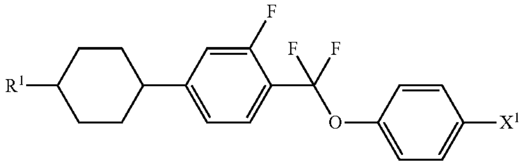
(3-72)
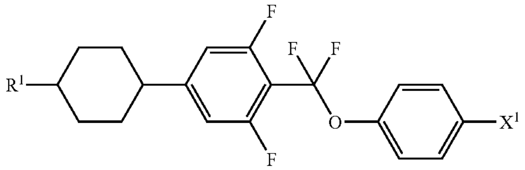
(3-73)
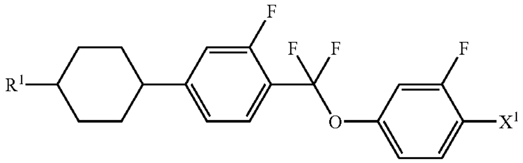
(3-74)
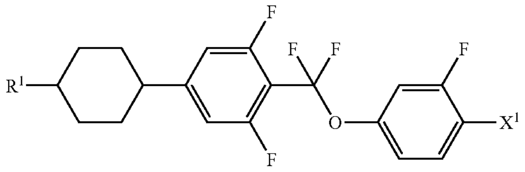
(3-75)
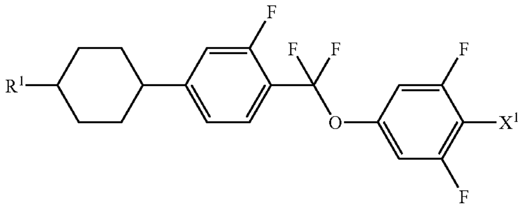
(3-76)
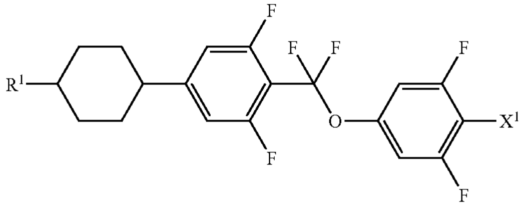
(3-77)
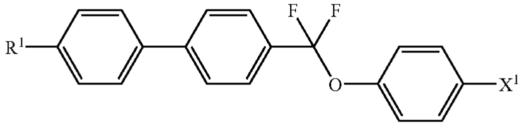
(3-78)
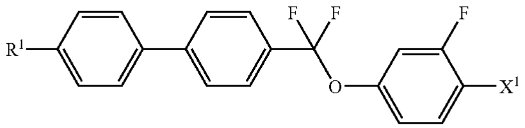
(3-79)
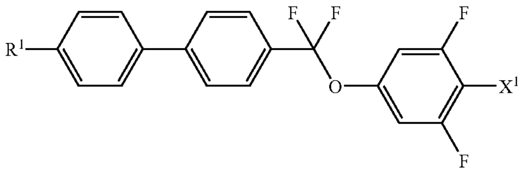
(3-80)
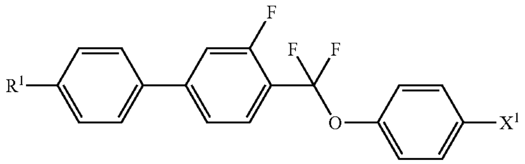
(3-81)
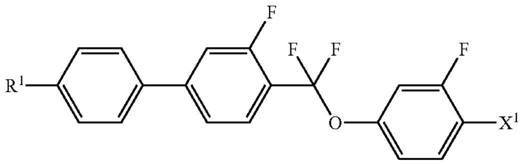

-continued
(3-82)
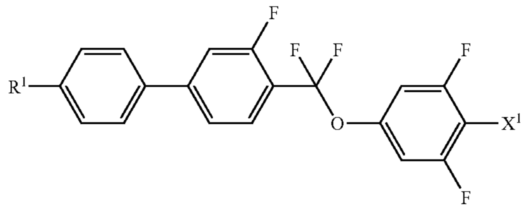
(3-83)
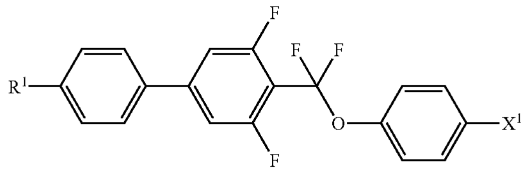
(3-84)
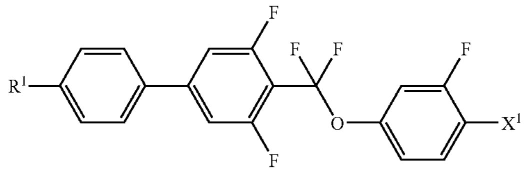
(3-85)
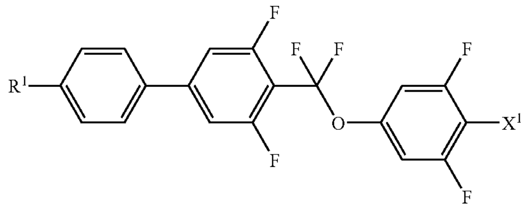
(3-86)
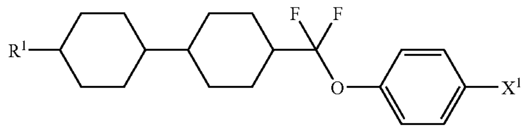
(3-87)
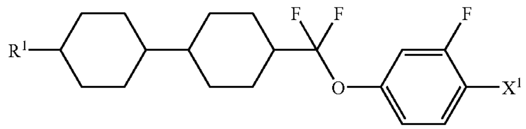
(3-88)
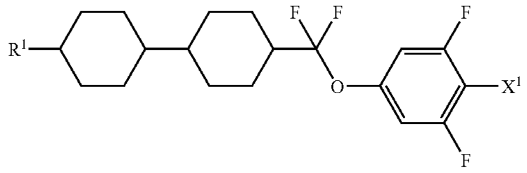
(3-89)
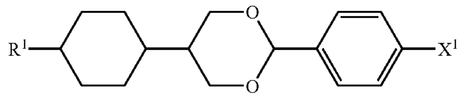
(3-90)
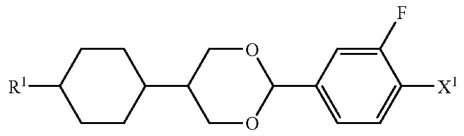
(3-91)
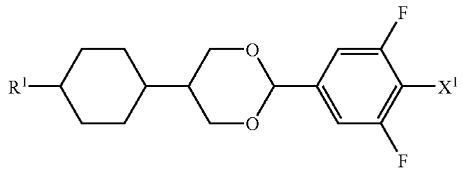
(3-92)
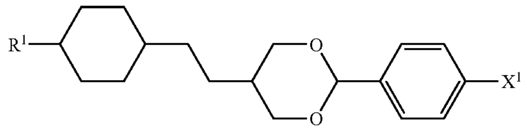
(3-93)
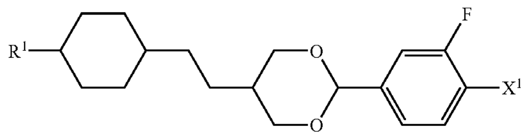
(3-94)
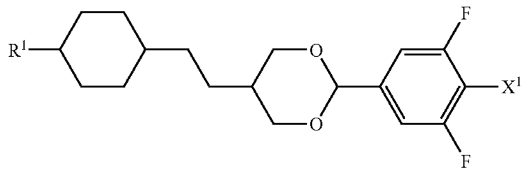
(3-95)
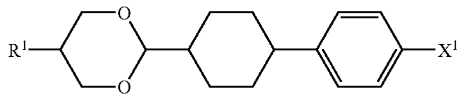
(3-96)
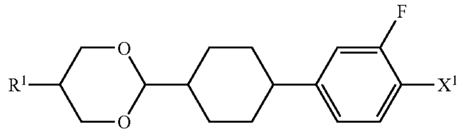
(3-97)
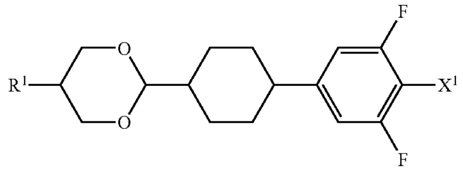

-continued
(4-1)
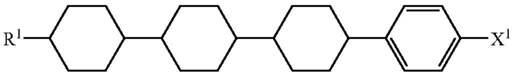
(4-2)
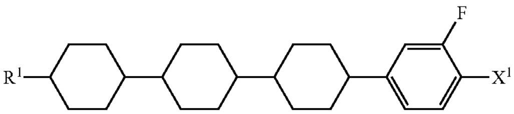
(4-3)
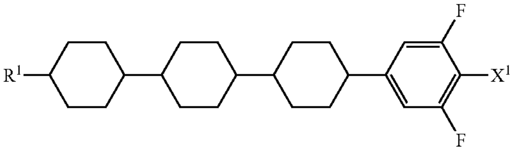
(4-4)
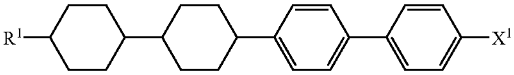
(4-5)
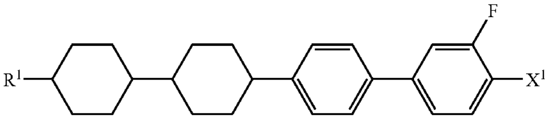
(4-6)
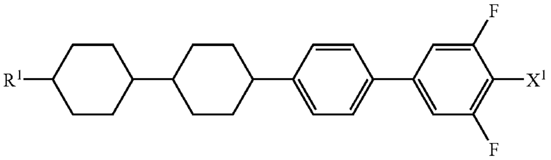
(4-7)
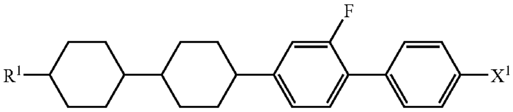
(4-8)
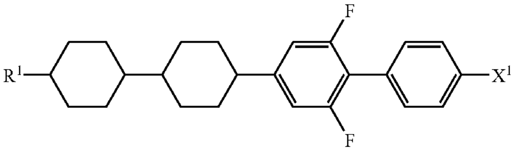
(4-9)
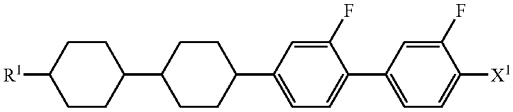
(4-10)
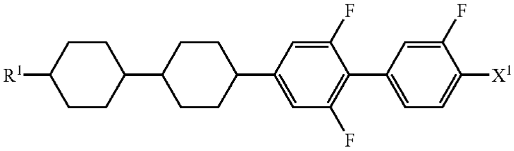
(4-11)
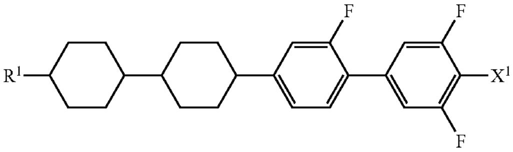
(4-12)
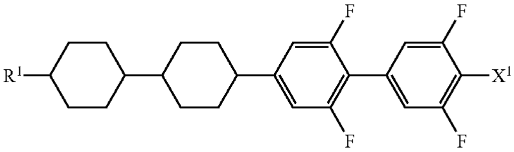
(4-13)
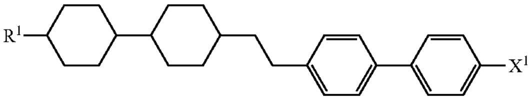
(4-14)
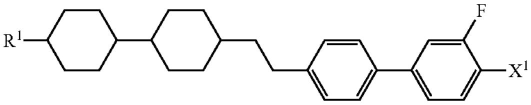
(4-15)
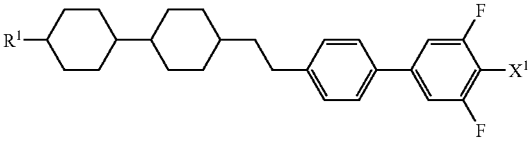
(4-16)
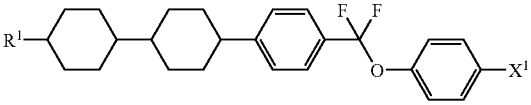
(4-17)
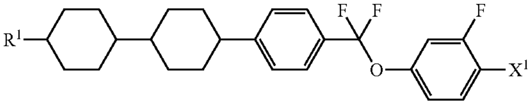
(4-18)
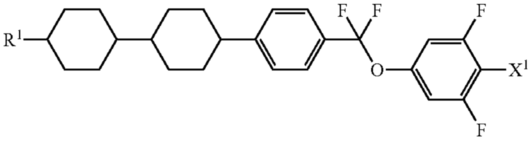

-continued
(4-19)
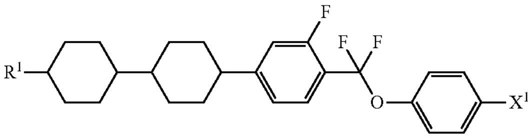
(4-20)
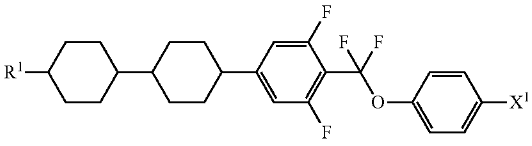
(4-21)
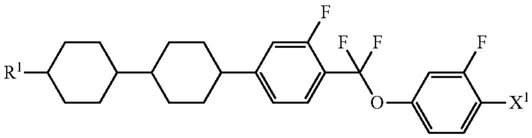
(4-22)
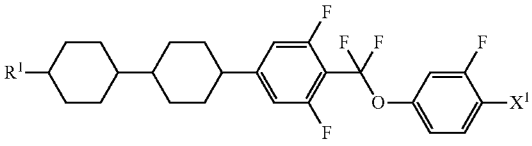
(4-23)
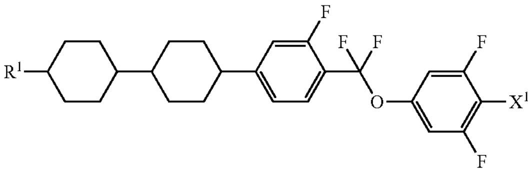
(4-24)
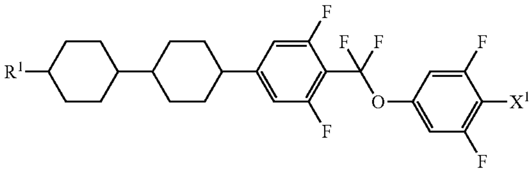
(4-25)
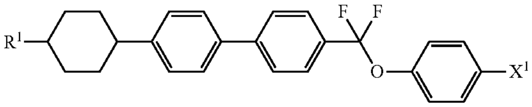
(4-26)
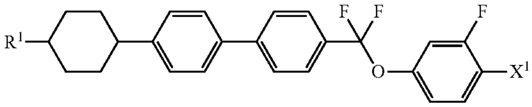
(4-27)
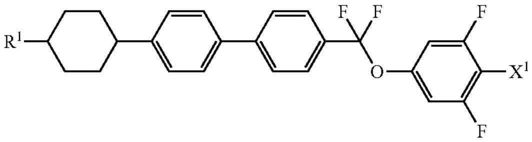
(4-28)
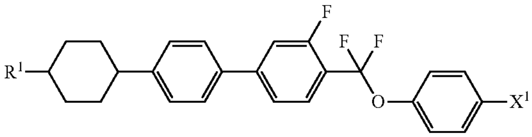
(4-29)
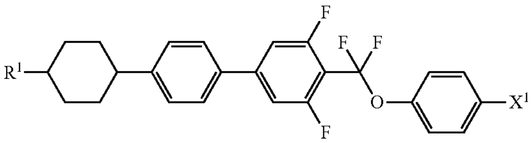
(4-30)
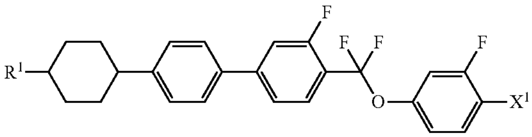
(4-31)
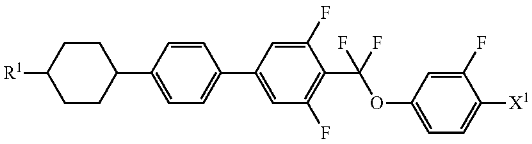
(4-32)
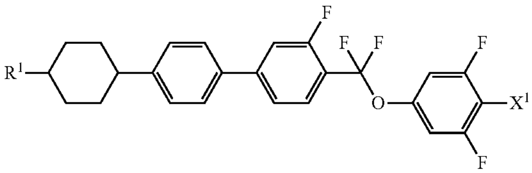
(4-33)
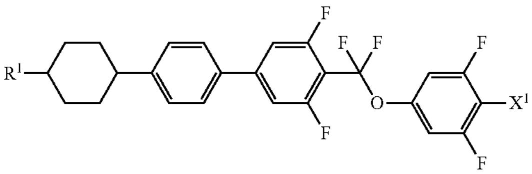
(5-1)
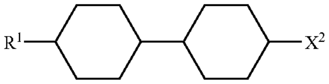
(5-2)
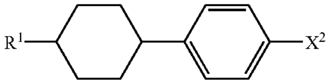

-continued
(5-3)
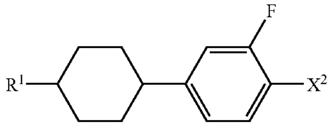
(5-4)
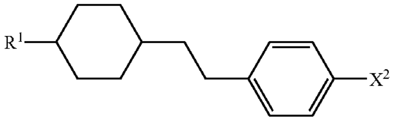
(5-5)
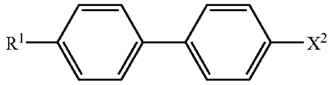
(5-6)
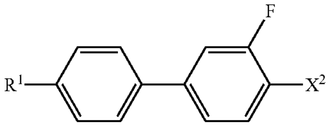
(5-7)
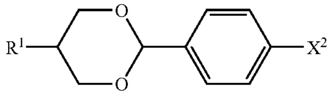
(5-8)
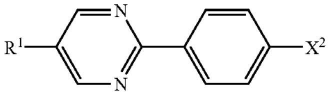
(5-9)
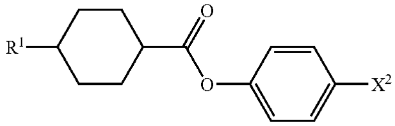
(5-10)
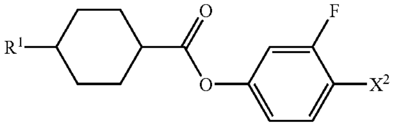
(5-11)
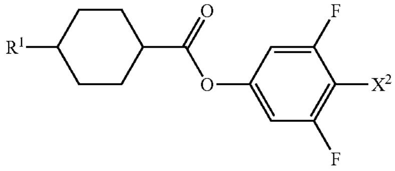
(5-12)
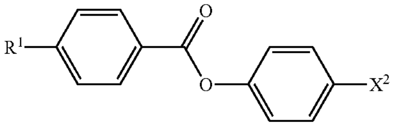
(5-13)
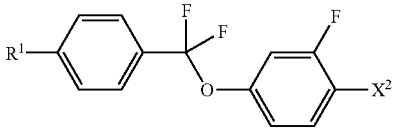
(5-14)
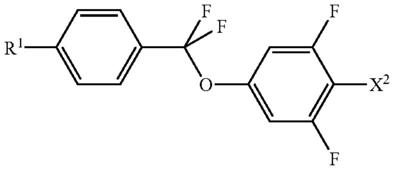
(5-15)
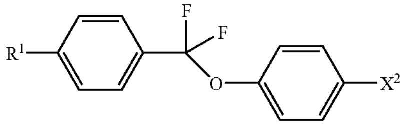
(5-16)
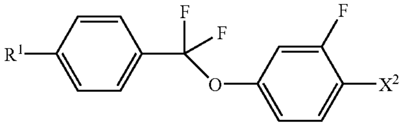
(5-17)
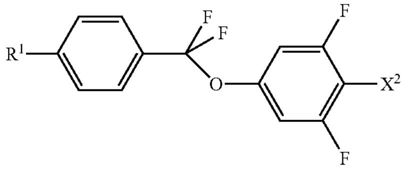
(5-18)
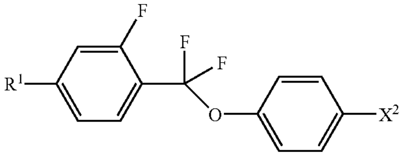
(5-19)
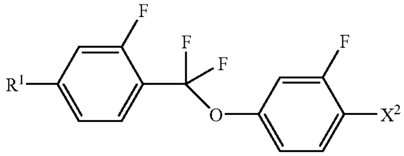
(5-20)
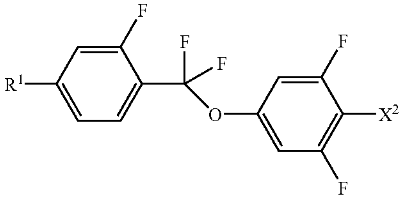
(5-21)
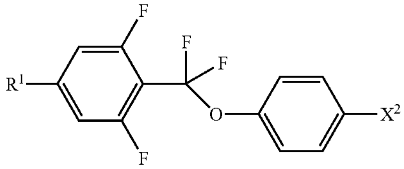
(5-22)
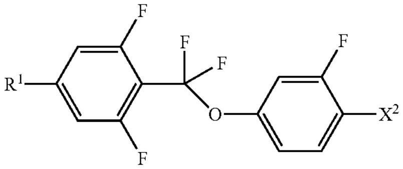

-continued
(5-23)
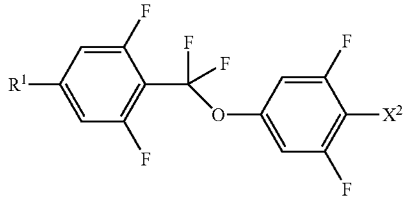
(5-24)
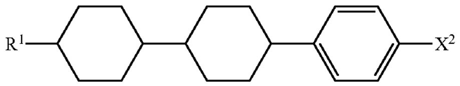
(5-25)
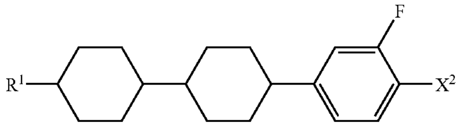
(5-26)
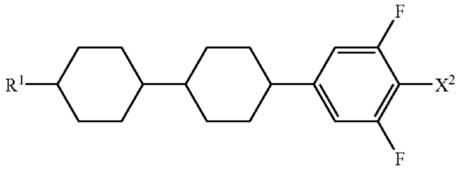
(5-27)
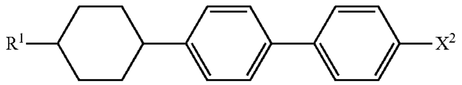
(5-28)
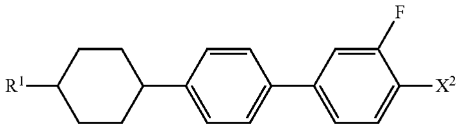
(5-29)
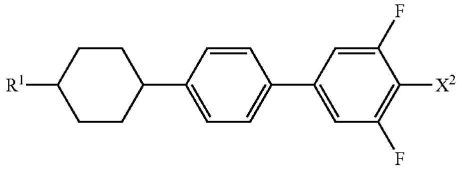
(5-30)
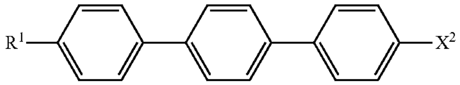
(5-31)
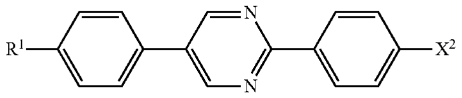
(5-32)
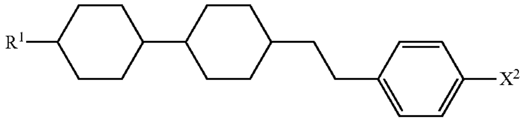
(5-33)
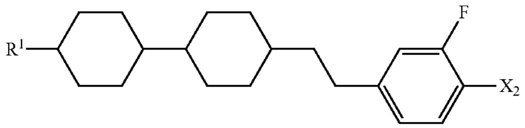
(5-34)
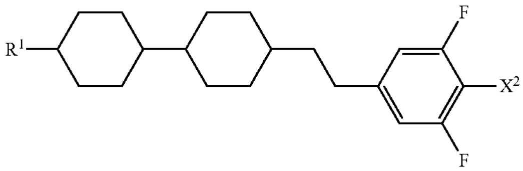
(5-35)
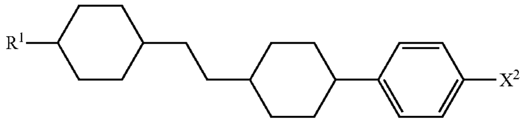
(5-36)
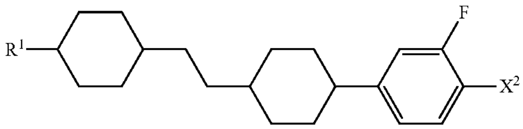
(5-37)
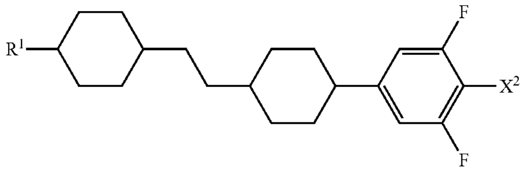
(5-38)
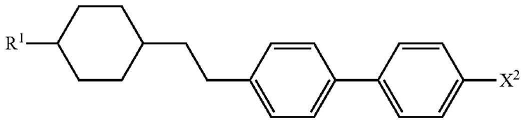
(5-39)
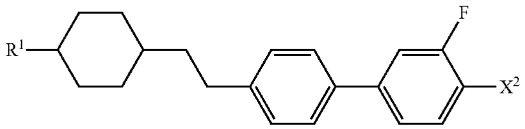
(5-40)
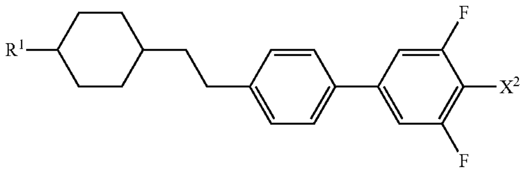

-continued
(5-41)
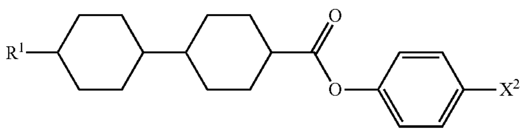
(5-42)
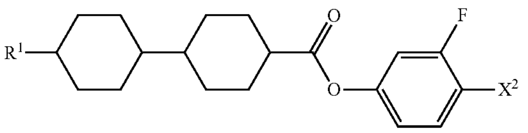
(5-43)
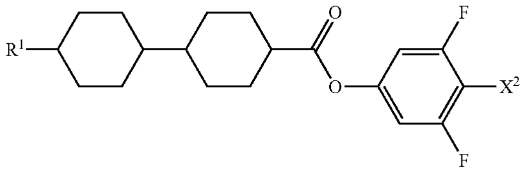
(5-44)
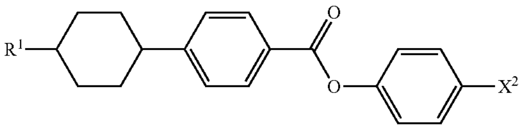
(5-45)
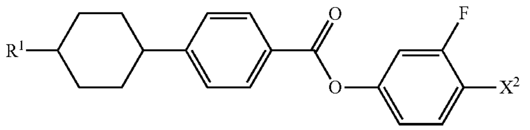
(5-46)
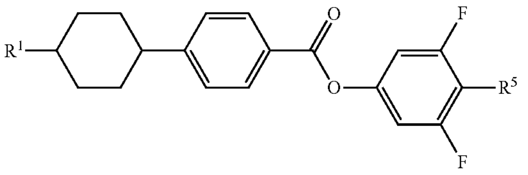
(5-47)
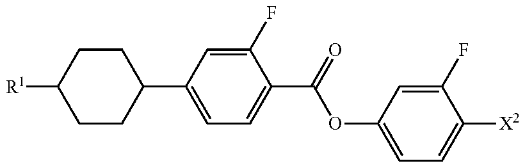
(5-48)
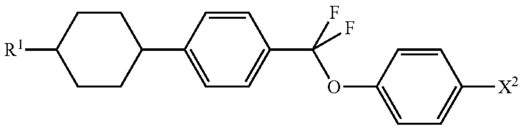
(5-49)
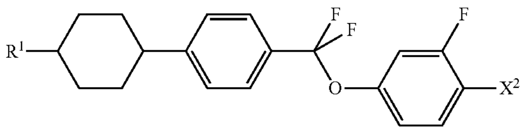
(5-50)
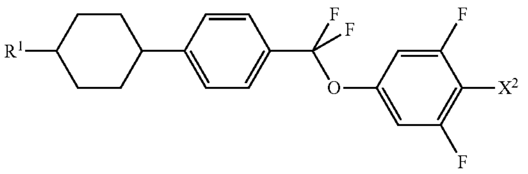
(5-51)
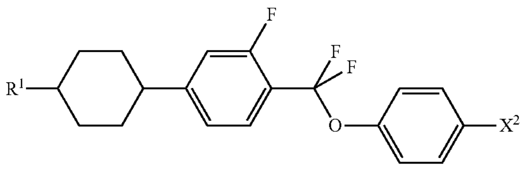
(5-52)
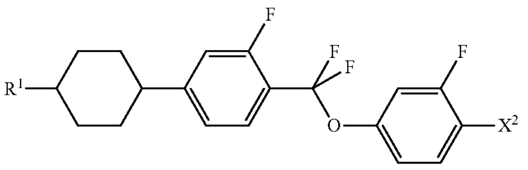
(5-53)
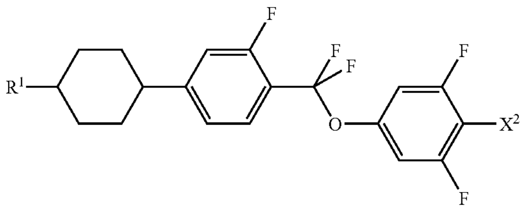
(5-54)
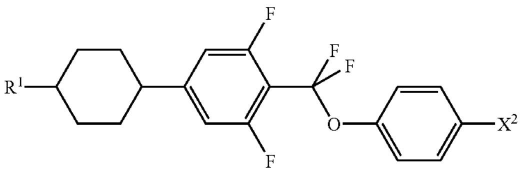
(5-55)
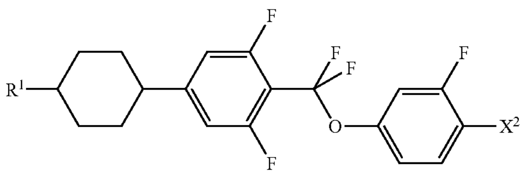
(5-56)
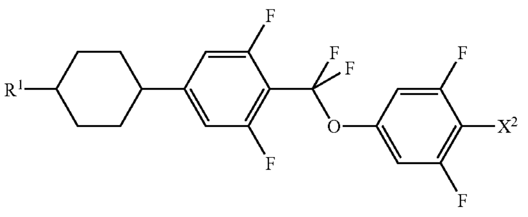

-continued
(6-1)
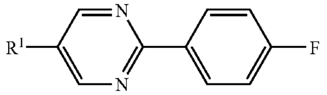
(6-2)
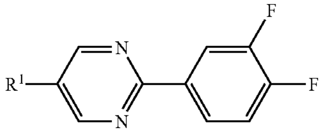
(6-3)
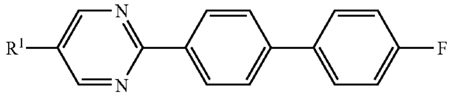
(7-1)
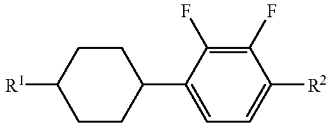
(7-2)
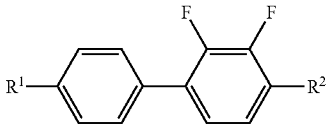
(7-3)
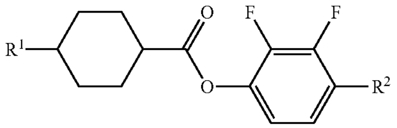
(7-4)
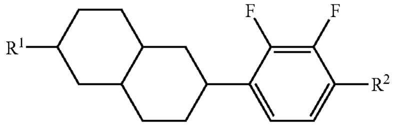
(8-1)
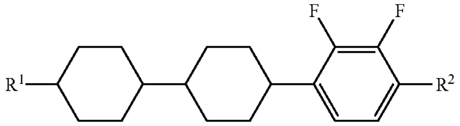
(8-2)
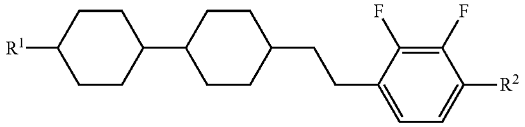
(8-3)
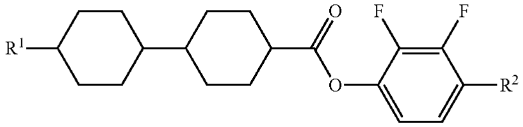
(8-4)
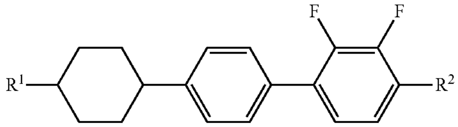
(8-5)
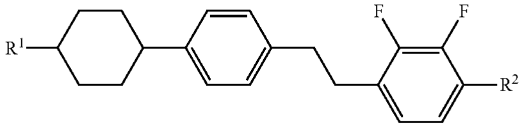
(8-6)
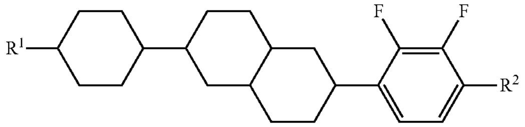
(9-1)
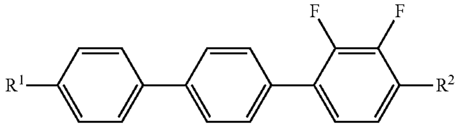
(9-2)
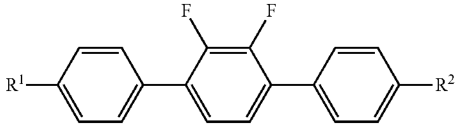
(9-3)
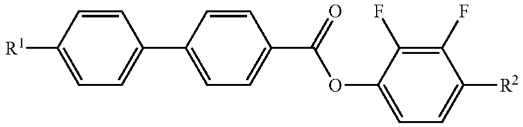
(9-4)
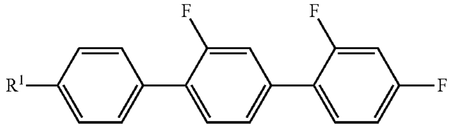
(10-1)
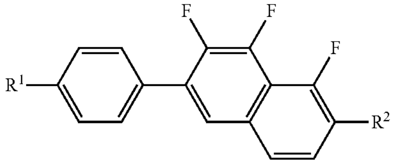
(11-1)
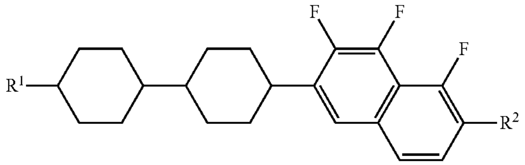
(12-1)
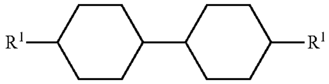

-continued
(12-2)
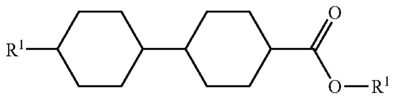
(12-4)
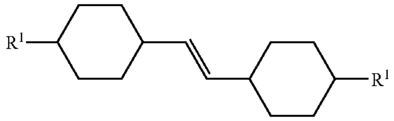
(12-6)
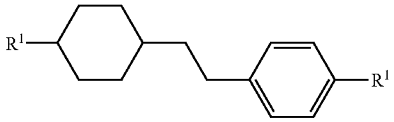
(12-8)
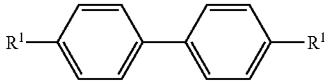
(12-10)
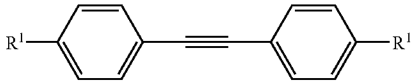
(13-1)
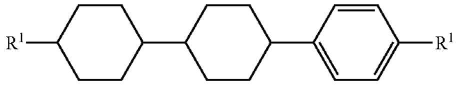
(13-3)
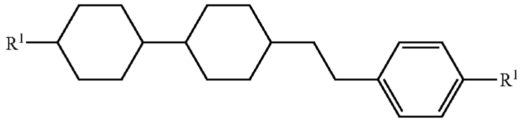
(13-5)
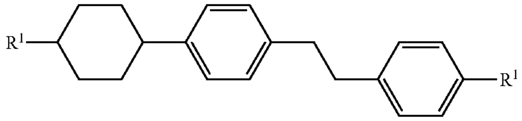
(13-7)
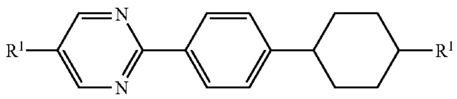
(13-9)
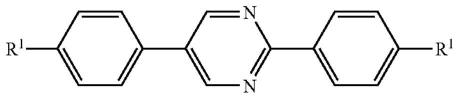
(12-3)
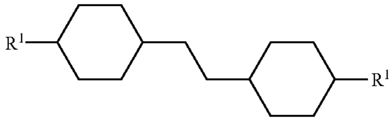
(12-5)
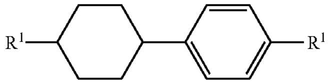
(12-7)
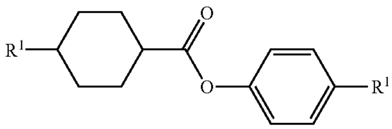
(12-9)
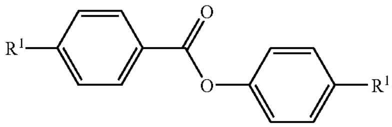
(12-11)
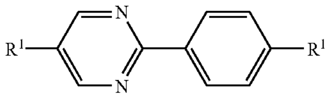
(13-2)
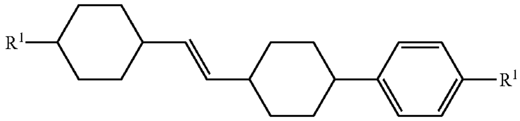
(13-4)
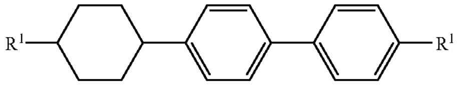
(13-6)
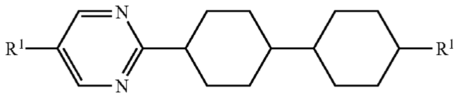
(13-8)
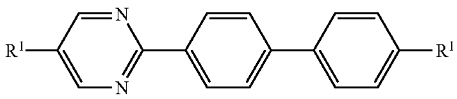
(13-10)
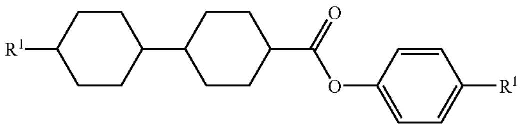
(13-11)
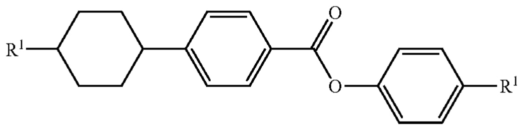

-continued
(13-12)
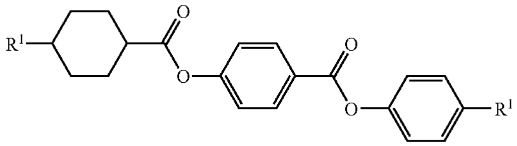
(13-13)
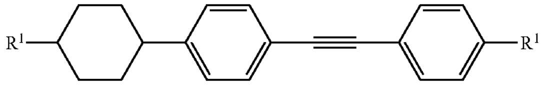
(13-14)
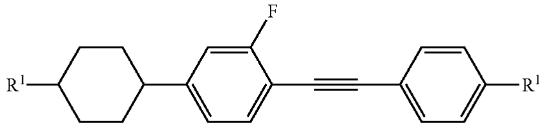
(13-15)
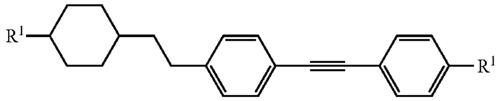
(13-16)
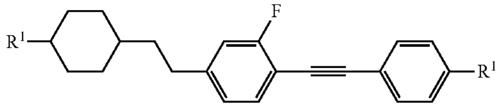
(13-17)
(13-18)
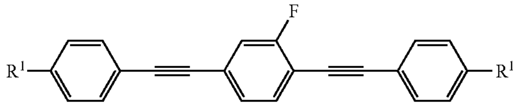
(13-19)
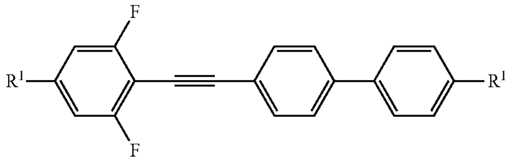
(13-20)
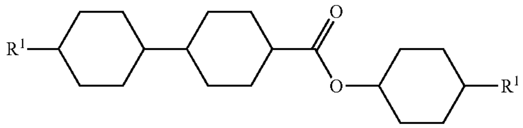
(13-21)
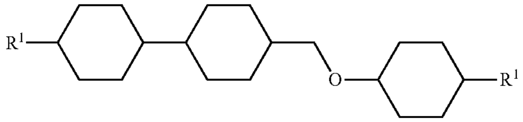
(14-1)
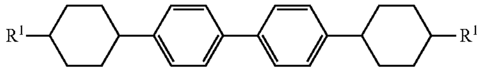
(14-2)
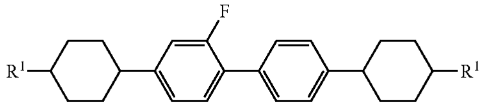
(14-3)
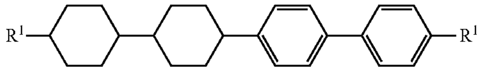
(14-4)
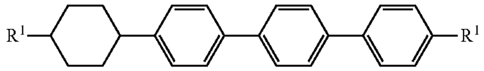
(14-5)
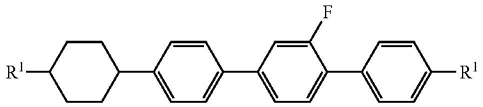
(14-6)
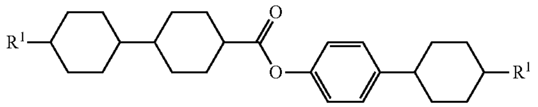
(Op-1)
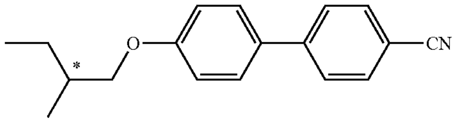
(Op-2)
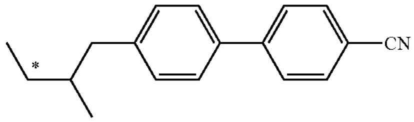
(Op-3)
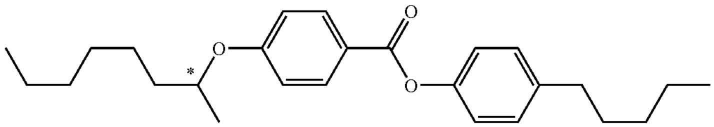

-continued
(Op-4)
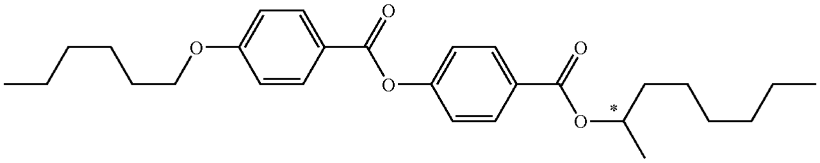
(Op-5)
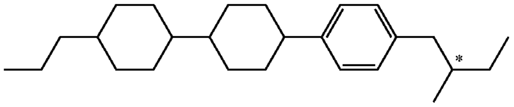
(Op-6)
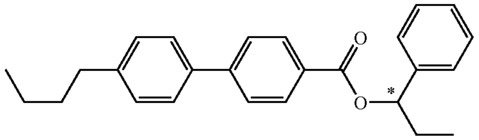
(Op-7)
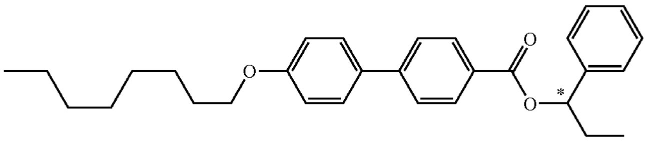
(Op-8)
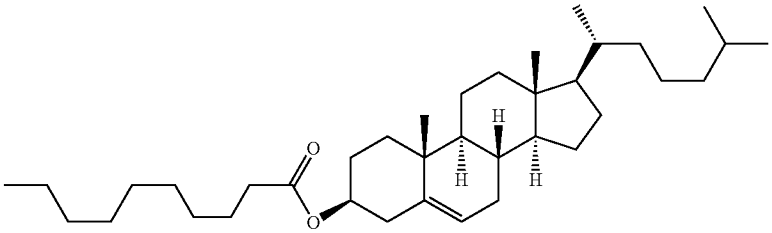
(Op-9)
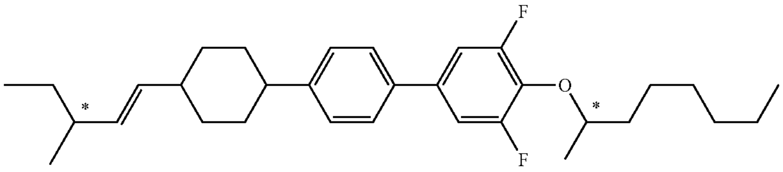
(Op-10)
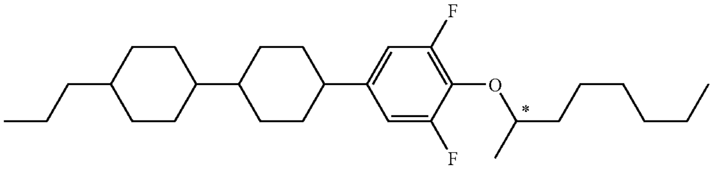
(Op-11)
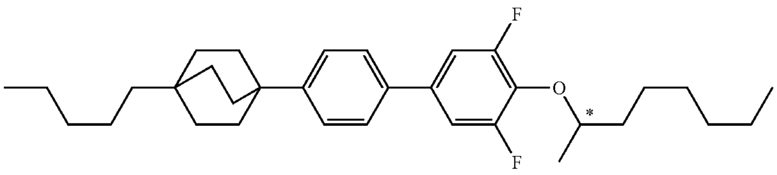
(Op-12)
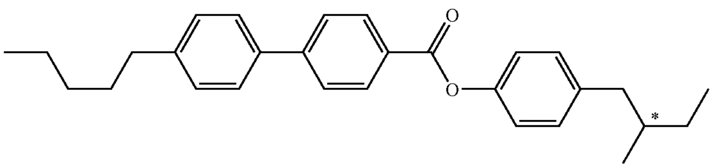

-continued (Op-13)

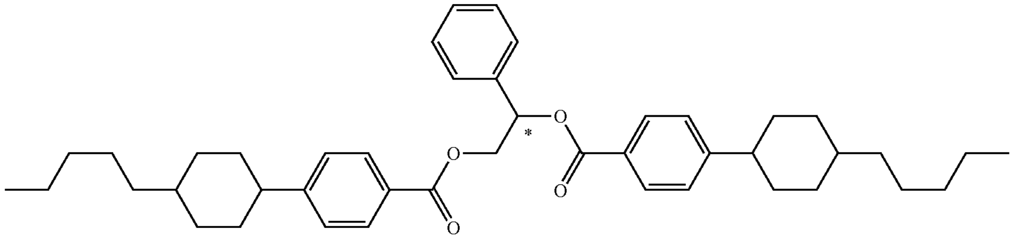

The composition of the invention may be prepared in a known manner. For example, the compounds as the components are mixed and dissolved with each other by heating. A suitable additive may be added to the composition to adjust the properties of the composition. Suitable additives are well known by a skilled person in the art. A dichroic dye (which is such a compound including merocyanine), stylyl, azo, azomethine, azoxy, quinophthalone, anthraquinone and tetrazine compounds may be added to prepare a composition for GH device. A chiral dopant may be added for providing a necessary twist angle by inducing a helical structure of the liquid crystal. Examples of the chiral dopant include the aforementioned optically active compounds (Op-1) to (Op-13).

A chiral dopant is added to the composition to adjust the pitch of twist. The pitch of twist for a TN device and a TN-TFT device is preferably in a range of from approximately 40 to approximately 200 μm. The pitch of twist for an STN device is preferably in a range of from approximately 6 to approximately 20 μm. The pitch of twist for a BTN device is preferably in a range of from approximately 1.5 to approximately 4 μm. A relatively large amount of a chiral dopant is added to a composition for a PC device. At least two chiral dopants may be added for adjusting the temperature dependency of the pitch.

A stabilizer may be added to prevent the composition from being deteriorated due to an ultraviolet ray or oxidation. Examples of the stabilizer include the following stabilizers (Sb-1) to (Sb-32).

(Sb-1)

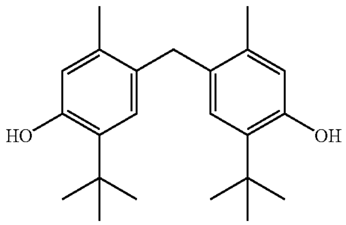

(Sb-2)

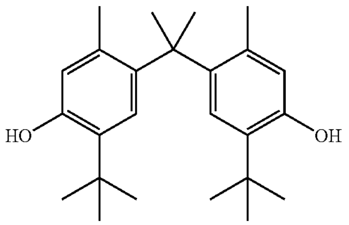

(Sb-3)

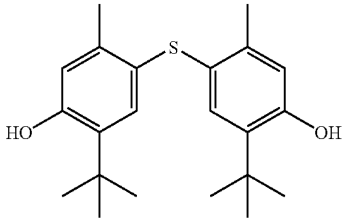

(Sb-4)

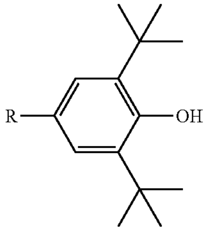

(Sb-5)

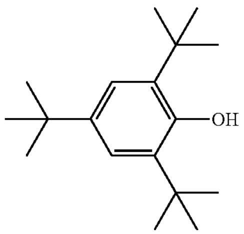

(Sb-6)

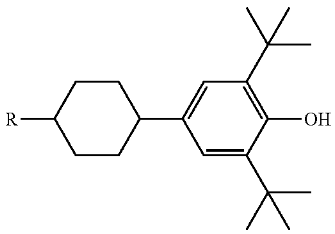

-continued
(Sb-7)
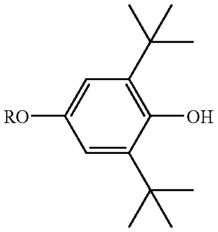
(Sb-8)
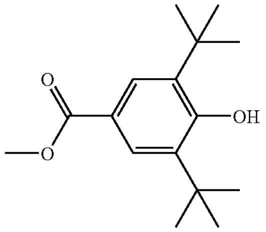
(Sb-9)
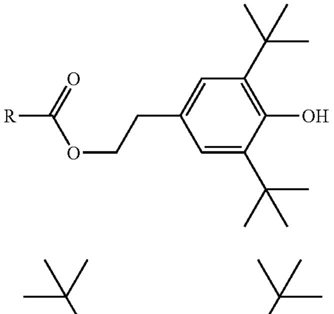
(Sb-10)
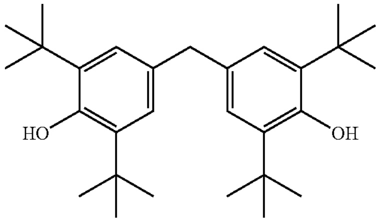
(Sb-11)
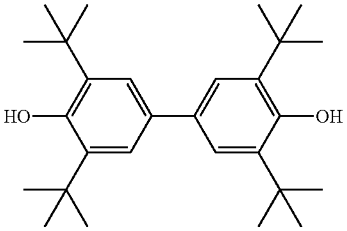
(Sb-12)
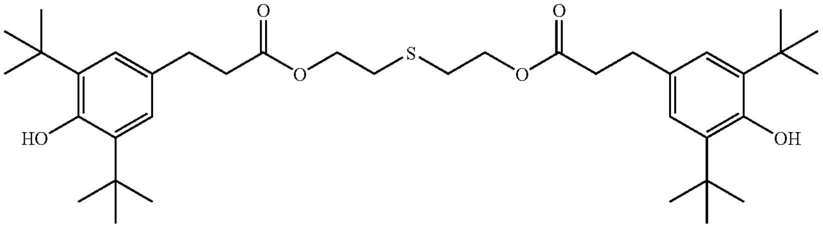
(Sb-13)
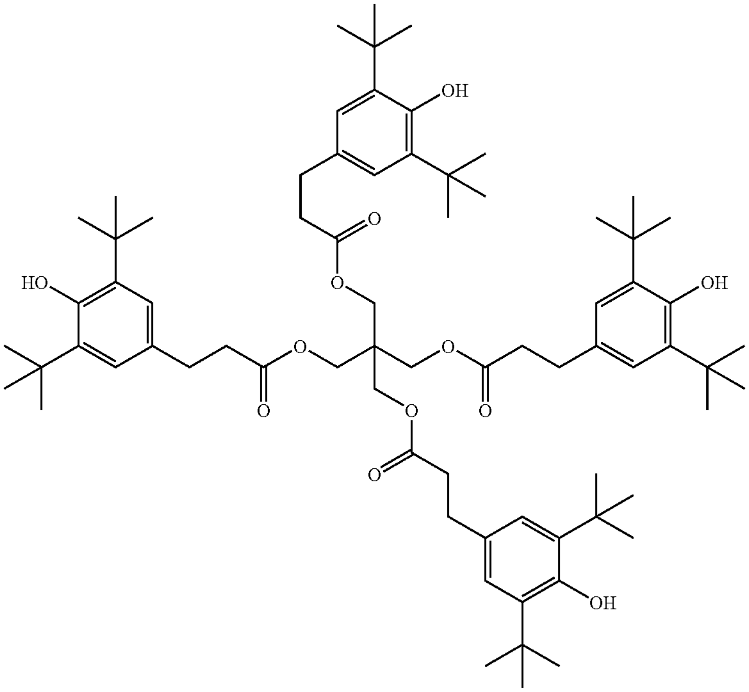

-continued
(Sb-14)
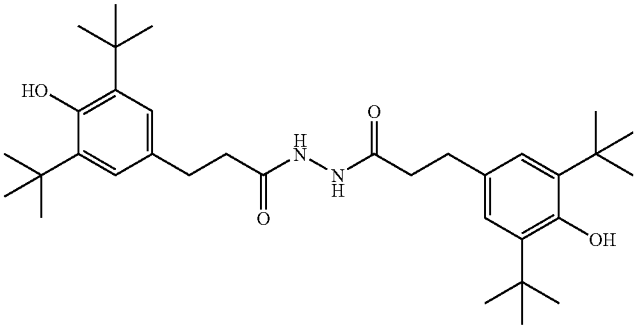
(Sb-15)
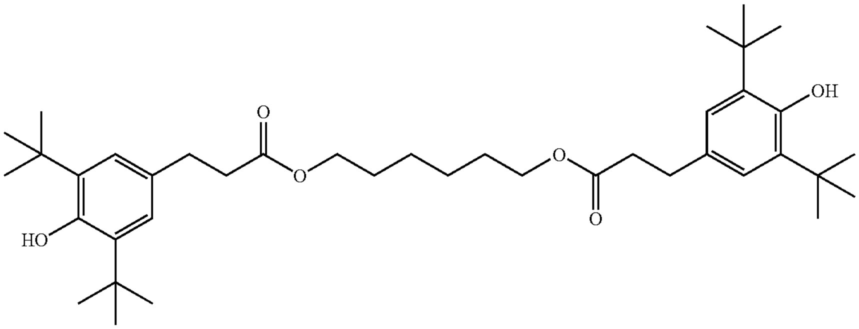
(Sb-16)
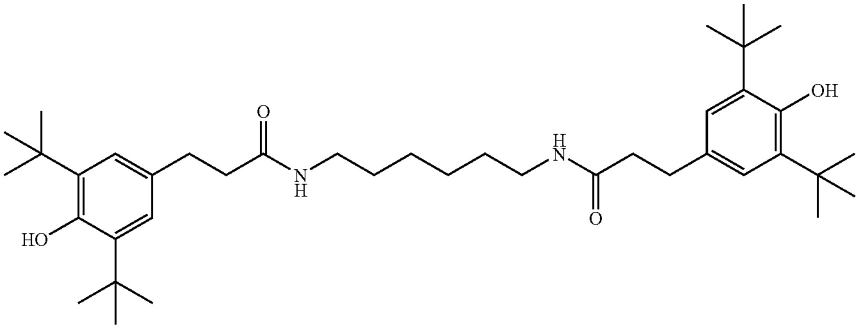
(Sb-17)
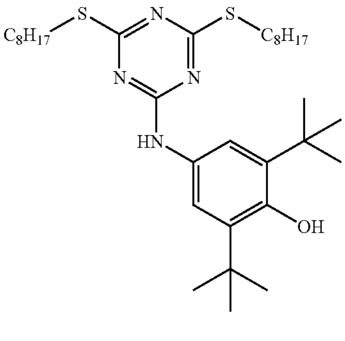
(Sb-18)
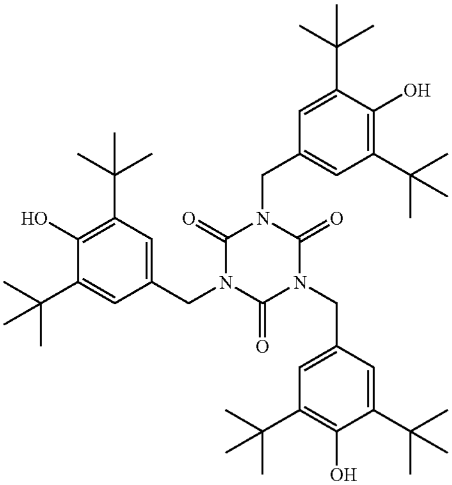

-continued
(Sb-19)
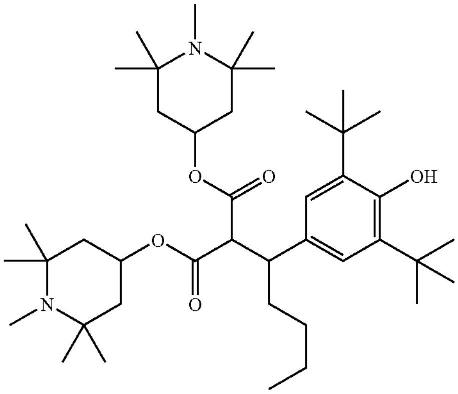
(Sb-20)
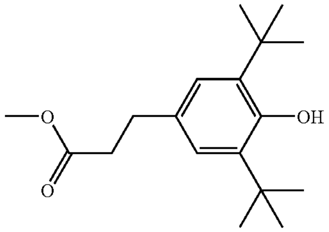
(Sb-21)
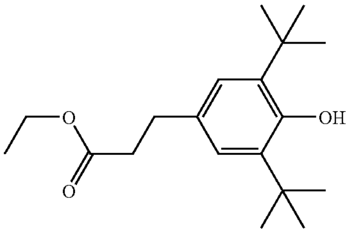
(Sb-22)
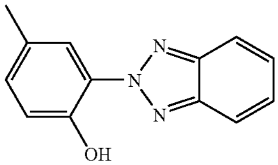
(Sb-23)
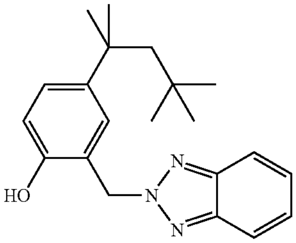
(Sb-24)
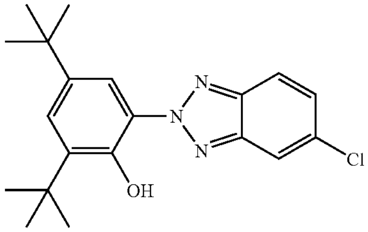
(Sb-25)
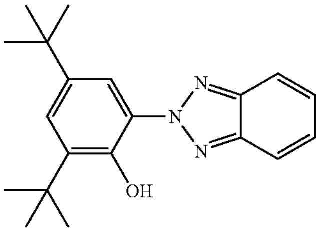
(Sb-26)
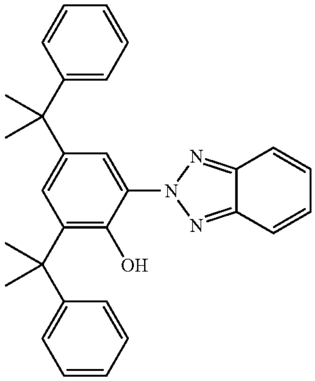
(Sb-27)
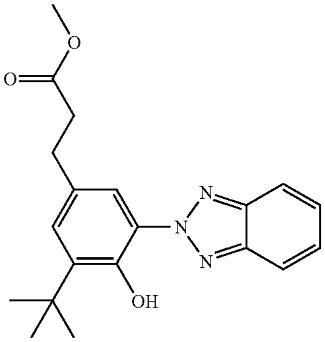
(Sb-28)
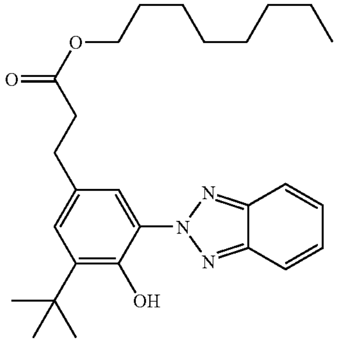

-continued (Sb-29)

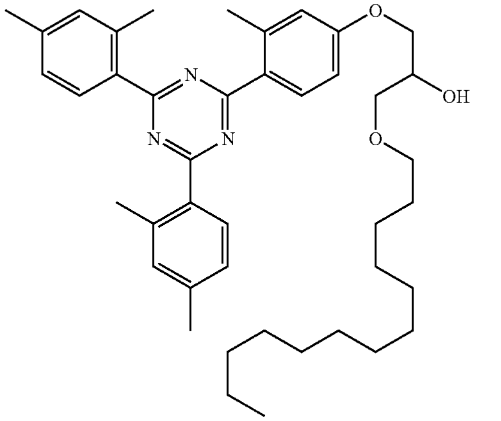

(Sb-30)

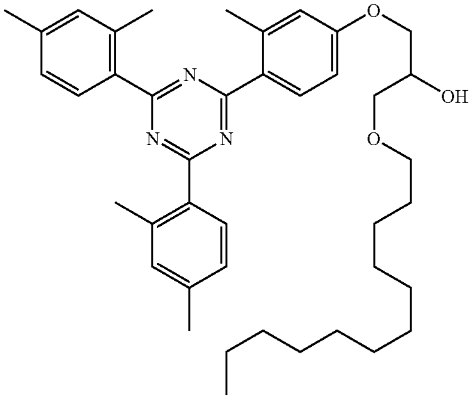

(Sb-31)

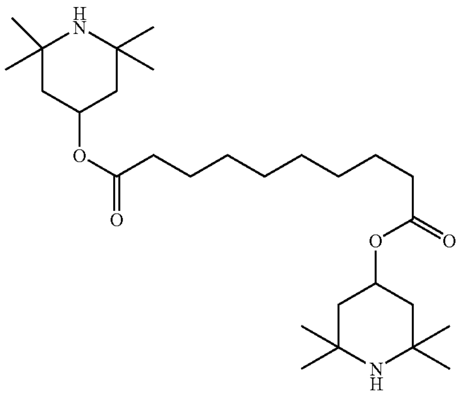

(Sb-32)

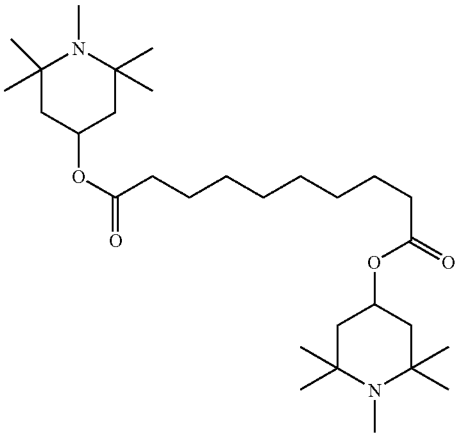

The composition of the invention may be used in such devices as PC, TN, STN, BTN, ECB, OCB, IPS and VA devices. The driving mode of the devices may be either PM or AM. The composition may also be used in an NCAP (nematic curvilinear aligned phase) device, which is produced by microencapsulating the composition, and a PD (polymer dispersed) device, which is obtained by forming a three-dimensional network polymer in the composition, such as a PN (polymer network) device.

EXAMPLES

Thirdly, the invention will be further described with reference to the following examples, but the invention is not construed as being limited to the examples. The number of the compound, such as "No. 1", corresponds to the number of the compound shown in the table in Example 14. The compounds obtained are identified by nuclear magnetic resonance spectrum, mass spectrum and the like. In the nuclear magnetic resonance spectrum, s represents a singlet, d represents a doublet, t represents a triplet, q represents a quartet, and m represents a multiplet.

The proportions (percentages) of the components and the liquid crystal compounds are percentages by weight (% by weight) based on the total weight of the liquid crystal composition. The composition is prepared by measuring the weights of the components and the liquid crystal compounds, and mixing them. Therefore, the weight percentages of the components can be easily calculated. However, it is not easy to calculate the proportions of the components easily by gas chromatography analysis of the composition. This is because the compensation coefficient depends on the kind of the liquid crystal compound. Fortunately, the compensation coefficient is approximately 1. Furthermore, influence of a fluctuation by 1% by weight in the component compounds on the characteristics of the composition is small. Accordingly, in the invention, the area ratios of the component peaks in gas chromatograph can be regarded as the weight percentages of the component compounds. In other words, the results of gas chromatography analysis (area ratios of peaks) can be understood as the weight percentages of the liquid crystal compounds without any compensation.

Upon measuring characteristic values, there are three methods, i.e., the sole compound is used as a sample as it is, the compound is mixed with a mother liquid crystal to form a sample, and the composition is used as a sample as it is. In the case where the compound is added to a mother liquid crystal, the following manner is employed: 15% by weight of the compound and 85% by weight of the mother liquid crystal are mixed to prepare a sample. The characteristic value of the compound is calculated by the extrapolation method from the value obtained by the measurement.

Extrapolated value=((Measurement value of sample)−0.85×(Measurement value of mother liquid crystal))/0.15

In cases where a smectic phase (or a crystal) is deposited at the proportion of the compound and the mother liquid crystal at 25° C., the proportion is changed to 10% by weight/90% by weight, 5% by weight/95% by weight and 1% by weight/99% by weight, in this order.

Among the values obtained by the measurement, the values obtained by using the sole compound as a sample and the values obtained by using the composition as a sample are described as experimental data as they are. The values obtained by using a mixture of the compound with a mother liquid crystal as a sample are described as experimental data as they are in some cases, or values obtained by the extrapolation method are described in the other cases.

In the case where the compound is mixed with a mother liquid crystal to form a sample, there are plural kinds of mother liquid crystals used. In the case where the compound has a positive dielectric anisotropy, a mother liquid crystal A, for example, is used as the mother liquid crystal. In the case where the compound has a negative dielectric anisotropy, a mother liquid crystal B, for example, is used as the mother liquid crystal. The mother liquid crystals A and B have the following compositions.

Mother Liquid Crystal A:

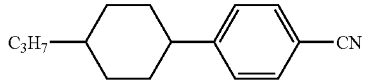
24%

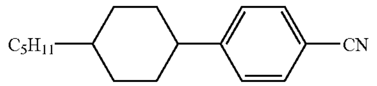
36%

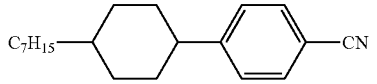
25%

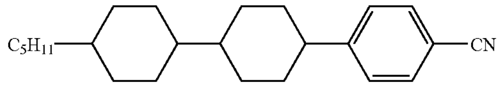
15%

Mother Liquid Crystal B:

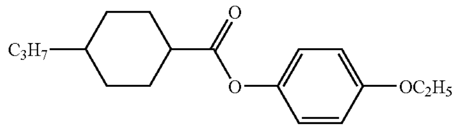
17.2%

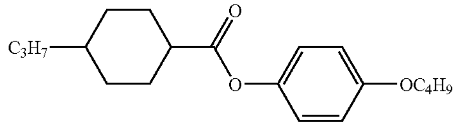
27.6 %

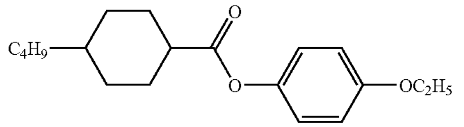
20.7%

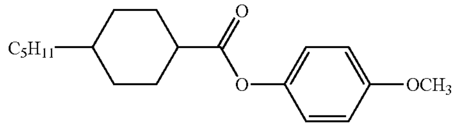
20.7%

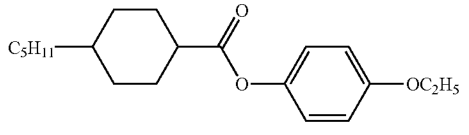
13.8%

The measurement of the characteristic values was carried out according to the following methods. Most of them are methods described in EIAJ ED-2521A of the Standard of Electric Industrial Association of Japan or methods obtained by modifying them. The TN device and the VA device used in the measurement were not equipped with TFT.

A transition temperature (° C.) was measured in one of the following manners: (1) A sample was placed on a hot plate in a melting point measuring apparatus (Hot Stage, Model FP-52, produced by Metter-Toledo International, Inc.) equipped with a polarizing microscope and was heated at the rate of 1° C. per minute. A temperature was measured when the sample underwent phase transition. (2) The measurement was carried out by using a scanning calorimeter DSC-7 System and Diamond DSC System, produced by PerkinElmer, Inc.

A crystal is expressed as C. In the case where crystals are distinguished from each other, they are expressed by $C_1$ and $C_2$. A smectic phase is expressed by S. A liquid (isotropic) is expressed by Iso. A nematic phase is expressed by N. In the case where a smectic B phase, a smectic C phase and a smectic A phase are distinguished from each other in the smectic phase, they are expressed by $S_B$, $S_C$ and $S_A$, respectively. For example, the expression of the transition temperature "C 92.9 N 196.9 Iso" means that the transition temperature from a crystal to a nematic phase (CN) is 92.9° C., and the transition temperature from a nematic phase to a liquid (NI) is 196.9° C. The other expressions are the same.

A higher limit temperature of a nematic phase (NI; ° C.): A sample was placed on a hot plate in a melting point measuring apparatus equipped with a polarizing microscope and was heated at the rate of 1° C. per minute. A temperature was measured when a part of the sample began to change from a nematic phase into an isotropic liquid. A higher limit temperature of a nematic phase may be abbreviated to "a higher limit temperature."

A low temperature compatibility (TC; % by weight): Samples were prepared by mixing a compound with a mother liquid crystal in amounts of 20% by weight, 15% by weight, 10% by weight, 5% by weight 3% by weight and 1% by weight, and were placed in a glass bottles. The samples were stored in a freezer at −20° C. for 30 days, and then the liquid crystal phase was observed. For example, in the case where a sample having the compound mixed in an amount of 20% by weight was in a crystal form or a smectic phase, and a sample having the compound mixed in an amount of 15% by weight was in a nematic phase, the low temperature compatibility TC was 15% by weight.

Viscosity (η; mPa·s, measured at 20° C.): A viscosity was measured by means of an E-type rotation viscometer.

Rotation viscosity (γ1; mPa·s, measured at 25° C.):

(1) For samples having positive dielectric anisotropy, a rotation viscosity was measured according to the method disclosed in M. Imai, et al., Molecular Crystals and Liquid Crystals, vol. 259, p. 37 (1995). The sample was placed in a TN device having a twist angle of 0° and a distance between two glass plates (cell gap) of 5 μm. The TN device was applied with a voltage in a range of from 16 V to 19.5 V stepwise by 0.5 V. After a period of 0.2 second with no application of voltage, voltage application was repeated with only one rectangular wave (rectangular pulse of 0.2 second) and application of no voltage (2 seconds). A peak current and a peak time of a transient current that was generated by the application of voltage were measured. A value of rotation viscosity was obtained from the measured values and the calculating formula (8) on page 40 of the literature by M. Imai, et al. The value of dielectric anisotropy, which was necessary for the calculation, was obtained according to the following measuring method of dielectric anisotropy with the element used for measuring the rotation viscosity.

(2) For samples having negative dielectric anisotropy, a rotation viscosity was measured according to the method disclosed in M. Imai, et al., Molecular Crystals and Liquid Crystals, vol. 259, p. 37 (1995). The sample was placed in a VA device having a distance between two glass plates (cell gap) of 20 μm. The VA device was applied with a voltage in a range of from 30 V to 50 V stepwise by 1 V. After a period of 0.2 second with no application of voltage, voltage application was repeated with only one rectangular wave (rectangular pulse of 0.2 second) and application of no voltage (2 seconds). A peak current and a peak time of a transient current that was generated by the application of voltage were measured. A value of rotation viscosity was obtained from the measured values and the calculating formula (8) on page 40 of the literature by M. Imai, et al. The value of dielectric anisotropy, which was necessary for the calculation, was obtained according to the following measuring method of the dielectric anisotropy described below.

Optical anisotropy (refractive index anisotropy Δn; measured at 25° C.): An optical anisotropy was measured by means of an Abbe refractometer having a polarizing plate attached to the eyescope with a light having a wavelength of 589 nm. After rubbing the surface of the main prism in one direction, the sample was dropped on the main prism. The refractive index n|| was measured when the polarizing direction was in parallel to the rubbing direction. The refractive index n⊥ was measured when the polarizing direction was perpendicular to the rubbing direction. A value of optical anisotropy was calculated from an equation:

$$\Delta n = n\| - n\perp$$

Dielectric anisotropy (Δ∈; measured at 25° C.):

(1) For samples having positive dielectric anisotropy, a sample was poured into a TN device having a cell gap between two glass plates of 9 μm and a twist angle of 80°. A sine wave (10 V, 1 kHz) was applied to the device, and after two seconds, a dielectric constant (∈||) that is parallel to a liquid crystal molecule was measured. A sine wave (0.5 V, 1 kHz) was applied to the device, and after two seconds, a dielectric constant (∈⊥) that is perpendicular to a liquid crystal molecule was measured. A value of dielectric anisotropy was calculated from an equation:

$$\Delta\in = \in\| - \in\perp$$

(2) For samples having negative dielectric anisotropy, a sample was poured into a VA device having a cell gap between two glass plates of 20 μm. A sine wave (0.5 V, 1 kHz) was applied to the device, and after two seconds, a dielectric constant (∈||) that is parallel to a liquid crystal molecule was measured. The sample was poured into a TN device having a cell gap between two glass plates of 9 μm and a twist angle of 80°. A sine wave (0.5 V, 1 kHz) was applied to the device, and after two seconds, a dielectric constant (∈⊥) that is perpendicular to a liquid crystal molecule was measured. A value of dielectric anisotropy was calculated from an equation:

$$\Delta\in = \in\| - \in\perp$$

Threshold voltage (Vth; measured at 25° C.; V): Only samples having a positive dielectric anisotropy were measured for threshold voltage. A threshold voltage was measured by using a brightness meter, Model LCD5100, produced by Otsuka Electronics Co., Ltd. A halogen lamp was used as a light source. A sample was poured into a TN device of a normally white mode having a cell gap between two glass plates of 9.0 μm and a twist angle of 80°. A voltage (32 Hz, rectangular wave) applied to the device was increased from 0 V to 10 V stepwise by 0.02 V. At this time, the device was irradiated with light in the perpendicular direction to measure the light amount transmitted through the device. A voltage-transmittance curve was prepared with the maximum light amount being a light transmittance of 100% and the minimum light amount being a light transmittance of 0%. The threshold voltage was designated as a voltage at which the transmittance was 90%.

Voltage holding ratio (VHR; measured at 25° C.; %): A TN device used for the measurement had a polyimide alignment film and the TN device has a cell gap of 6 μm. A sample was poured into the device, which was then sealed with an adhesive that is polymerizable with an ultraviolet ray. The TN device was charged by applying a pulse voltage (5 V for 60 microseconds). The voltage thus attenuated was measured with a high-speed voltmeter for 16.7 milliseconds, and an area A between the voltage curve and the abscissa per unit cycle was obtained. An area where the voltage was not attenuated was designated as an area B. The voltage holding ratio was a percentage of the area A with respect to the area B.

$^1$H-NMR analysis: $^1$H-NMR analysis was carried out by using DRX-500 (produced by Bruker Biospin Co., Ltd.). A solution obtained by dissolving a sample in a deuterated solvent capable of dissolving the sample, such as $CDCl_3$, was measured with a nuclear magnetic resonance apparatus at room temperature. Tetramethylsilane (TMS) was used as a standard substance of the zero point of δvalue.

Gas chromatography analysis: Gas chromatography analysis was carried out by using a gas chromatography apparatus Model GC-14B, produced by Shimadzu Corp. A carrier gas was helium (2 mL/min). The sample vaporizing chamber was set at 280° C., and the detector (FID) was set at 300° C. The component compounds were separated by using a capillary column DB-1 (length: 30 m; inner diameter: 0.32 mm; membrane thickness: 0.25 μm; stationary phase: dimethylpolysiloxane; no polarity), produced by Aligent Technologies, Inc. The column was maintained at 200° C. for 2 minutes and then increased in temperature to 280° C. at a rate of 5° C. per minute. A sample was formed into an acetone solution (0.1% by weight), and 1 μL thereof was injected into the sample vaporizing chamber. A data recorder was Cromatopac Model C-R5A, produced by Shimadzu Corp. or an equivalent thereof. The resulting gas chromatogram exhibited peak retention times and peak areas corresponding to the component compounds.

The solvent for diluting the sample may be chloroform, hexane and the like. The following capillary columns may be used for separating the component compounds: HP-1 (length: 30 m; inner diameter: 0.32 mm; membrane thickness: 0.25 μm), produced by Aligent Technologies, Inc.; Rtx-1 (length: 30 m; inner diameter: 0.32 mm; membrane thickness: 0.25 μm), produced by Restek Corporation; and BP-1 (length: 30 m; inner diameter: 0.32 mm; membrane thickness: 0.25 μm), produced by SGE International Pty. Ltd. In order to prevent compound peaks from overlapping, a capillary column CBP1-M50-025 (length: 50 m; inner diameter: 0.25 mm; membrane thickness: 0.25 μm), produced by Shimadzu Corporation may be used. The area ratios of the peaks in the gas chromatogram correspond to the ratios of the component compounds. The weight percentages of the component compounds do not completely agree with the area ratios of the peaks. In the invention, however, the weight percentages of the component compounds can be regarded as being the same as the area ratios of the peaks upon using the aforementioned capillary columns. This is because there is no large difference in compensation coefficients among the component compounds.

Example 1

Synthesis of 1-Ethoxy-2,3-difluoro-4-(2-(4-propylcyclohexyl)ethyl)-5-methylbenzene (Compound 1-1-3-4)

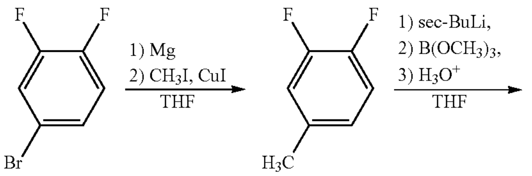

(1) (2)

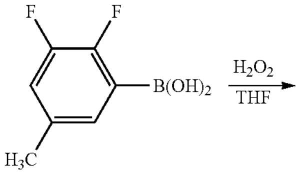

(3)

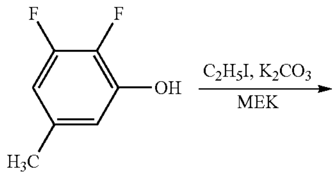

(4)

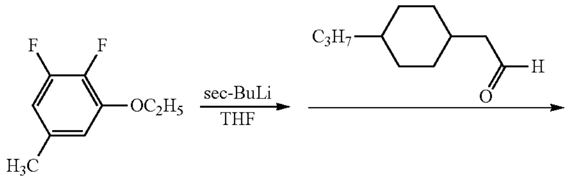

(5)

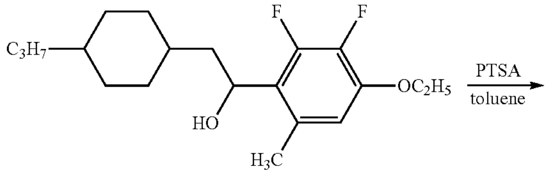

(6)

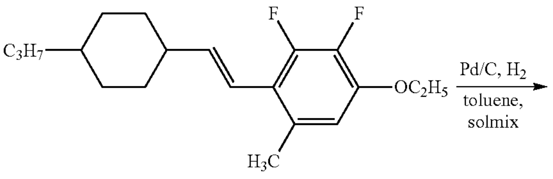

(1-1-3-17)

-continued

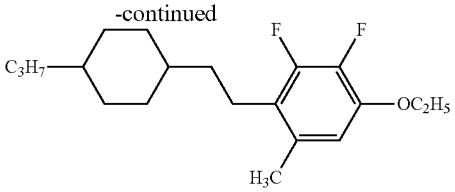

(1-1-3-4)

Step 1: Under a nitrogen atmosphere, 82.5 g of 3,4-difluorobromobenzene (1) dissolved in 150 mL of tetrahydrofuran (THF) was added dropwise to 12.5 g of dried magnesium, and after completing the dropwise addition, the mixture was refluxed for 1 hour. The resulting solution was added dropwise to 15 mL of THF having 91.5 g of methyl iodide and 12.3 g of copper(I) iodide added thereto under cooling with an ice bath. After stirring over night, a saturated ammonium chloride aqueous solution was added thereto to terminate the reaction. The aqueous layer was extracted with diethyl ether, which was added to the organic layer, and the organic layer was washed with a saturated saline and then dried over anhydrous magnesium sulfate. The organic layer was distilled to obtain 37.6 g of 2,3-difluorotoluene (2)

Step 2: Under a nitrogen atmosphere, 30 g the compound (2) having been dissolved in 240 mL of THF was cooled to −78° C., to which 284 mL of sec-BuLi (1 M/L) was added, followed by stirring at the same temperature for 2 hours. 48.7 g of trimethyl borate having been dissolved in 120 mL of THF was added dropwise thereto at the same temperature, followed by stirring at the same temperature for 1 hour, and the mixture was increased in temperature to room temperature and then stirred over night. Under cooling with an ice bath, 200 mL of 3N hydrochloric acid was added to the mixture. The aqueous layer was extracted with diethyl ether, which was added to the organic layer, and the organic layer was washed with a saturated saline and then dried over anhydrous magnesium sulfate. The solvent was distilled off to obtain 48.8 g of 2,3-difluoro-5-methylphenylboric acid (3), which was used in the next step without purification.

Step 3: Under cooling with an ice bath, 53.1 g of aqueous hydrogen peroxide was slowly added dropwise to the compound (3) having been dissolved in 300 mL, followed by stirring at room temperature for 3 hours. Under cooling with an ice bath, 100 mL of a saturated sodium hydrogen sulfite aqueous solution was added dropwise thereto to terminate the reaction. The aqueous layer was extracted with diethyl ether, which was added to the organic layer, and the organic layer was washed with a saturated sodium hydrogen sulfite aqueous solution and a saturated saline and then dried over anhydrous magnesium sulfate. The solvent was distilled off in vacuo to obtain 22.7 g of 2,3-difluoro-5-methylphenol (4).

Step 4: 21.7 g of potassium carbonate and 36.6 g of ethyl iodide having been dissolved in 100 mL of methyl ethyl ketone (MEK) were added to the compound (4) having been dissolved in 200 mL of MEK, followed by refluxing under heating for 3 hours. After terminating the reaction by adding water, the aqueous phase was extracted with diethyl ether, washed with a 2N sodium hydroxide aqueous solution and a saturated saline, and then dried over anhydrous magnesium sulfate. The solvent was distilled off in vacuo to obtain 19.2 g of 2,3-difluoro-5-methylethoxybenzene (5).

Step 5: Under a nitrogen atmosphere, 10.0 g of the compound (5) having been dissolved in 100 mL of THF was cooled to −78° C., to which 72.6 g of sec-BuLi (1 M/L) was added, followed by stirring at the same temperature for 2 hours. Thereafter, 11.7 g of 2-(4-propylcyclohexyl)acetaldehyde having been dissolved in 10 mL of THF was added dropwise thereto at the same temperature, followed by stirring at the same temperature for 1 hour, and after increasing the temperature to room temperature, stirring over night. After terminating the reaction by adding a saturated ammonium chloride aqueous solution, the aqueous layer was extracted with diethyl ether, which was added to the organic layer, and the organic layer was washed with saturated saline and then dried over anhydrous magnesium sulfate. The solvent was distilled off to obtain 1-(2,3-difluoro-4-ethoxy-6-methylphenyl)-2-(4-propylcyclohexyl)ethanol (6), which was used in the next step without purification.

Step 6: 0.55 g of p-toluenesulfonic acid monohydrate was added to the compound (6) having been dissolved in 120 mL of toluene, and the mixture was heated under stirring by using a Dean-Stork trap until completion of azeotrope of water. After terminating the reaction by adding water, the aqueous layer was extracted with toluene, washed with a saturated saline, and then dried over anhydrous magnesium sulfate. The solvent was distilled off under reduced pressure, and the resulting residue was purified by silica gel column chromatography and then subjected to recrystallization to obtain 2.01 g of 1-(2,3-difluoro-4-ethoxy-6-methylphenyl)-2-(4-propylcyclohexyl)ethene (Compound 1-1-3-17) as colorless crystals.

$^1$H-NMR ($CDCl_3$): δ (ppm); 6.51 (d, 1H), 6.15 (d, 1H), 6.08 (dd, 1H), 4.08 (q, 2H), 2.25 (s, 3H), 2.09-2.03 (m, 1H), 1.85-1.78 (m, 4H), 1.43 (t, 3H), 1.36-1.29 (m, 2H), 1.25-1.16 (m, 5H), 0.957 (q, 2H), 0.886 (t, 3H)

Step 7: 0.1 g of Pd/C was added to the compound 1-1-3-17 having been dissolved in 20 mL of toluene and 20 mL of Solmix, and under a hydrogen atmosphere, the mixture was stirred at room temperature until hydrogen was not absorbed. Pd/C was removed, and the solvent was distilled off. The residue was purified by silica gel column chromatography and recrystallization to obtain 2.01 g of 1-(2,3-difluoro-4-ethoxy-6-methylphenyl)-2-(4-propylcyclohexyl)ethane (Compound 1-2-3-4) as colorless crystals.

Phase transition point (° C.): C 34.4 Iso $^1$H-NMR ($CDCl_3$): δ (ppm); 6.51 (d, 1H), 4.07 (q, 2H), 2.58-2.54 (m, 2H), 2.23 (s, 3H), 1.82-1.73 (m, 4H), 1.42 (t, 3H), 1.36-1.29 (m, 4H), 1.27-1.13 (m, 4H), 0.957-0.950 (m, 7H)

Example 2

Synthesis of 1-Ethoxy-2,3-difluoro-4-(2-(4-pentylcyclohexyl)ethyl)-5-methylbenzene (Compound 1-1-3-5)

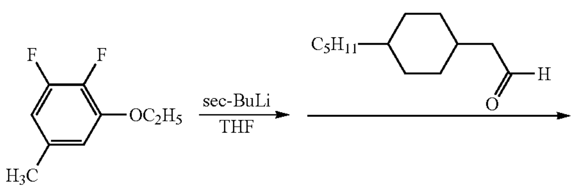

(5)

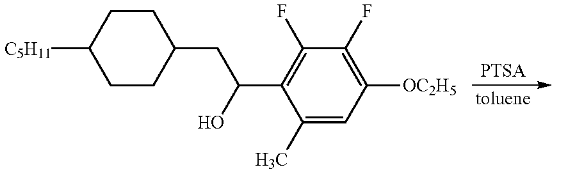

(7)

-continued

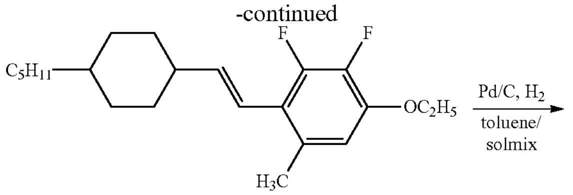

(1-1-3-18)

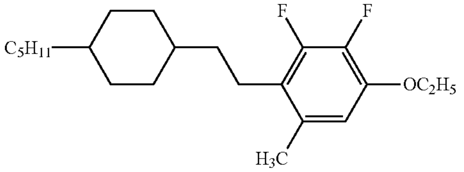

(1-1-3-5)

Step 1: Under a nitrogen atmosphere, 10.0 mL of the compound (5) having been dissolved in 100 mL of THF was cooled to −78° C., to which 72.6 mL of sec-BuLi (1 M/L) was added, followed by stirring at the same temperature for 2 hours. Thereafter, 13.3 g of 2-(4-pentylcyclohexyl)acetaldehyde having been dissolved in 13.3 mL of THF was added dropwise thereto at the same temperature, followed by stirring at the same temperature for 1 hour, and after increasing the temperature to room temperature, stirring over night. After terminating the reaction by adding a saturated ammonium chloride aqueous solution, the aqueous layer was extracted with diethyl ether, which was added to the organic layer, and the organic layer was washed with saturated saline and then dried over anhydrous magnesium sulfate. The solvent was distilled off to obtain 1-(2,3-difluoro-4-ethoxy-6-methylphenyl)-2-(4-pentylcyclohexyl)ethanol (7), which was used in the next step without purification.

Step 2: 0.55 g of p-toluenesulfonic acid monohydrate was added to the compound (7) having been dissolved in 120 mL of toluene, and the mixture was heated under stirring by using a Dean-Stork trap until completion of azeotrope of water. After terminating the reaction by adding water, the aqueous layer was extracted with toluene, washed with saturated saline, and then dried over anhydrous magnesium sulfate. The solvent was distilled off under reduced pressure, and the resulting residue was purified by silica gel column chromatography and then subjected to recrystallization to obtain 6.53 g of 1-(2,3-difluoro-4-ethoxy-6-methylphenyl)-2-(4-pentylcyclohexyl)ethene (Compound 1-1-3-18) as colorless crystals.

$^1$H-NMR ($CDCl_3$): δ (ppm); 6.51 (d, 1H), 6.15 (d, 1H), 6.08 (dd, 1H), 4.08 (q, 2H), 2.25 (s, 3H), 2.09-2.03 (m, 1H), 1.85-1.78 (m, 4H), 1.43 (t, 3H), 1.36-1.29 (m, 2H), 1.25-1.16 (m, 7H), 0.957-0.950 (m, 7H)

Step 3: 0.27 g of Pd/C was added to 6.53 g of the compound 1-1-3-18 having been dissolved in 50 mL of toluene and 50 mL of Solmix, and under a hydrogen atmosphere, the mixture was stirred at room temperature until hydrogen was not absorbed. Pd/C was removed, and the solvent was distilled off. The residue was purified by silica gel column chromatography and recrystallization to obtain 1.8 g of 1-(2,3-difluoro-4-ethoxy-6-methylphenyl)-2-(4-pentylcyclohexyl)ethane (Compound 1-1-3-5) as colorless crystals.

Phase transition point (° C.): C 41.8 Iso $^1$H-NMR ($CDCl_3$): δ (ppm); 6.51 (d, 1H), 4.07 (q, 2H), 2.57-2.54 (m, 2H), 2.23 (s, 3H), 1.82-1.73 (m, 4H), 1.42 (t, 3H), 1.36-1.23 (m, 8H), 1.17-1.15 (m, 4H), 0.957-0.950 (m, 7H)

Example 3

Synthesis of 1-Ethoxy-2,3-difluoro-4-(2-(4-(4-propylcyclohexyl)cyclohexyl)ethyl)-5-methylbenzene (Compound 1-3-3-1)

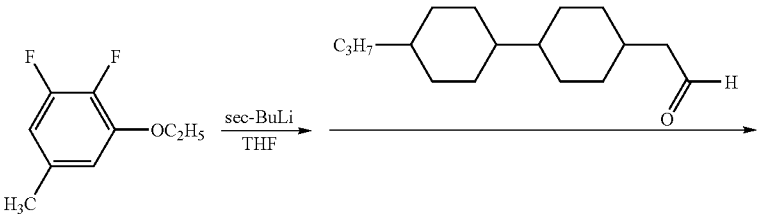

(5)

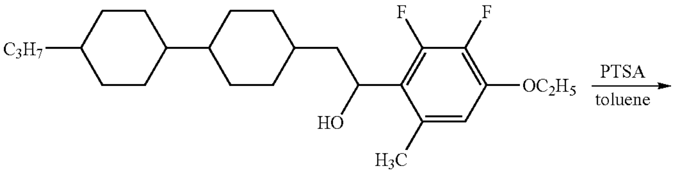

(8)

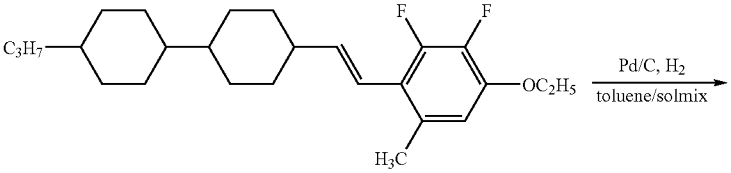

(1-3-3-9)

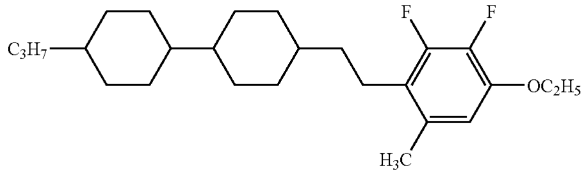

(1-3-3-1)

Step 1: Under a nitrogen atmosphere, 10.0 g of the compound (5) having been dissolved in 100 mL of THF was cooled to −78° C., to which 72.6 mL of sec-BuLi (1 M/L) was added, followed by stirring at the same temperature for 2 hours. Thereafter, 17.5 g of 2-(4-(4-propylcyclohexyl)cyclohexyl)acetaldehyde having been dissolved in 18 mL of THF was added dropwise thereto at the same temperature, followed by stirring at the same temperature for 1 hour, and after increasing the temperature to room temperature, stirring over night. After terminating the reaction by adding a saturated ammonium chloride aqueous solution, the aqueous layer was extracted with diethyl ether, which was added to the organic layer, and the organic layer was washed with a saturated saline and then dried over anhydrous magnesium sulfate. The solvent was distilled off to obtain 1-(2,3-difluoro-4-ethoxy-6-methylphenyl)-2-(4-(4-propylcyclohexyl)cyclohexyl) ethanol (8), which was used in the next step without purification.

Step 2: 0.55 g of p-toluenesulfonic acid monohydrate was added to the compound (8) having been dissolved in 120 mL of toluene, and the mixture was heated under stirring by using a Dean-Stork trap until completion of azeotrope of water. After terminating the reaction by adding water, the aqueous layer was extracted with toluene, washed with saturated saline, and then dried over anhydrous magnesium sulfate. The solvent was distilled off under reduced pressure, and the resulting residue was purified by silica gel column chromatography and then subjected to recrystallization to obtain 11.2 g of 1-(2,3-difluoro-4-ethoxy-6-methylphenyl)-2-(4-(4-propylcyclohexyl)cyclohexyl)ethene (Compound 1-3-3-9) as colorless crystals.

Phase transition point (° C.): C 92.9 N 196.9 Iso $^1$H-NMR ($CDCl_3$): δ (ppm); 6.51 (d, 1H), 6.15 (d, 1H), 6.07 (dd, 1H), 4.08 (q, 2H), 2.26 (s, 3H), 2.09-2.02 (m, 1H), 1.85 (d, 2H), 1.79-1.70 (m, 4H), 1.43 (t, 3H), 1.34-1.27 (m, 2H), 1.21-0.94 (m, 11H), 0.957 (q, 2H), 0.871 (t, 3H), 0.886-0.811 (m, 2H)

Step 3: 0.31 g of Pd/C was added to 6.20 g of the compound 1-3-3-9 having been dissolved in 50 mL of toluene and 50 mL of Solmix, and under a hydrogen atmosphere, the mixture was stirred at room temperature until hydrogen was not absorbed. Pd/C was removed, and the solvent was distilled off. The residue was purified by silica gel column chromatography and recrystallization to obtain 5.03 g of 1-(2,3-difluoro-4-ethoxy-6-methylphenyl)-2-(4-(4-propylcyclohexyl)cyclohexyl)ethane (Compound 1-3-3-1) as colorless crystals.

Phase transition point (° C.): $C_1$ 68.6 $C_2$ 87.1 N 127.4 Iso $^1$H-NMR ($CDCl_3$): δ (ppm); 6.51 (d, 1H), 4.07 (q, 2H), 2.57-2.54 (m, 2H), 2.22 (s, 3H), 1.83 (d, 2H), 1.75-1.68 (m, 6H), 1.42 (t, 3H), 1.35-1.26 (m, 4H), 1.22-1.12 (m, 4H), 1.01-0.903 (m, 8H), 0.881-0.801 (m, 5H)

Example 4

Synthesis of 1-Ethoxy-2,3-difluoro-4-(2-(4-(4-pentylcyclohexyl)cyclohexyl)ethyl)-5-methylbenzene (Compound 1-3-3-2)

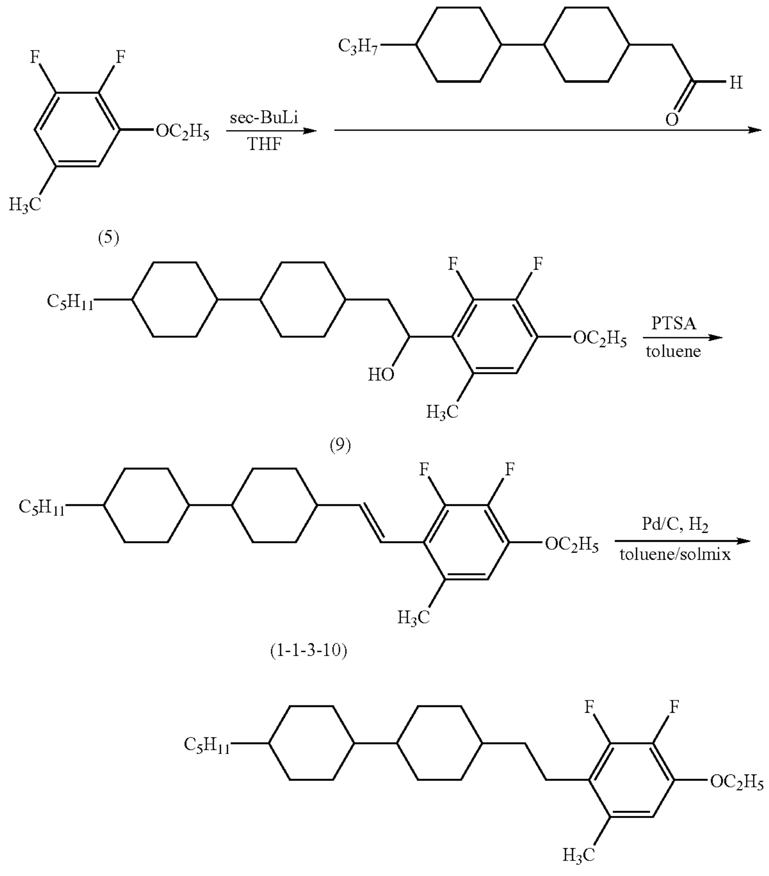

(5) (9) (1-1-3-10) (1-3-3-2)

Step 1: Under a nitrogen atmosphere, 7.0 g of the compound (5) having been dissolved in 70 mL of THF was cooled to −78° C., to which 48.8 mL of sec-BuLi (1 M/L) was added, followed by stirring at the same temperature for 2 hours. Thereafter, 13.6 g of 2-(4-(4-pentylcyclohexyl)cyclohexyl) acetaldehyde having been dissolved in 13 mL of THF was added dropwise thereto at the same temperature, followed by stirring at the same temperature for 1 hour, and after increasing the temperature to room temperature, stirring over night. After terminating the reaction by adding a saturated ammonium chloride aqueous solution, the aqueous layer was extracted with diethyl ether, which was added to the organic layer, and the organic layer was washed with saturated saline and then dried over anhydrous magnesium sulfate. The solvent was distilled off to obtain 1-(2,3-difluoro-4-ethoxy-6-methylphenyl)-2-(4-(4-pentylcyclohexyl)cyclohexyl)ethanol (9), which was used in the next step without purification.

Step 2: 0.16 g of p-toluenesulfonic acid monohydrate was added to the compound (9) having been dissolved in 60 mL of toluene, and the mixture was heated under stirring by using a Dean-Stork trap until completion of azeotrope of water. After terminating the reaction by adding water, the aqueous layer was extracted with toluene, washed with saturated saline, and then dried over anhydrous magnesium sulfate. The solvent was distilled off under reduced pressure, and the resulting residue was purified by silica gel column chromatography and then subjected to recrystallization to obtain 11.2 g of 1-(2,3-difluoro-4-ethoxy-6-methylphenyl)-2-(4-(4-pentylcyclohexyl)cyclohexyl)ethene (Compound 1-3-3-10) as colorless crystals.

Step 3: 0.08 g of Pd/C was added to 1.65 g of the compound 1-3-3-10 having been dissolved in 12.5 mL of toluene and 12.5 mL of Solmix, and under a hydrogen atmosphere, the mixture was stirred at room temperature until hydrogen was not absorbed. Pd/C was removed, and the solvent was distilled off. The residue was purified by silica gel column chromatography and recrystallization to obtain 0.83 g of 1-(2,3-difluoro-4-ethoxy-6-methylphenyl)-2-(4-(4-pentylcyclohexyl)cyclohexyl)ethane (Compound 1-3-3-2) as colorless crystals.

Phase transition point (° C.): C 63.93 (SmB 63.3) N 131.8 Iso $^1$H-NMR ($CDCl_3$): δ (ppm); 6.51 (d, 1H), 4.07 (q, 2H), 2.57-2.54 (m, 2H), 2.22 (s, 3H), 1.83 (d, 2H), 1.76-1.68 (m, 6H), 1.42 (t, 3H), 1.35-1.18 (m, 8H), 1.16-1.07 (m, 4H), 1.01-0.924 (m, 8H), 0.881-0.801 (m, 5H)

Example 5

Synthesis of 1-Ethoxy-2,3-difluoro-4-(2-(4-(4-propylcyclo-hexyl)cyclohexyl)methoxy)-5-methylbenzene (Compound 1-3-3-5)

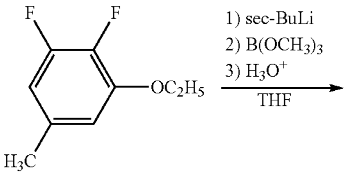

(5)

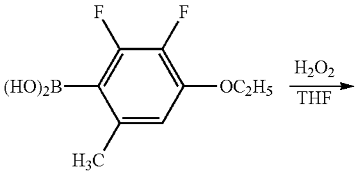

(10)

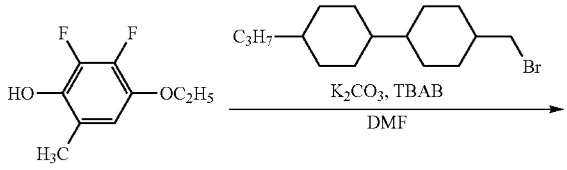

(11)

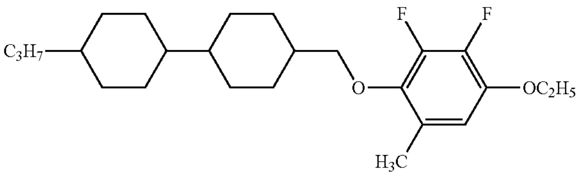

(1-3-3-5)

Step 1: Under a nitrogen atmosphere, 5.0 g of the compound (5) having been dissolved in 30 mL of THF was cooled to −78° C., to which 35.2 mL of sec-BuLi (1 M/L) was added, followed by stirring at the same temperature for 2 hours. Thereafter, 6.03 g of trimethyl borate having been dissolved in 15 mL of THF was added dropwise thereto at the same temperature, followed by stirring at the same temperature for 1 hour, and after increasing the temperature to room temperature, stirring over night. Under cooling with an ice bath, 25 mL of 3N hydrochloric acid was added thereto, and the aqueous layer was extracted with diethyl ether, which was added to the organic layer. The organic layer was washed with saturated saline and then dried over anhydrous magnesium sulfate. The solvent was distilled off to obtain 6.19 g of 2,3-difluoro-4-ethoxy-6-methylphenylboric acid (10), which was used in the next step without purification.

Step 2: Under cooling with an ice bath, 6.57 g of aqueous hydrogen peroxide was slowly added dropwise to the compound (10) having been dissolved in 37 mL of THF, followed by stirring at room temperature for 3 hours. Under cooling with an ice bath, 20 mL of a saturated sodium hydrogen sulfite aqueous solution was added thereto to terminate the reaction, and an aqueous layer was extracted with diethyl ether, which was added to the organic layer. The organic layer was washed with a saturated sodium hydrogensufite aqueous solution and saturated saline, and then dried over anhydrous magnesium sulfate. The solvent was distilled off under reduced pressure to obtain 3.84 g of 2,3-difluoro-5-methylphenol (11).

Step 3: 5.0 g of 1-(4-(4-propylcyclohexyl)cyclohexyl)-4-bromomethane, 2.5 g of the compound (11) and 0.22 g of tetrabutylammonium bromide (TBAB) were dissolved in 70 mL of N,N-dimethylformamide (DMF), to which 2.3 g of potassium carbonate was added, followed by refluxing by heating for 3 hours. After terminating the reaction by adding water, the aqueous layer was extracted with toluene, which was added to the organic layer, and the organic layer was washed with saturated saline and then dried over anhydrous magnesium sulfate. The solvent was distilled off, and the residue was purified by silica gel column chromatography and recrystallization to obtain 3.78 g of 1-ethoxy-2,3-difluoro-4-(2-(4-(4-propylcyclohexyl)cyclohexyl)methoxy)-5-methylbenzene (Compound 1-3-3-5) as colorless crystals.

Phase transition point (° C.): $C_1$ 33.0 $C_2$ 61.7 N 128.9 Iso $^1$H-NMR ($CDCl_3$): δ (ppm); 6.49 (dd, 1H), 4.05 (q, 2H), 3.73 (d, 2H), 2.20 (s, 3H), 1.94 (d, 2H), 1.78-1.70 (m, 8H), 1.41 (t, 3H), 1.32-1.27 (m, 2H), 1.15-1.13 (m, 2H), 1.04-0.936 (m, 8H), 0.869 (t, 3H), 0.854-0.808 (m, 2H)

Example 6

Synthesis of 1-Ethoxy-2,3-difluoro-4-(2-(4-(4-pentylcyclohexyl)cyclohexyl)methoxy)-5-methylbenzene (Compound 1-3-3-6)

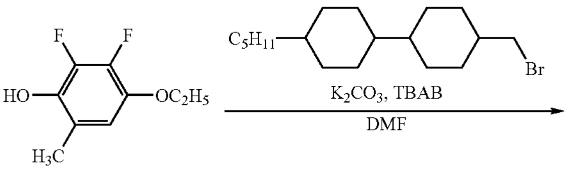

(11)

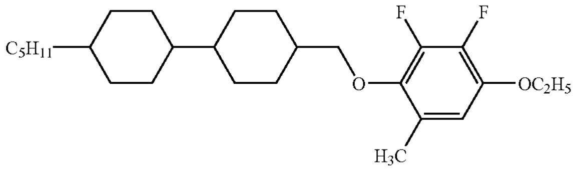

(1-3-3-6)

Step 1: 10.9 g of 1-(4-(4-pentylcyclohexyl)cyclohexyl)-4-bromomethane, 5.0 g of the compound (11) and 0.44 g of tetrabutylammonium bromide (TBAB) were dissolved in 140 mL of N,N-dimethylformamide (DMF), to which 4.6 g of potassium carbonate was added, followed by refluxing by heating for 3 hours. After terminating the reaction by adding water, the aqueous layer was extracted with toluene, which was added to the organic layer, and the organic layer was washed with a saturated saline and then dried over anhydrous magnesium sulfate. The solvent was distilled off, and the residue was purified by silica gel column chromatography and recrystallization to obtain 4.43 g of 1-ethoxy-2,3-difluoro-4-(2-(4-(4-pentylcyclohexyl)cyclohexyl)methoxy)-5-methylbenzene (Compound 1-3-3-6) as colorless crystals.

Phase transition point (° C.): C 63.1 N 130.0 Iso $^1$H-NMR ($CDCl_3$): δ (ppm); 6.49 (dd, 1H), 4.05 (q, 2H), 3.73 (d, 2H), 2.20 (s, 3H), 1.94 (d, 2H), 1.78-1.70 (m, 8H), 1.41 (t, 3H), 1.31-1.23 (m, 6H), 1.15-1.13 (m, 2H), 1.04-0.936 (m, 8H), 0.869 (t, 3H), 0.854-0.808 (m, 2H)

Example 7

Synthesis of 1-Ethoxy-2,3-difluoro-4-(2-(4-(4-propylcyclohexyl)cyclohexyl)-1,1-difluoromethoxy)-5-methylbenzene (Compound 1-3-3-7)

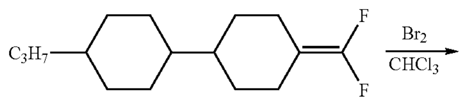

(12)

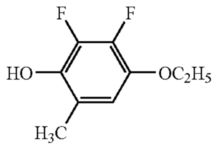

(11)

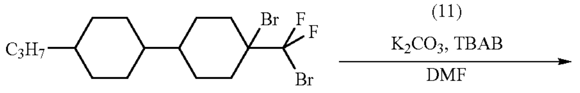

(13)

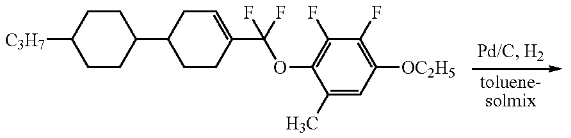

(14)

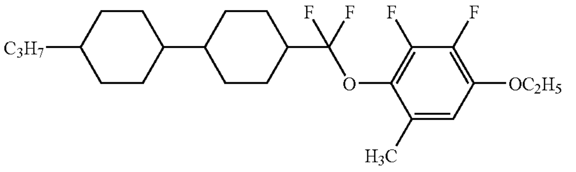

(1-3-3-7)

Step 1: Under a nitrogen atmosphere, 25.6 g of the compound (12) having been dissolved in 180 mL of chloroform was cooled to −30° C., to which 16.7 g of bromine having been dissolved in 18 mL of chloroform, followed by stirring at the same temperature for 30 minutes. Water was added thereto, and the aqueous layer was extracted with heptane, which was added to the organic layer. The organic layer was washed with a saturated sodium hydrogen sulfite aqueous solution and water, and then dried over anhydrous magnesium sulfate. The solvent was distilled off to obtain 37.5 g of 1-bromo-1-bromodifluoromethyl-4-(4-propylcyclohexyl) cyclohexane (13).

Step 2: 5.0 g of a compound (11), 7.73 g of potassium carbonate and 0.43 g of TBAB were dissolved in 35 mL of DMF. After increasing the temperature to 110° C., the compound (13) having been dissolved in 30 mL of DMF was added dropwise thereto at the same temperature, followed by stirring under heating at the same temperature for 4 hours. After cooling to room temperature, water was added thereto to terminate the reaction, and the aqueous layer was extracted with toluene, which was added to the organic layer. The organic layer was washed with a saturated sodium hydrogensufite aqueous solution and saturated saline, and then dried over anhydrous magnesium sulfate. The solvent was distilled off under reduced pressure to obtain 6.22 g of 5-ethoxy-3,4-difluoro-1-methyl-2-(4-(4-propylcyclohexyl)cyclohexenyl)-difluoromethoxybenzene (14).

Step 3: 0.31 g of Pd/C was added to 6.22 g of the compound (14) having been dissolved in 50 mL of toluene and 50 mL of Solmix, and under a hydrogen atmosphere, the mixture was stirred at room temperature until hydrogen was not absorbed. Pd/C was removed by filtration, and the solvent was distilled off. The residue was purified by silica gel column chromatography and recrystallization to obtain 1.75 g of 1-ethoxy-2,3-difluoro-4-(2-(4-(4-propylcyclohexyl)cyclohexyl)difluoromethoxy)-5-methylbenzene (Compound 1-3-3-7) as colorless crystals.

Phase transition point (° C.): C 92.5 N 143.9 Iso $^1$H-NMR ($CDCl_3$): δ (ppm); 6.58 (dd, 1H), 4.08 (q, 2H), 2.21 (s, 3H, 2.11-2.03 (m, 3H), 1.85 (d, 2H), 1.77-1.70 (m, 4H), 1.43 (t, 3H), 1.46-1.38 (m, 2H), 1.34-1.27 (m, 2H), 1.14 (t, 3H), 1.09-0.94 (m, 6H), 0.872 (t, 3H), 0.886-0.815 (m, 2H)

Example 8

Synthesis of 1-(1,1-Difluoro-1-(2,3-difluoro-4-ethoxy-6-methylphenyl)methoxy)-4-(4-propylcyclohexyl)benzene (Compound 1-3-3-15)

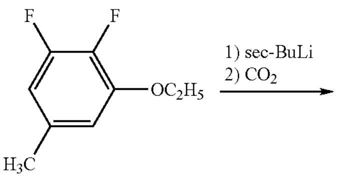

(5)

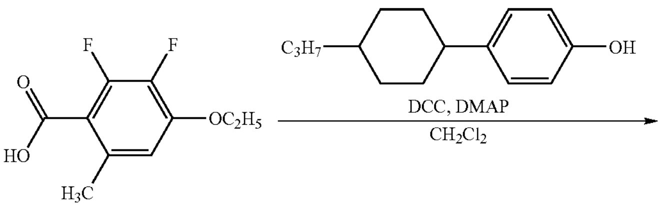

(15)

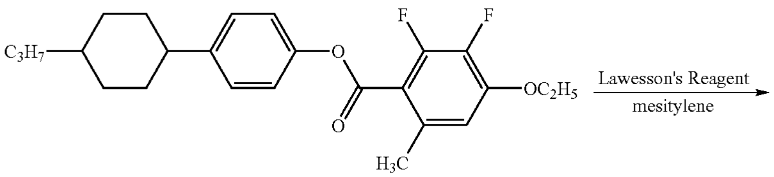

(16)

-continued

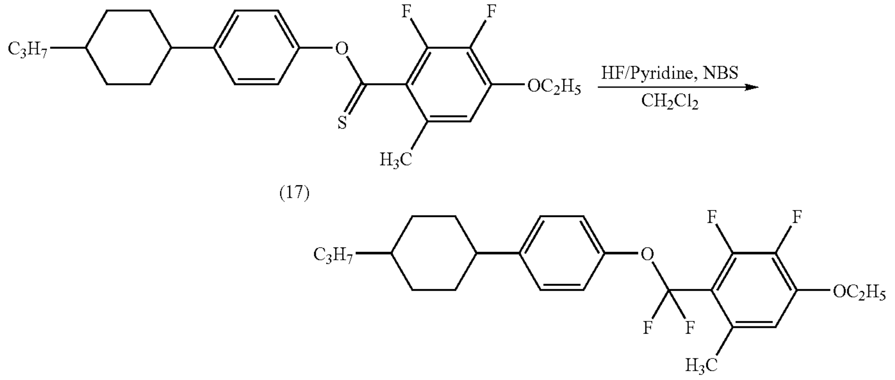

(17)

(1-3-3-15)

Step 1: Under a nitrogen atmosphere, 20.0 g of the compound (5) having been dissolved in 280 mL of THF was cooled to −78° C., to which 140.0 mL of sec-BuLi (1 M/L) was added, followed by stirring at the same temperature for 2 hours. Frozen carbon dioxide in a block form was added thereto, followed by stirring at −78° C. for 1 hour, and after increasing the temperature to room temperature, stirring over night. 100 mL of 3N hydrochloric acid was added thereto, and the aqueous layer was extracted with ether, which was added to the organic layer. The organic layer was washed with saturated saline and dried over anhydrous magnesium sulfate. After distilling off the solvent, the residue was recrystallized from acetone to obtain 12.7 g of 2,3-difluoro-4-ethoxy-6-methylbenzoic acid (15).

Step 2: 10.0 g of the compound (15) and 10.1 g of 4-(4-propylcyclohexyl)phenol were dissolved in 500 mL of dichloromethane, to which 6.2 g of 4-dimethylaminopyridine (DMAP) was added, followed by stirring at room temperature for 1 hour. 10.5 g of N,N-dicyclohexylcarbodiimide (DCC) having been dissolved in 200 mL of dichloromethane was added thereto at room temperature, followed by stirring at room temperature over night. 100 mL of ether was added to the reaction mixture, and urea thus deposited was removed by filtration. 500 mL of a saturated saline was added to the filtrate, which was stirred for 3 hours. The organic layer was separated, washed with 3N hydrochloric acid and a saturated sodium hydrogen carbonate aqueous solution, and then dried over anhydrous sodium sulfate. The solvent was removed under reduced pressure to obtain 19.9 g of 2,3-difluoro-4-ethoxy-6-methylbenzoic acid-4-(4-propylcyclohexyl) (16).

Step 3: 34.8 g of Lawson reagent was added to 17.9 g of the compound (16) having been dissolved in 180 mL of mesitylene, followed by stirring under refluxing by heating for 4 hours. The reaction mixture was cooled to room temperature, then water was added and the aqueous layer was then extracted with toluene, which was added to the organic layer. The organic layer was washed with a saturated sodium hydrogen carbonate aqueous solution and dried over anhydrous magnesium sulfate. The solvent was distilled off, and the residue was purified by silica gel column chromatography to obtain 2.34 g of 2,3-difluoro-4-ethoxy-6-methylthiobenzoic acid-O-4-(4-propylcyclohexyl) (17).

Step 4: 2.32 g of pyridine hydrogen fluoride was added dropwise at −78° C. to 1.93 g of N-bromosuccinimide (NBS) having been dissolved in 20 mL of dichloromethane, followed by stirring at the same temperature for 20 minutes. 2.34 g of the compound (17) having been dissolved in 10 mL of dichloromethane was added dropwise to the reaction mixture at −78° C., followed by stirring at the same temperature for 3 hours. A saturated sodium hydrogen carbonate aqueous solution was poured into the reaction mixture, followed by stirring at room temperature over night. The aqueous layer was extracted with dichloromethane, which was added to the organic layer, and the organic layer was washed with a saturated sodium hydrogen sulfite aqueous solution, 3N hydrochloric acid and a saturated sodium hydrogen carbonate aqueous solution, and then dried over anhydrous magnesium sulfate. The solvent was distilled off, and the residue was purified by silica gel column chromatography and recrystallization to obtain 1.86 g of 1-(1,1-difluoro-1-(2,3-difluoro-4-ethoxy-6-methylphenyl)methoxy)-4-(4-propylcyclohexyl) benzene (Compound 1-3-3-15) as colorless crystals.

Phase transition point (° C.): C 78.1 Iso $^1$H-NMR ($CDCl_3$): δ (ppm); 7.17 (m, 4H), 6.56 (d, 1H), 4.13 (q, 2H), 2.50 (s, 3H), 2.48-2.42 (m, 1H), 1.89-1.84 (m, 4H), 1.45 (t, 3H), 1.46-1.18 (m, 7H), 1.07-0.99 (m, 2H), 0.899 (t, 3H).

Example 9

Synthesis of 1-Ethoxy-2,3-difluoro-4-(2-(4-propylcyclohexyl)methoxy)-5-methylbenzene (Compound 1-1-3-11)

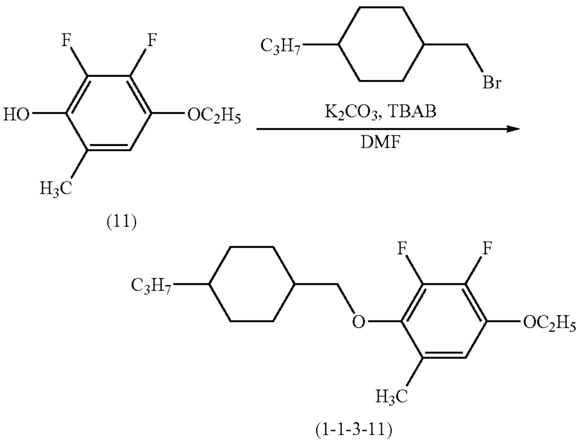

(11)

(1-1-3-11)

Step 1: 5.14 g of 1-(4-propylcyclohexyl)-4-bromomethane, 4.0 g of the compound (11) and 0.34 g of TBAB were dissolved in 140 mL of DMF, to which 3.24 g of potassium carbonate was added, followed by refluxing by heating for 3 hours. After terminating the reaction by adding water, the aqueous layer was extracted with toluene, which was added to the organic layer, and the organic layer was washed with saturated saline and then dried over anhydrous magnesium sulfate. The solvent was distilled off, and the residue was purified by silica gel column chromatography and recrystallization to obtain 4.39 g of 1-ethoxy-2,3-difluoro-4-(2-(4-propylcyclohexyl)methoxy)-5-methylbenzene (Compound I-1-3-11) as colorless crystals.

Phase transition point (° C.): C 29.9 Iso $^1$H-NMR ($CDCl_3$): δ (ppm); 6.49 (dd, 1H), 4.04 (q, 2H), 3.74 (d, 2H), 2.20 (s, 3H), 1.93-1.79 (m, 4H), 1.76-1.68 (m, 1H), 1.41 (t, 3H), 1.36-1.28 (m, 2H), 1.25-1.15 (m, 3H), 1.11-1.03 (m, 2H), 0.976-0.922 (m, 2H), 0.882 (t, 3H)

Example 10

Synthesis of 1-Ethoxy-2,3-difluoro-4-(2-(4-pentylcyclohexyl)methoxy)-5-methylbenzene (Compound 1-1-3-12)

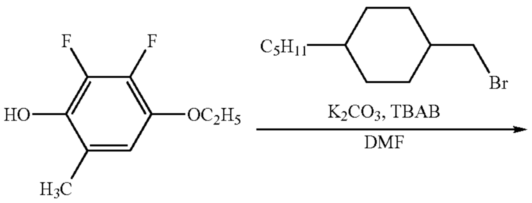

(11)

-continued

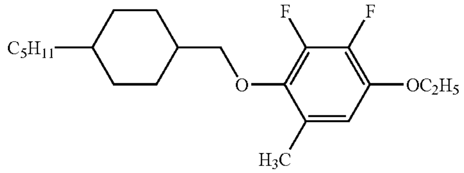

(1-1-3-12)

Step 1: 5.78 g of 1-(4-pentylcyclohexyl)-4-bromomethane, 4.0 g of the compound (11) and 0.34 g of TBAB were dissolved in 140 mL of DMF, to which 3.24 g of potassium carbonate was added, followed by refluxing by heating for 3 hours. After terminating the reaction by adding water, the aqueous layer was extracted with toluene, which was added to the organic layer, and the organic layer was washed with saturated saline and then dried over anhydrous magnesium sulfate. The solvent was distilled off, and the residue was purified by silica gel column chromatography and recrystallization to obtain 5.89 g of 1-ethoxy-2,3-difluoro-4-(2-(4-pentylcyclohexyl)methoxy)-5-methylbenzene (Compound 1-1-3-12) as colorless crystals.

Phase transition point (° C.): C 31.6 Iso $^1$H-NMR ($CDCl_3$): δ (ppm); 6.49 (dd, 1H), 4.05 (q, 2H), 3.74 (d, 2H), 2.20 (s, 3H), 1.93-1.79 (m, 4H), 1.76-1.68 (m, 1H), 1.41 (t, 3H), 1.34-1.17 (m, 9H), 1.11-1.03 (m, 2H), 0.974-0.922 (m, 2H), 0.885 (q, 3H)

Example 11

Synthesis of 2-(2-(4-(4-Propylcyclohexyl)phenyl)ethyl)-2,3-difluoro-4-ethoxytoluene (Compound 1-3-3-12)

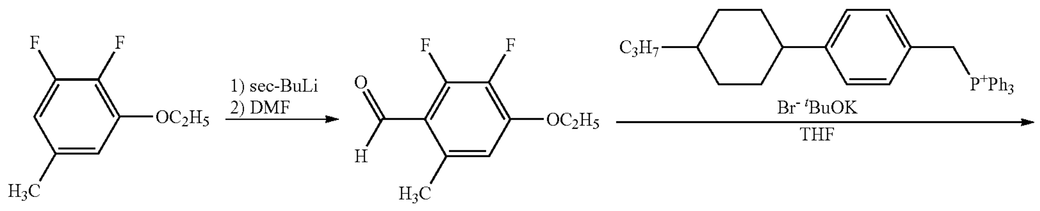

(5) (18)

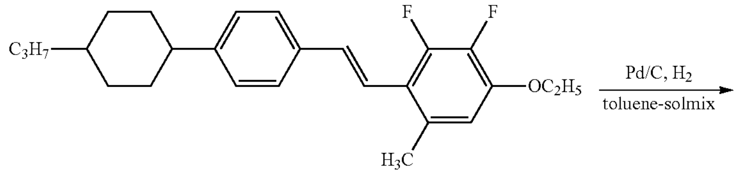

(19)

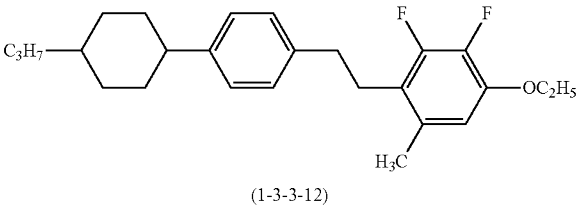

(1-3-3-12)

Step 1: Under a nitrogen atmosphere, 15.0 g of the compound (5) having been dissolved in 180 mL of THF was cooled to −78° C., to which 105.0 mL of sec-BuLi (1 M/L), followed by stirring at the same temperature for 2 hours. 8.28 g of DMF having been dissolved in 120 mL of THF was added thereto, followed by stirring at −78° C. for 1 hour, and after increasing the temperature to room temperature, stirring over night. 80 mL of 3N hydrochloric acid was added thereto, and the aqueous layer was extracted with toluene, which was added to the organic layer. The organic layer was washed with saturated saline and dried over anhydrous magnesium sulfate. The solvent was distilled off to obtain 12.0 g of 2,3-difluoro-4-ethoxy-6-methylbenzaldehyde (18).

Step 2: 60 mL of THF was added to 18.7 g of dried 1-(4-(4-propylcyclohexyl)phenyl)methyltriphenylphosphonium bromide, and the mixture was cooled to −60° C. under a nitrogen atmosphere. 3.70 g of potassium t-butoxide was added to the resulting suspension liquid, followed by stirring for 1 hour. 6.0 g of the compound (18) having been dissolved in 60 mL of THF was further added dropwise to the suspension liquid, followed by stirring at the same temperature for 1 hour and further stirred at room temperature over night. The reaction mixture was passed through a silica gel layer, and the solvent is distilled off in vacuo from the filtrate. The residue was purified by silica gel column chromatography to obtain 10.6 g of 2-(2-(4-(4-propylcyclohexyl)phenyl)ethenyl)-2,3-difluoro-4-ethoxytoluene (19).

Step 3: 0.53 g of Pd/C was added to 10.6 g of the compound (19) having been dissolved in 100 mL of toluene and 100 mL of Solmix, and under a hydrogen atmosphere, the mixture was stirred at room temperature until hydrogen was not absorbed. Pd/C was removed by filtration, and the solvent was distilled off. The residue was purified by silica gel column chromatography and recrystallization to obtain 6.90 g of 2-(2-(4-(4-propylcyclohexl) phenyl)ethyl)-2,3-difluoro-4-ethoxytoluene (Compound 1-3-3-12) as colorless crystals.

Phase transition point (° C.): C 82.4 Iso $^1$H-NMR ($CDCl_3$): δ (ppm); 7.14-7.10 (m, 4H), 6.51 (dd, 1H), 4.08 (q, 2H), 2.86-2.83 (m, 2H), 2.75-2.71 (m, 2H), 2.47-2.41 (m, 1H), 2.15 (s, 3H), 1.89-1.84 (m, 4H), 1.48-1.19 (m, 1H), 1.43 (t, 3H), 1.08-1.00 (m, 2H), 0.901 (t, 3H)

Example 12

Synthesis of 2-(2-(4-(4-Propylphenyl)phenyl)ethyl)-2,3-difluoro-4-ethoxytoluene (Compound 1-3-3-22)

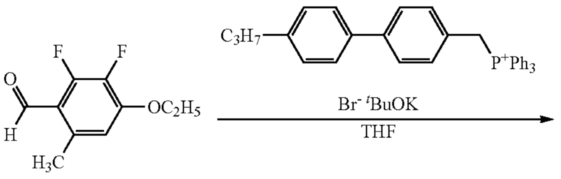

(18)

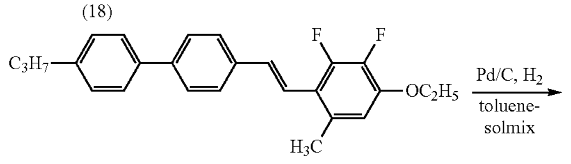

(20)

-continued

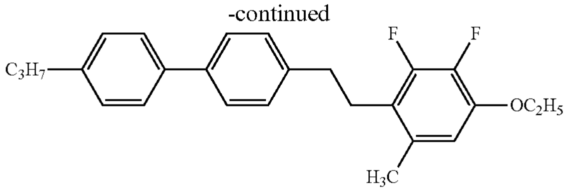

(1-3-3-22)

Step 1: 40 mL of THF was added to 12.1 g of dried 1-(4-(4-propylphenyl)phenyl)methyltriphenylphosphonium bromide, and the mixture was cooled to −60° C. under a nitrogen atmosphere. 2.47 g of potassium t-butoxide was added to the resulting suspension liquid, followed by stirring for 1 hour. 4.0 g of the compound (18) having been dissolved in 40 mL of THF was further added dropwise to the suspension liquid, followed by stirring at the same temperature for 1 hour and further stirred at room temperature over night. The reaction mixture was passed through a silica gel layer, and the solvent was distilled off in vacuo from the filtrate. The residue was purified by silica gel column chromatography to obtain 7.29 g of 2-(2-(4-(4-propylphenyl)phenyl)ethenyl)-2,3-difluoro-4-ethoxytoluene (20).

Step 2: 0.36 g of Pd/C was added to 7.29 g of the compound (20) having been dissolved in 100 mL of toluene and 100 mL of Solmix, and under a hydrogen atmosphere, the mixture was stirred at room temperature until hydrogen was not absorbed. Pd/C was removed by filtration, and the solvent was distilled off. The residue was purified by silica gel column chromatography and recrystallization to obtain 6.00 g of 2-(2-(4-(4-propylphenyl)phenyl)ethyl)-2,3-difluoro-4-ethoxytoluene (Compound 1-3-3-22) as colorless crystals.

Phase transition point (0° C.): C 80.8 Iso $^1$H-NMR ($CDCl_3$): δ (ppm); 7.50 (d, 4H), 7.24-7.21 (m, 4H), 6.50 (dd, 1H), 4.07 (q, 2H), 2.90-2.86 (m, 2H), 2.82-2.79 (m, 2H), 2.62 (t, 2H), 2.15 (s, 3H), 1.71-1.63 (m, 2H), 1.42 (t, 3H), 0.968 (t, 3H)

Example 13

Synthesis of 2-(4-Propylphenyl)ethyl-2,3-difluoro-4-(4-pentylphenyl) toluene (Compound 1-2-3-3)

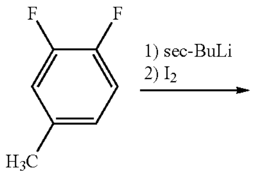

(2)

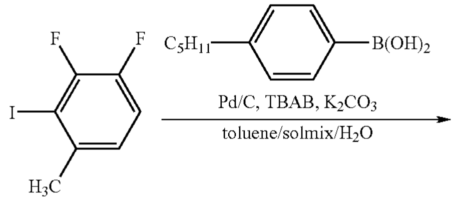

(21)

-continued

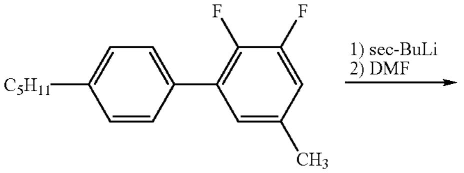

(22)

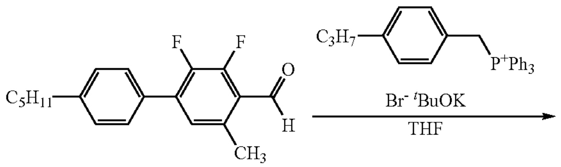

(23)

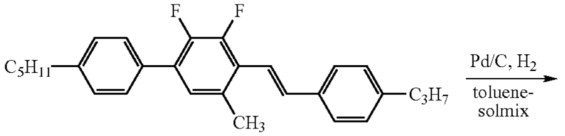

(24)

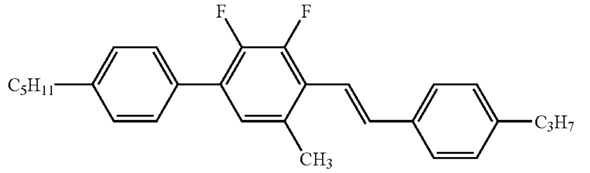

(1-2-3-3)

Step 1: Under a nitrogen atmosphere, 10.0 g of the compound (2) having been dissolved in 70 mL of THF was cooled to −78° C., to which 85.0 mL of sec-BuLi (1 M/L) was added, followed by stirring at the same temperature for 2 hours. 23.8 g of iodine having been dissolved in 35 mL of THF was added thereto, followed by stirring at −78° C. for 1 hour, and after increasing the temperature to room temperature, stirring over night. 40 mL of water was added thereto, and the aqueous layer was extracted with ether, which was added to the organic layer. The organic layer was washed with a saturated potassium hydrogen sulfite aqueous solution and saturated saline, and dried over anhydrous magnesium sulfate. The solvent was distilled off to obtain 20.0 g of 3-iodo-4,5-difluorotoluene (21).

Step 2: 5.74 g of TBAB, 9.84 g of potassium carbonate and 0.76 g of Pd/C were added to 9.04 g of the compound (21) having been dissolved in a mixed solvent of 50 mL of toluene and 50 mL of Solmix, and 6.84 g of 4-pentylphenylboric acid, followed by stirring under refluxing by heating for 4 hours. After removing Pd/C by filtration, the filtrate was separated, and the aqueous layer as extracted with toluene, which was added to the organic layer. The organic layer was washed with a saturated potassium hydrogen sulfite aqueous solution and saturated saline, and dried over anhydrous magnesium sulfate. The solvent was distilled off, and the residue was purified by silica gel column chromatography to obtain 8.93 g of 3,4-difluoro-5-(4-pentylphenyl)toluene (22).

Step 3: Under a nitrogen atmosphere, 8.93 g of the compound (22) having been dissolved in 66 mL of THF was cooled to −78° C., to which 39.0 mL of sec-BuLi (1 M/L) was added, followed by stirring at the same temperature for 2 hours. 3.56 g of DMF having been dissolved in 44 mL of THF was added thereto, followed by stirring at −78° C. for 1 hour, and after increasing the temperature to room temperature, stirring over night. 20 mL of 3N hydrochloric acid was added thereto, and the aqueous layer was extracted with toluene, which was added to the organic layer. The organic layer was washed with saturated saline and dried over anhydrous magnesium sulfate. The solvent was distilled off to obtain 7.61 g of 2,3-difluoro-4-(4-pentylphenyl)-6-methylbenzaldehyde (23).

Step 4: 40 mL of THF was added to 10.5 g of dried 1-(4-propylphenyl)methyltriphenylphosphonium bromide, and the mixture was cooled to −60° C. under a nitrogen atmosphere. 2.47 g of potassium t-butoxide was added to the resulting suspension liquid, followed by stirring for 1 hour. 6.0 g of the compound (23) having been dissolved in 40 mL of THF was further added dropwise to the suspension liquid, followed by stirring at the same temperature for 1 hour and further stirred at room temperature over night. The reaction mixture was passed through a silica gel layer, and the solvent was distilled off in vacuo from the filtrate. The residue was purified by silica gel column chromatography to obtain 6.50 g of 2-(4-propylphenyl)ethenyl-2,3-difluoro-4-(4-pentylphenyl)toluene (24).

Step 5: 0.33 g of Pd/C was added to 6.50 g of the compound (24) having been dissolved in 100 mL of toluene and 100 mL of Solmix, and under a hydrogen atmosphere, the mixture was stirred at room temperature until hydrogen was not absorbed. Pd/C was removed by filtration, and the solvent was distilled off. The residue was purified by silica gel column chromatography and recrystallization to obtain 3.94 g of 2-(4-propylphenyl)ethyl-2,3-difluoro-4-(4-pentylphenyl)toluene (Compound 1-2-3-3) as colorless crystals.

Phase transition point (° C.): C 47.1 Iso $^1$H-NMR ($CDCl_3$): δ (ppm); 7.45-7.23 (m, 4H), 7.14-7.10 (m, 4H), 6.95 (d, 1H), 2.95-2.92 (m, 2H), 2.82-2.79 (m, 2H), 2.64 (t, 2H), 2.56 (t, 2H), 2.22 (s, 3H), 1.68-1.59 (m, 4H), 1.36-1.33 (m, 4H), 0.935 (t, 3H), 0.905 (t, 3H)

Example 14

The following compounds 1-1-1-1 to 1-9-3-10 are synthesized by Examples 1 to 13 and based on the synthesis processes described herein. The compounds obtained by Examples 1 to 13 (1-1-3-4, 1-1-3-5, 1-1-3-11, 1-1-3-12, 1-2-3-3, 1-3-3-1, 1-3-3-2, 1-3-3-5, 1-3-3-6, 1-3-3-7, 1-3-3-9, 1-3-3-12, 1-3-3-15 and 1-3-3-22) are again enumerated. The measuring methods for the upper limit temperature, the viscosity, the optical anisotropy and the dielectric anisotropy are described in Example 15.

(1-1-1-1)

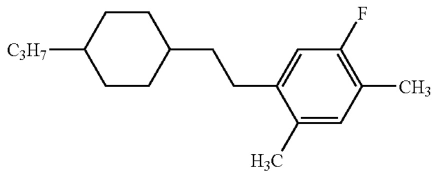

(1-1-1-2)

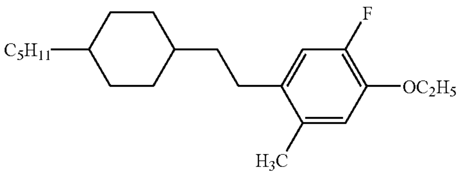

-continued
(1-1-1-3)
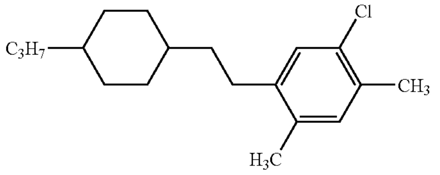
(1-1-1-4)
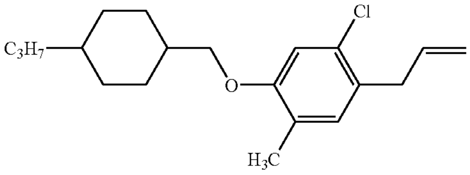
(1-1-1-5)
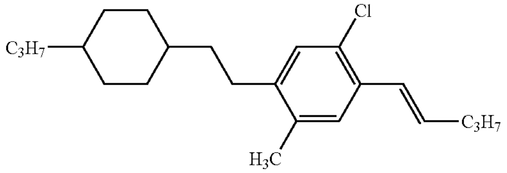
(1-1-1-6)
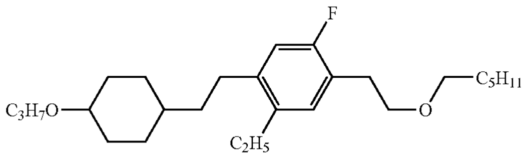
(1-1-1-7)
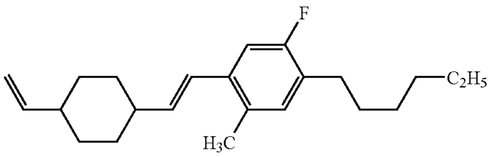
(1-1-1-8)
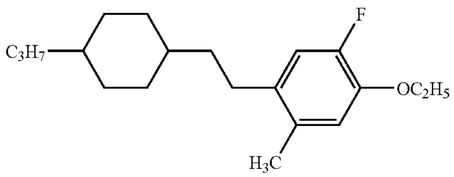
(1-1-2-1)
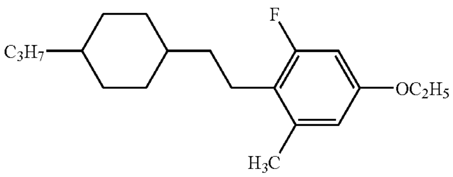
(1-1-2-2)
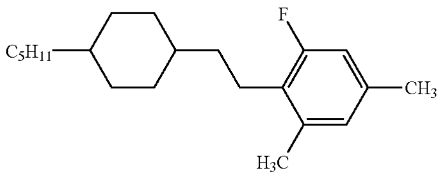
(1-1-2-3)
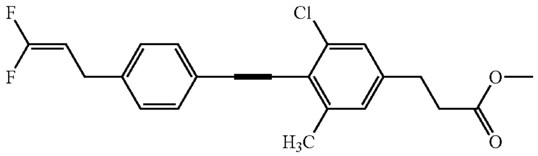
(1-1-2-4)
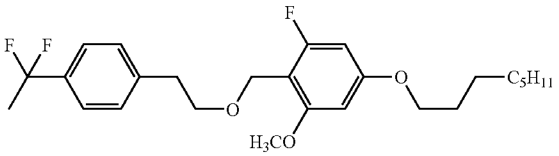
(1-1-2-5)
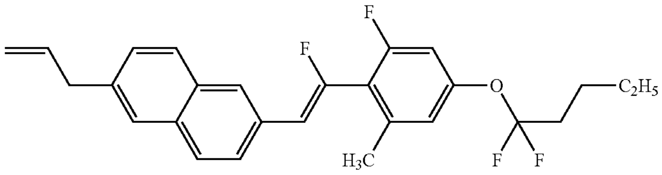
(1-2-2-6)
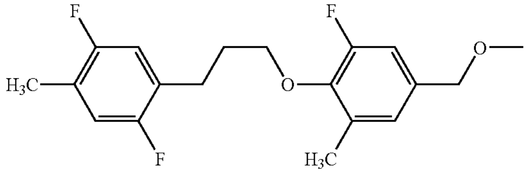

-continued
(1-1-2-7)
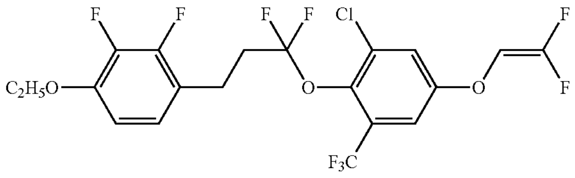
(1-1-3-1)
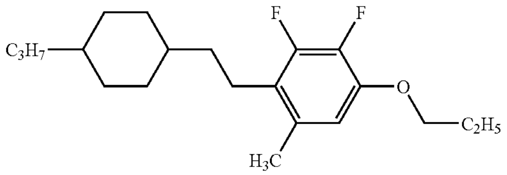
(1-1-3-2)
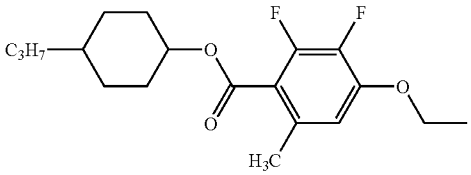
(1-1-3-3)
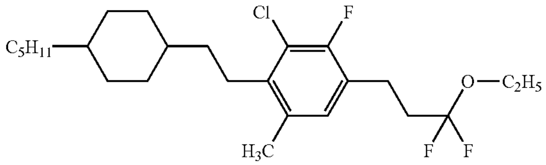
(1-1-3-4)
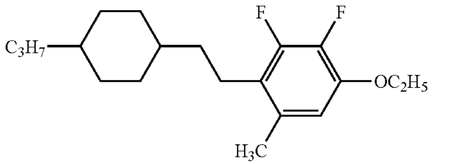
C 34.4 Iso (° C.)
$T_{NI}$: -30.1° C. Δε: -4.19 Δn: 0.047
(1-1-3-5)
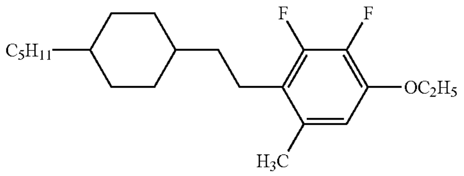
C 41.8 Iso (° C.)
$T_{NI}$: -18.1° Δε: -4.38 Δn: 0.049
(1-1-3-6)
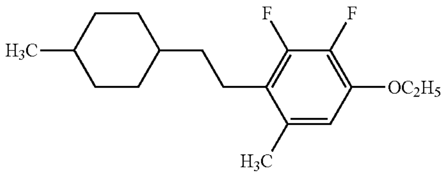
(1-1-3-7)
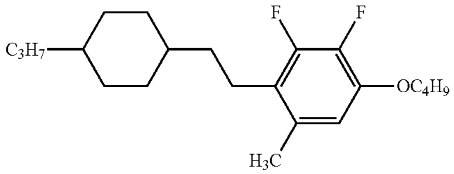
(1-1-3-8)
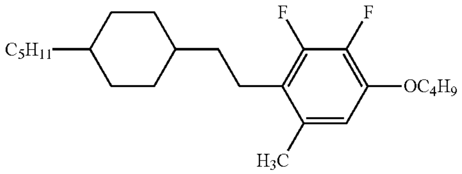
(1-1-3-9)
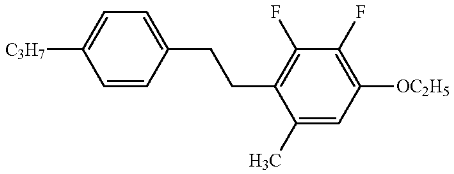
(1-1-3-10)
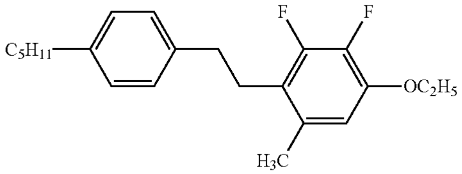
(1-1-3-11)
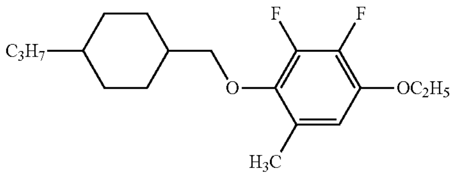
C 29.9 Iso (° C.)
$T_{NI}$: -21.4° Δε: -4.17 Δn: 0.048 $\eta_{20}$: 35.5(mPa · s)
(1-1-3-12)
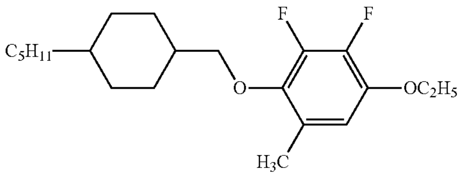
C 31.6 Iso (° C.)
$T_{NI}$: -10.1° Δε: -4.25 Δn: 0.058 $\eta_{20}$: 36.8(mPa · s)

-continued
(1-1-3-13)
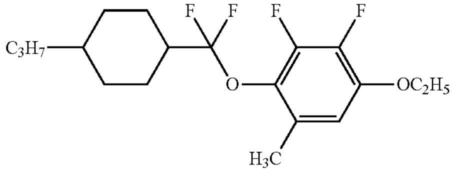
(1-1-3-14)
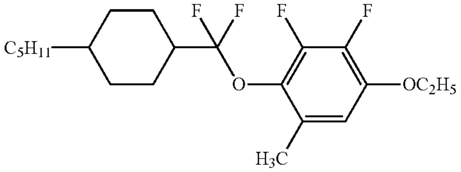
(1-1-3-15)
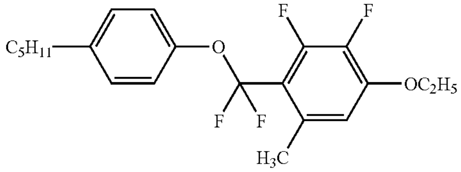
(1-1-3-16)
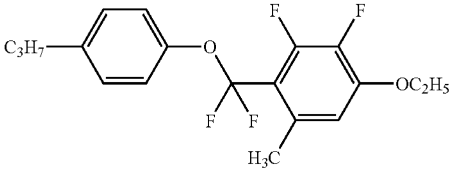
(1-1-3-17)
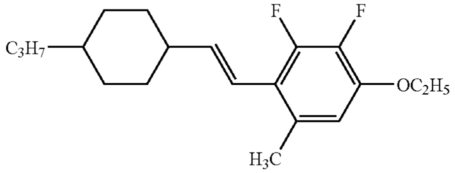
(1-1-3-18)
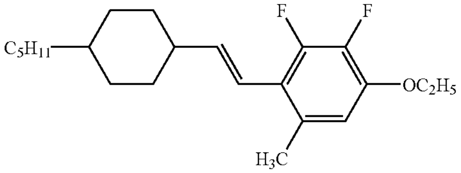
(1-1-3-19)
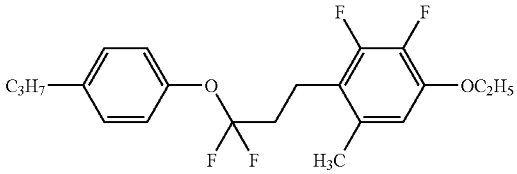
(1-1-3-20)
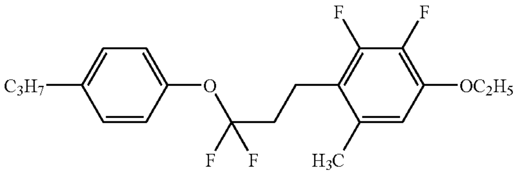
(1-1-3-21)
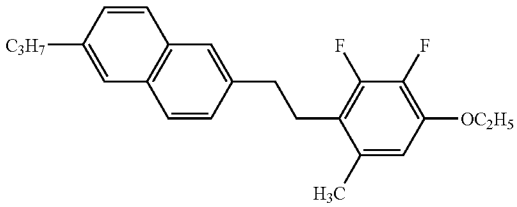
(1-1-3-22)
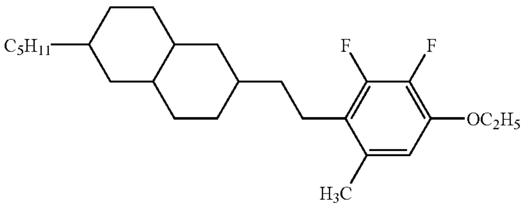
(1-1-3-23)
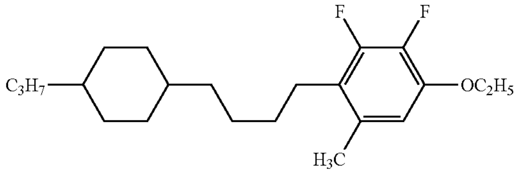
(1-1-3-24)
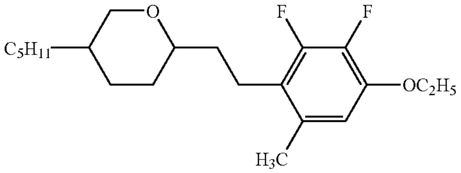
(1-1-3-25)
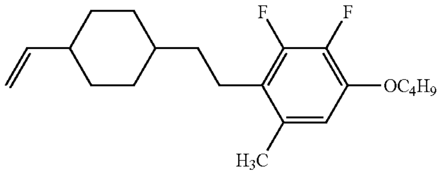
(1-1-3-26)
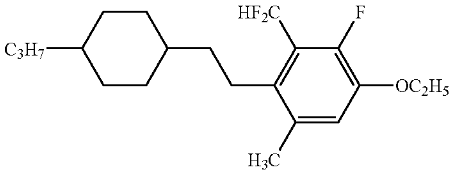
(1-1-3-27)
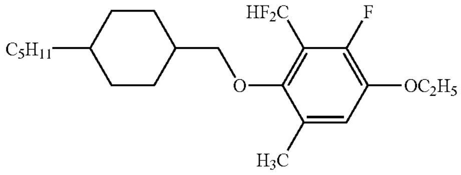
(1-1-3-28)
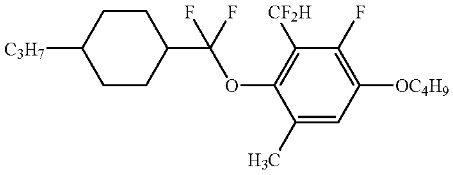

-continued
(1-1-3-29)
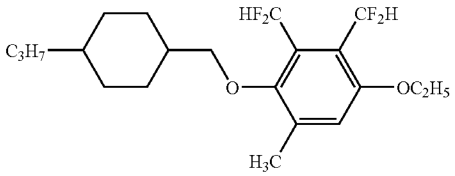
(1-1-3-30)
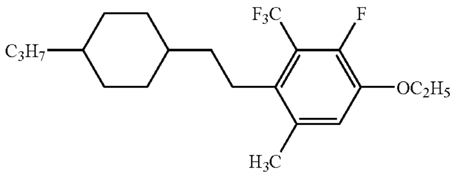
(1-1-3-31)
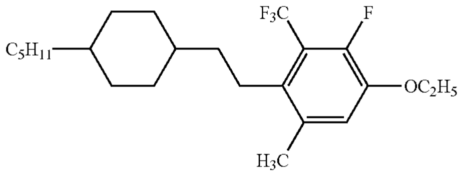
(1-1-3-32)
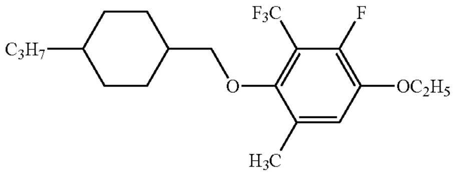
(1-1-3-33)
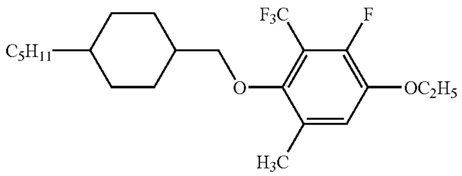
(1-1-3-34)
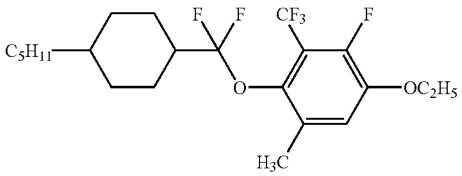
(1-1-3-35)
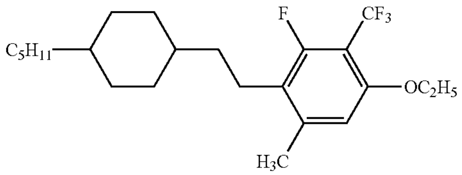
(1-1-3-36)
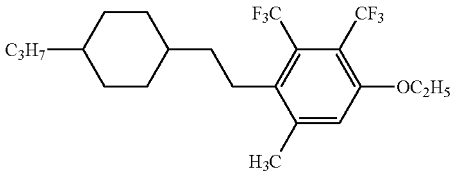
(1-1-3-37)
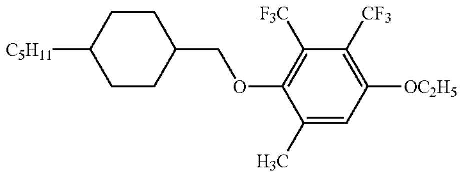
(1-1-3-38)
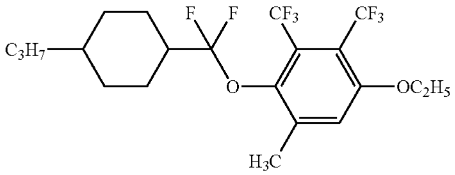
(1-1-3-39)
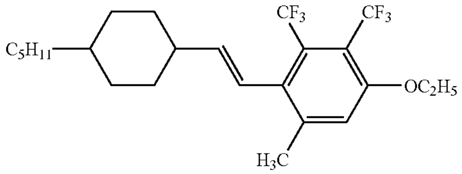
(1-1-3-40)
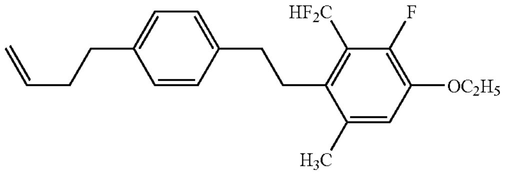
(1-1-3-41)
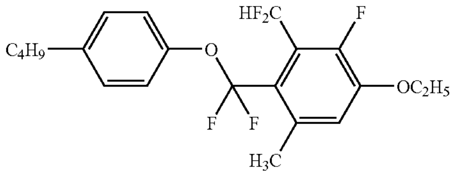
(1-1-3-42)
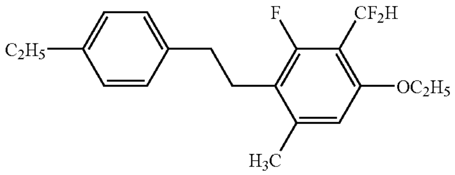
(1-1-3-43)
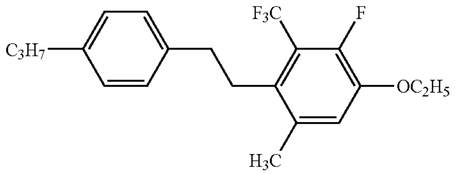
(1-1-3-44)
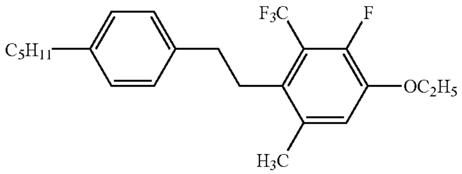

-continued
(1-1-3-45)
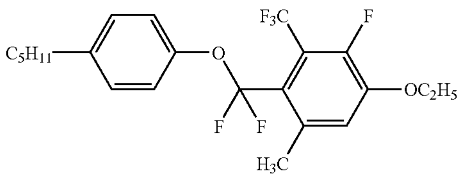
(1-1-3-46)
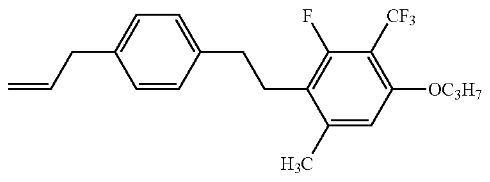
(1-1-3-47)
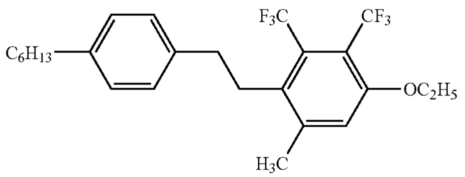
(1-1-3-48)
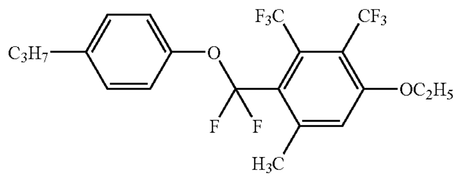
(1-1-3-49)
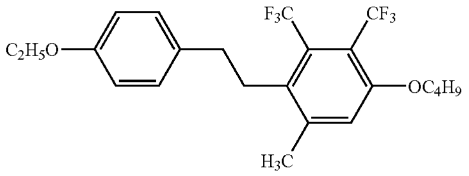
(1-2-1-1)
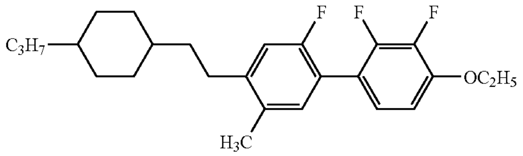
(1-2-1-2)
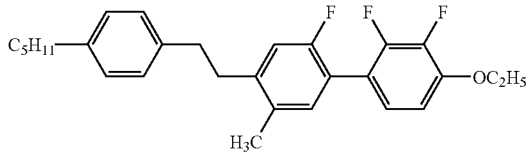
(1-2-1-3)
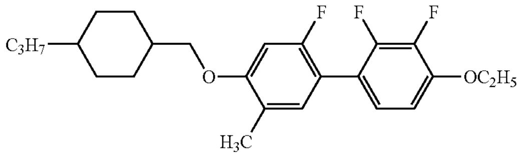
(1-2-2-1)
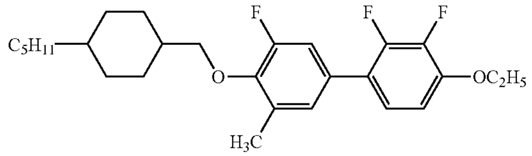
(1-2-2-2)
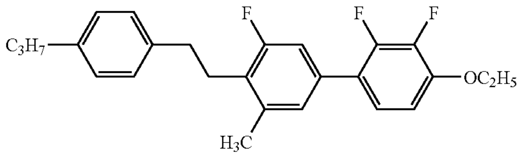
(1-2-2-3)
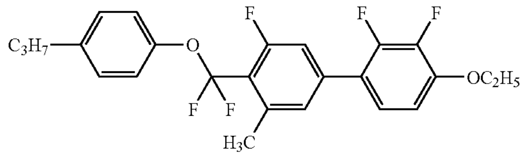
(1-2-3-1)
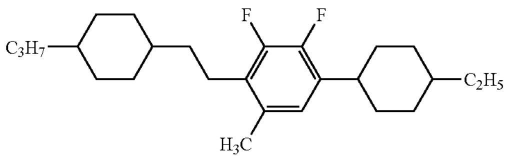
(1-2-3-2)
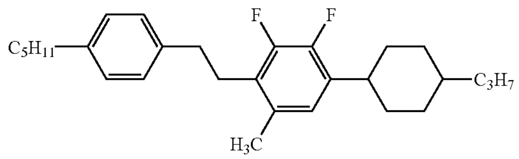
(1-2-3-3)
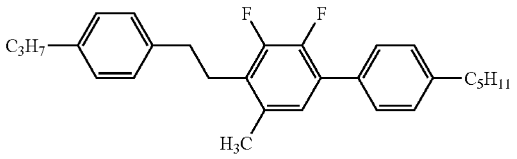
C 47.1 Iso (° C.)
$T_{NI}$: 14.6° C. Δε: -1.54 Δn: 0.140
(1-2-3-4)
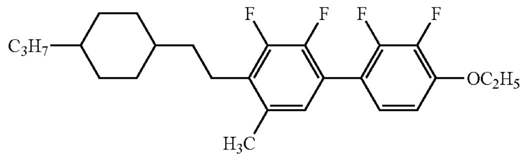

-continued
(1-2-3-5)
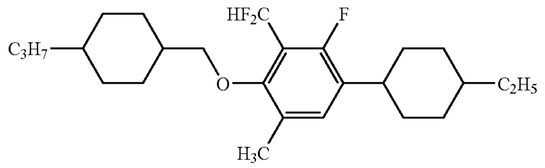
(1-2-3-6)
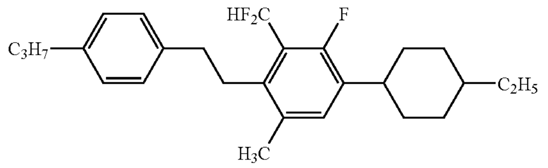
(1-2-3-7)
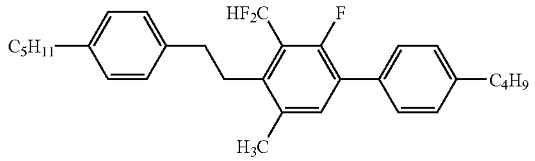
(1-2-3-8)
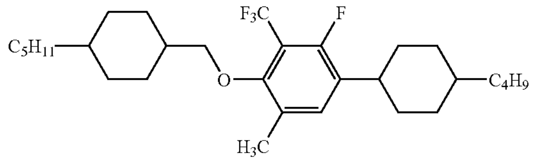
(1-2-3-9)
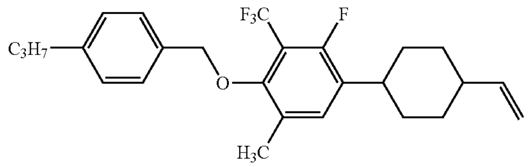
(1-2-3-10)
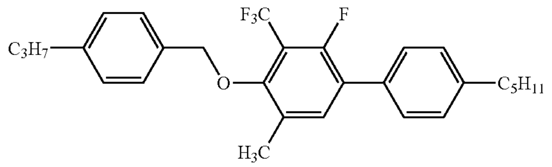
(1-2-3-11)
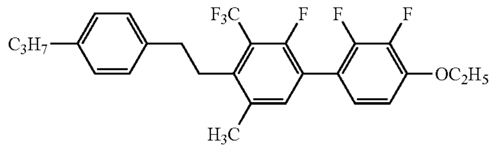
(1-2-3-12)
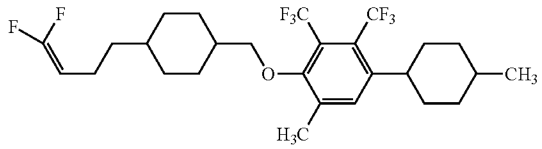
(1-2-3-13)
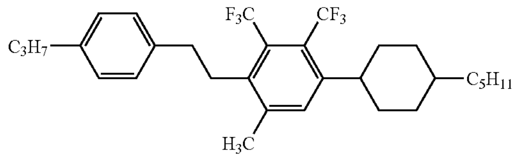
(1-2-3-14)
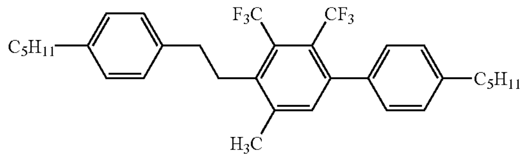
(1-3-1-1)
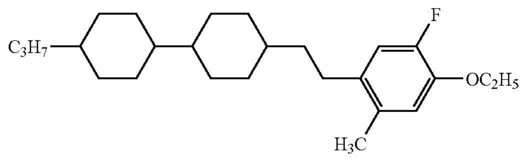
(1-3-1-2)
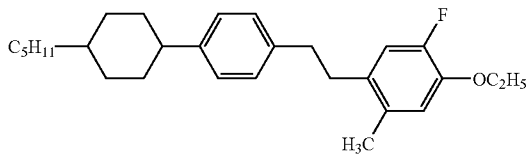
(1-3-1-3)
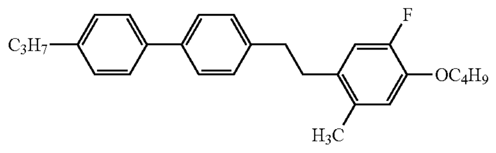
(1-3-1-4)
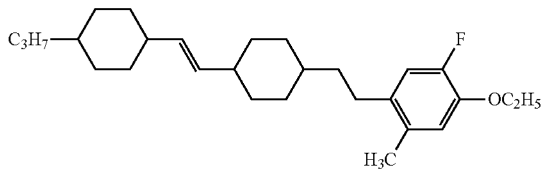
(1-3-1-5)
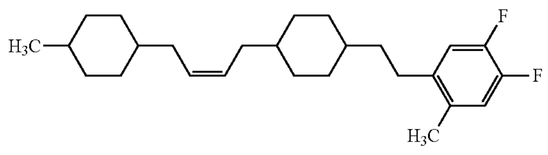

-continued
(1-3-2-1)
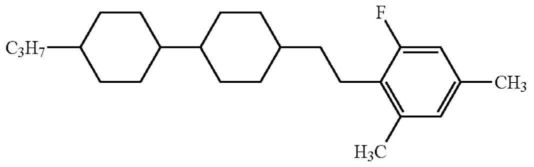
(1-3-2-2)
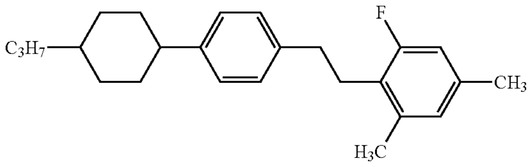
(1-3-2-3)
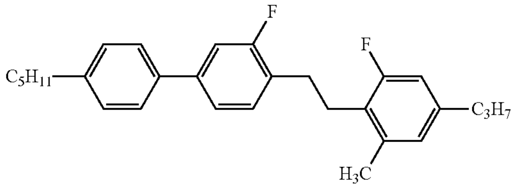
(1-3-2-4)
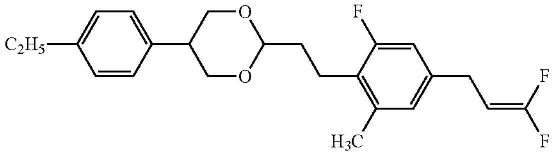
(1-3-2-5)
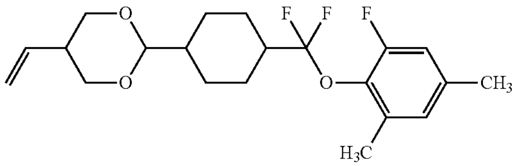
(1-3-3-1)
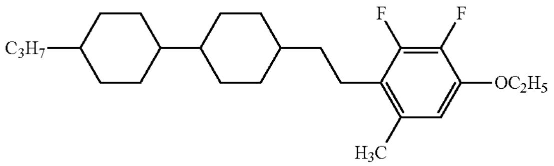
$C_1$ 68.6 $C_2$ 87.1 N 127.4 Iso (° C.)
$T_{NI}$: 113.9° C. $\Delta\varepsilon$: -4.93 $\Delta n$: 0.094
(1-3-3-2)
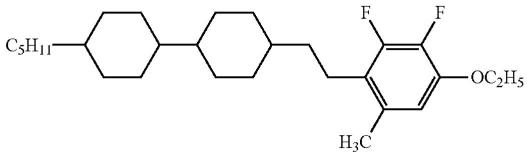
C 63.9 (SmB 63.3) N 131.8 Iso (° C.)
$T_{NI}$: 119.3° C. $\Delta\varepsilon$: -4.83 $\Delta n$: 0.093
(1-3-3-3)
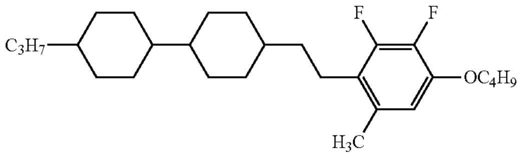
(1-3-3-4)
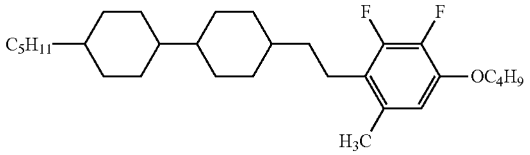
(1-3-3-5)
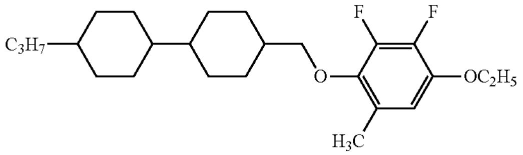
$C_1$ 33.0 $C_2$ 61.7 N 128.9 Iso (° C.)
$T_{NI}$: 114.6° C. $\Delta\varepsilon$: -4.44 $\Delta n$: 0.094 $\eta_{20}$: 49.4 (mPa · s)
(1-3-3-6)
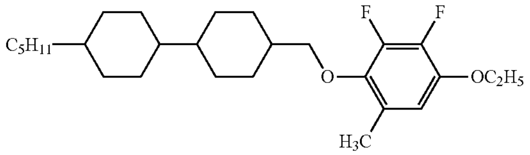
C 63.1 N 130.0 Iso (° C.)
$T_{NI}$: 119.3° C. $\Delta\varepsilon$: -4.83 $\Delta n$: 0.085 $\eta_{20}$: 52.7 (mPa · s)
(1-3-3-7)
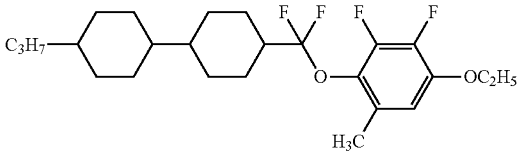
C 92.5 N 143.9 Iso (° C.)
$T_{NI}$: 112.6° C. $\Delta\varepsilon$: -4.92 $\Delta n$: 0.080
(1-5-3-8)
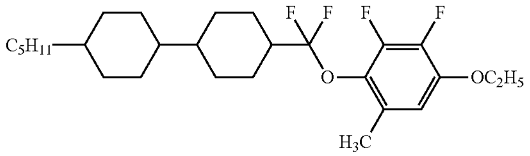
(1-3-3-9)
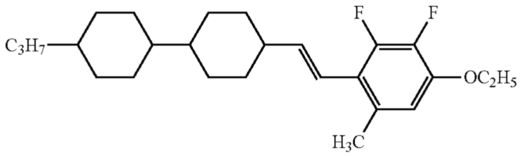
C 92.9 N 196.9 Iso (° C.)
$T_{NI}$: 164.6° C. $\Delta\varepsilon$: -5.30 $\Delta n$: 0.134

-continued
(1-3-3-10)
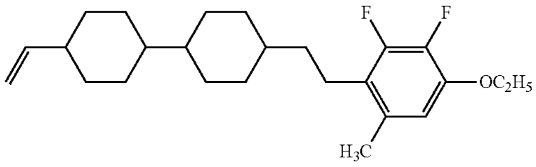
(1-3-3-11)
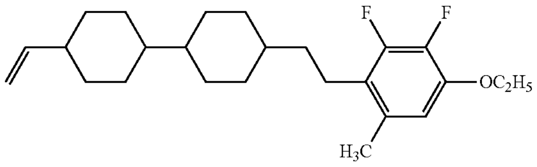
(1-3-3-12)
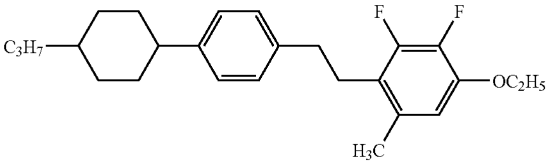
C 82.4 Iso (° C.)
$T_{NI}$: 51.3° C. Δε: -4.64 Δn: 0119
(1-3-3-13)
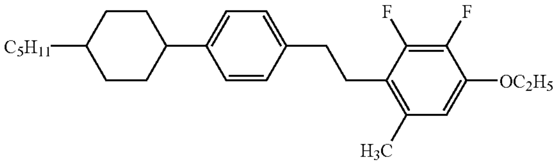
(1-3-3-14)
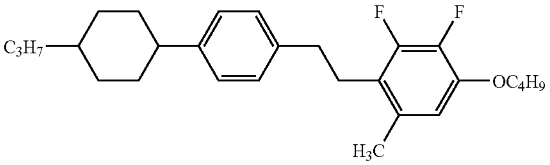
(1-3-3-15)
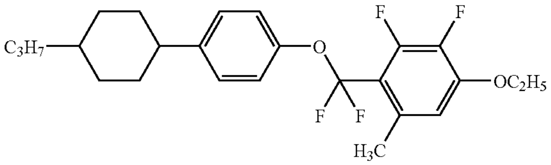
C 78.1 Iso (° C.)
$T_{NI}$: 37.9° C. Δε: -4.34 Δn: 0.092
(1-3-3-16)
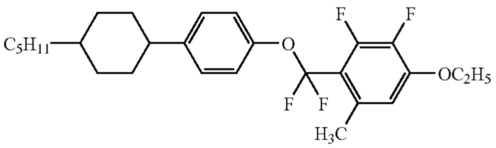
(1-3-3-17)
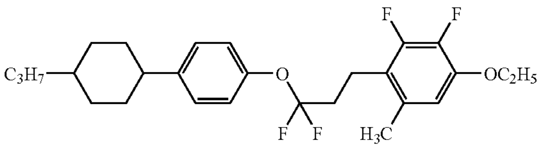
(1-3-3-18)
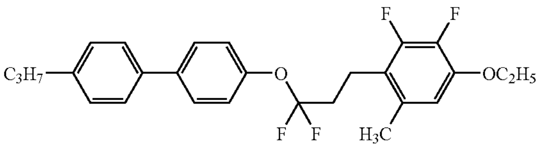
(1-3-3-19)
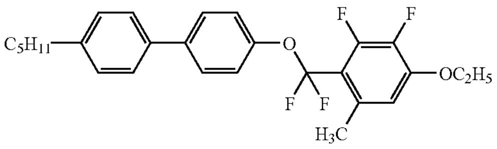
(1-3-3-20)
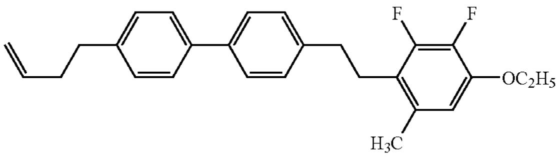
(1-3-3-21)
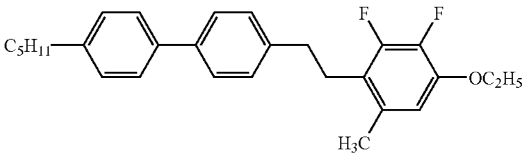
(1-3-3-22)
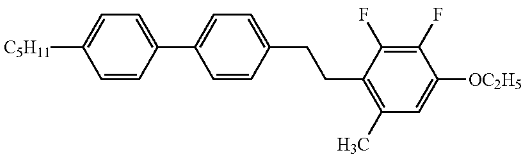
C 80.8 Iso (° C.)
$T_{NI}$: 68.6° C. Δε: -4.38 Δn: 0.194
(1-3-3-23)
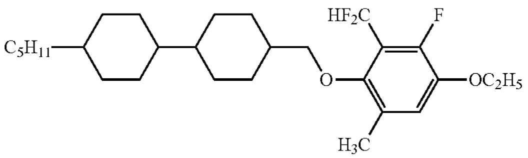

-continued
(1-3-3-24)
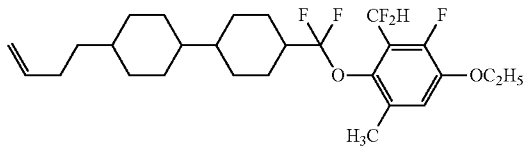
(1-3-3-25)
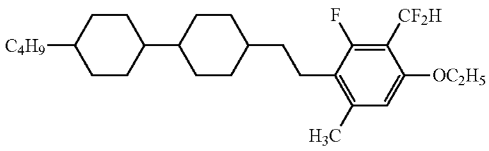
(1-3-3-26)
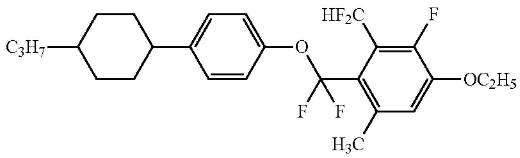
(1-3-3-27)
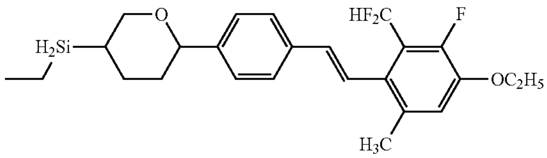
(1-3-3-28)
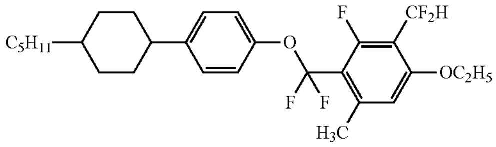
(1-3-3-29)
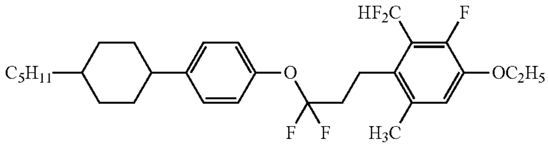
(1-3-3-30)
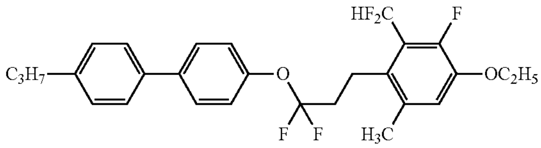
(1-3-3-31)
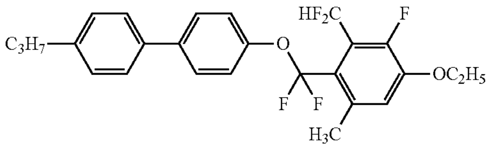
(1-3-3-32)
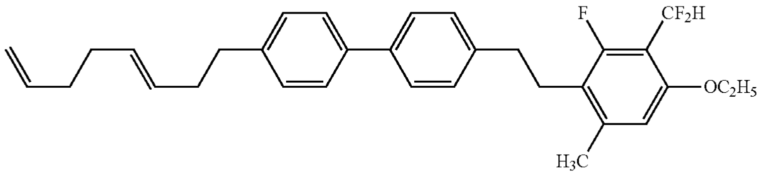
(1-3-3-33)
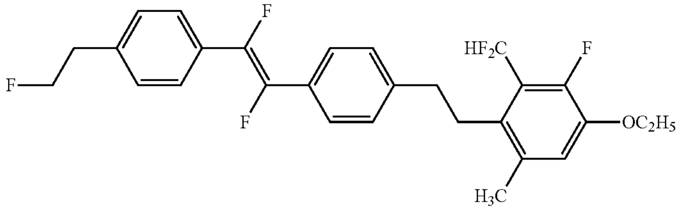
(1-3-3-34)
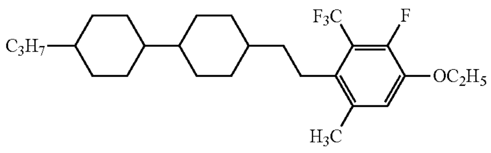
(1-3-3-35)
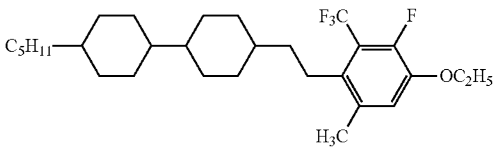
(1-3-3-36)
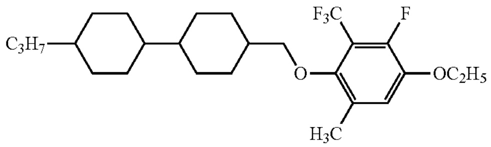
(1-3-3-37)
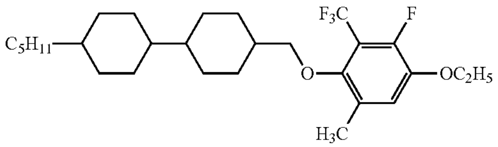

-continued
(1-3-3-38)
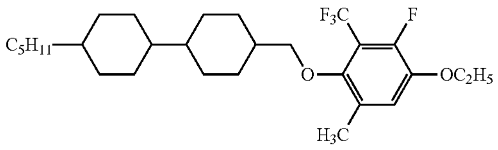
(1-3-3-39)
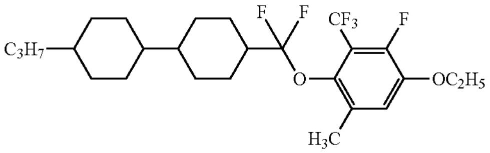
(1-3-3-40)
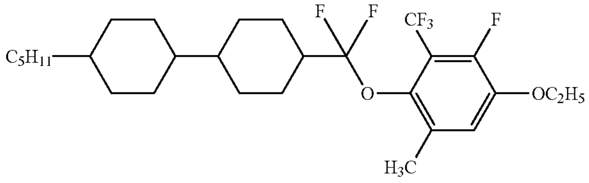
(1-3-3-41)
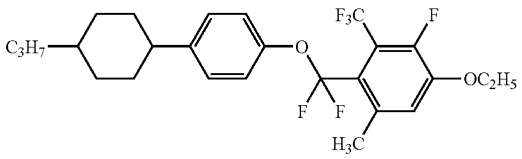
(1-3-3-42)
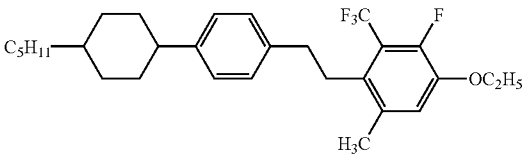
(1-3-3-43)
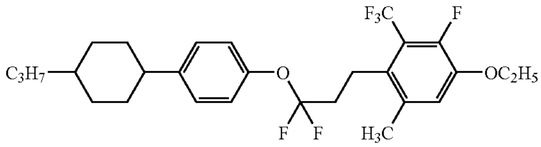
(1-3-3-44)
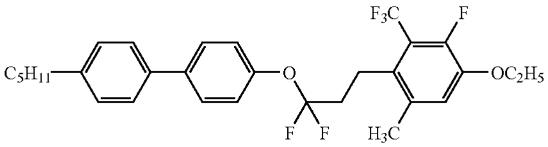
(1-3-3-45)
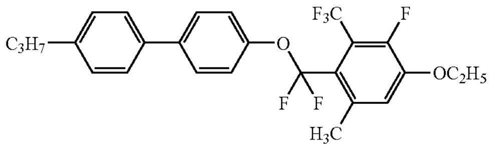
(1-3-3-46)
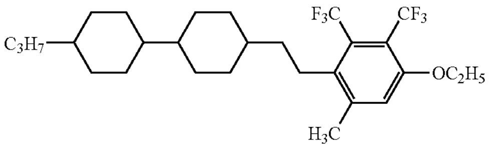
(1-3-3-47)
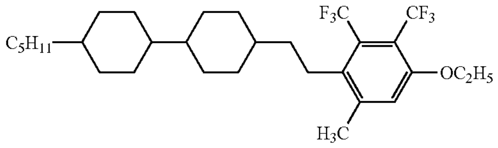
(1-3-3-48)
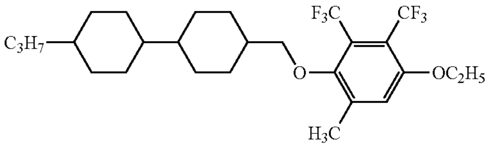
(1-3-3-49)
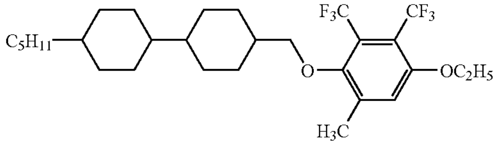
(1-3-3-50)
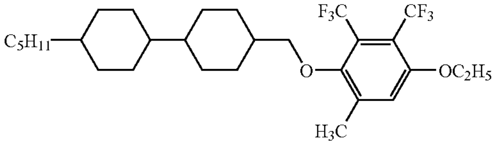
(1-3-3-51)
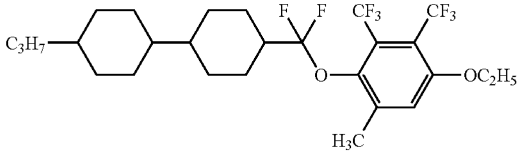
(1-3-3-52)
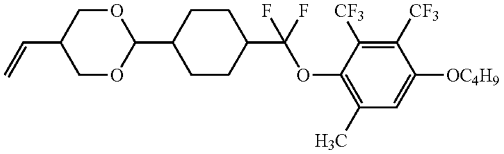

-continued
(1-3-3-53)
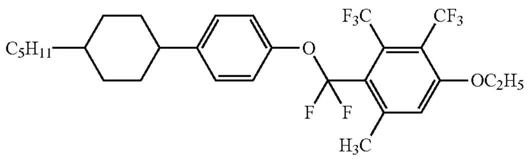
(1-3-3-54)
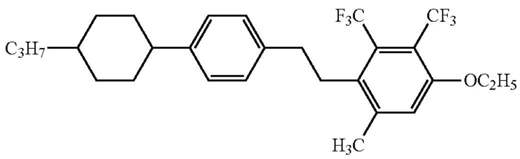
(1-3-3-55)
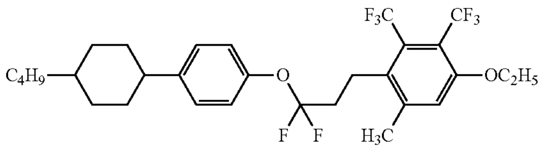
(1-3-3-56)
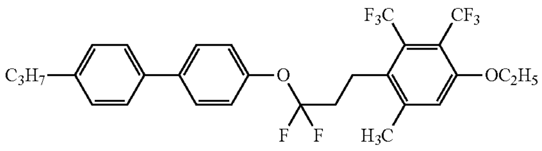
(1-3-3-57)
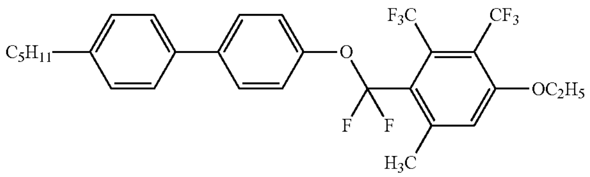
(1-4-1-1)
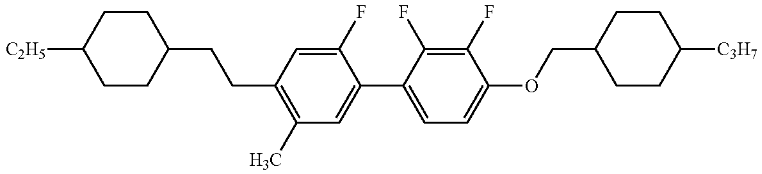
(1-4-1-2)
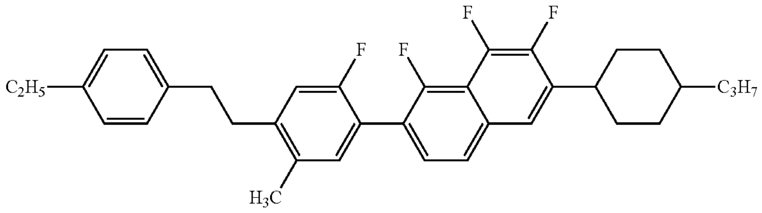
(1-4-1-3)
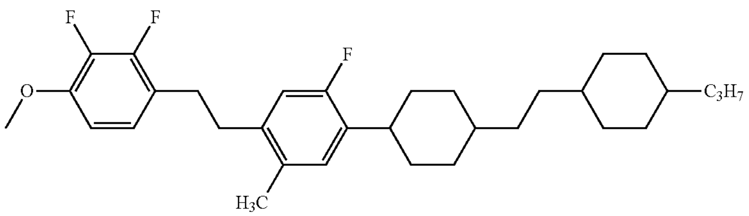
(1-4-2-1)
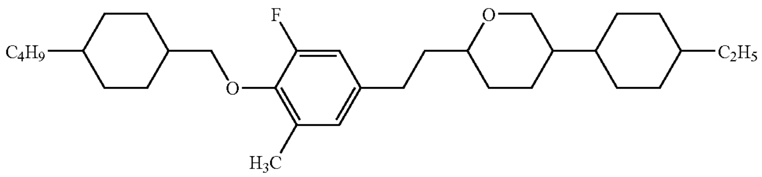

-continued
(1-4-2-2)
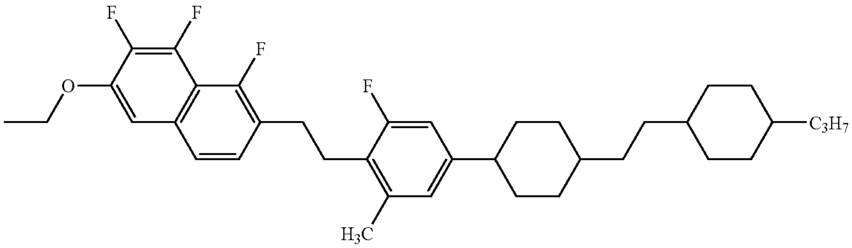
(1-4-2-3)
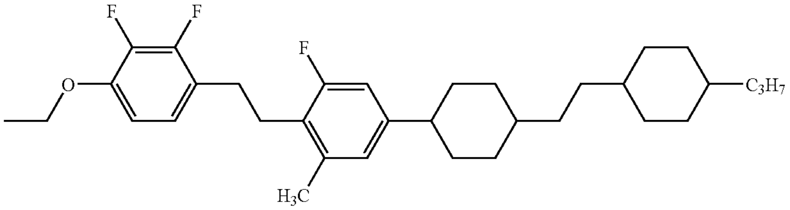
(1-4-3-1)
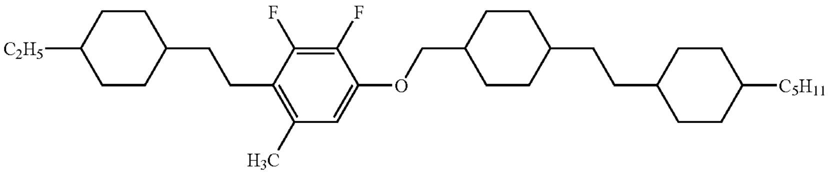
(1-4-3-2)
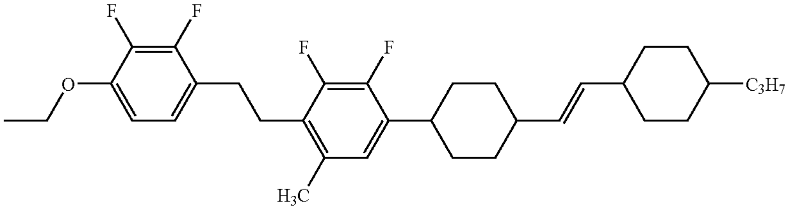
(1-4-3-3)
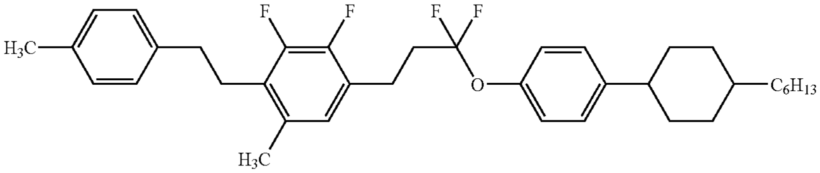
(1-4-3-4)
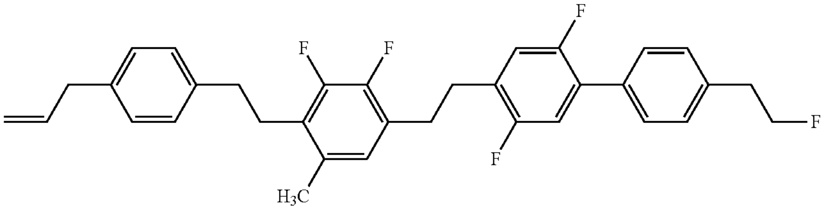
(1-5-1-1)
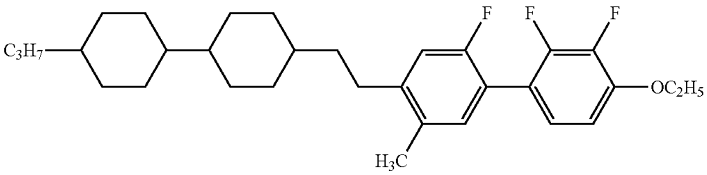
(1-5-1-2)
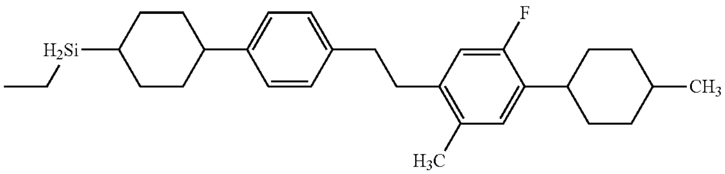

-continued
(1-5-1-3)
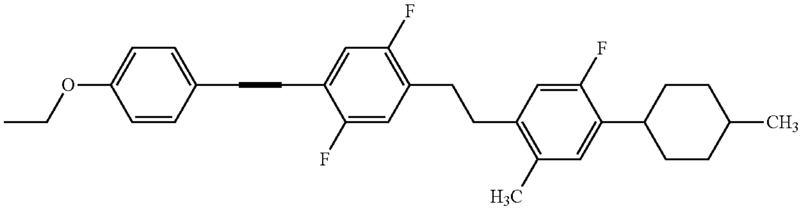
(1-5-2-1)
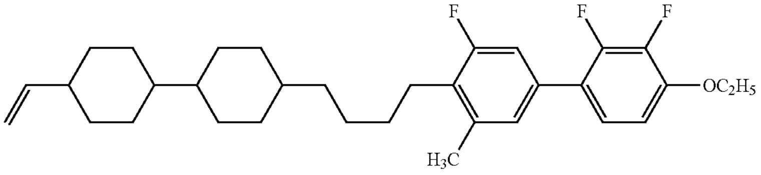
(1-5-2-2)
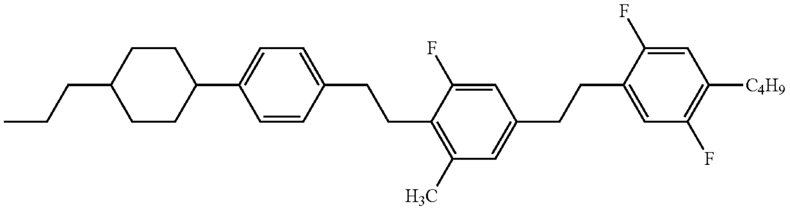
(1-5-2-3)
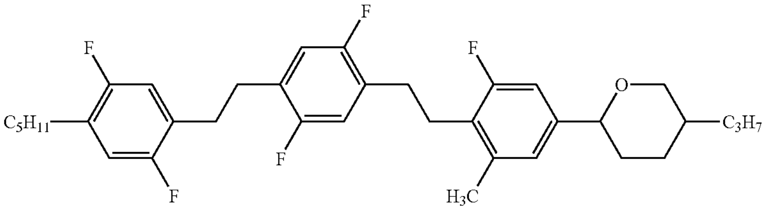
(1-5-3-1)
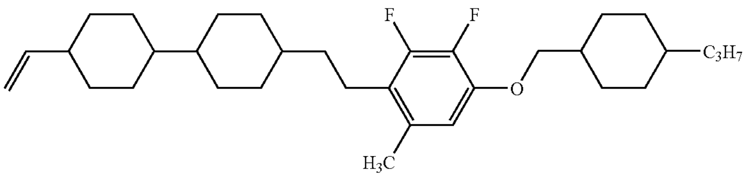
(1-5-3-2)
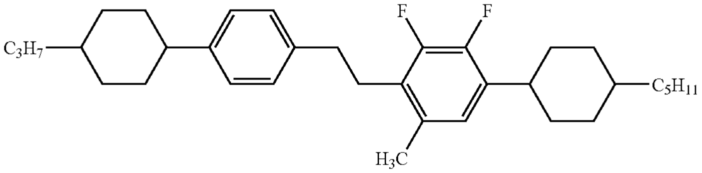
(1-5-3-3)
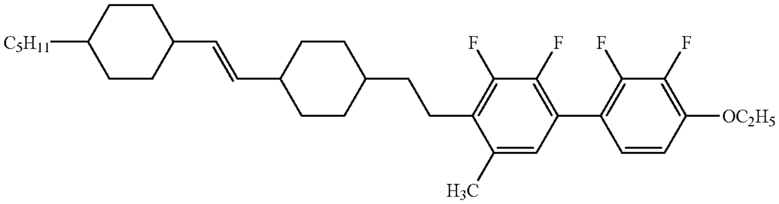
(1-5-3-4)
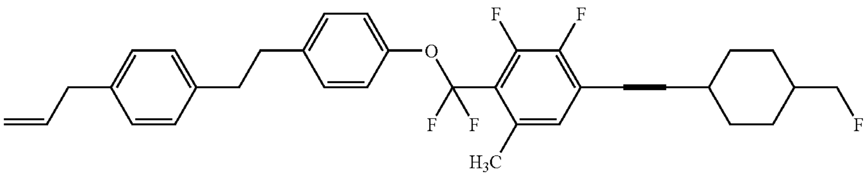

-continued
(1-6-1-1)
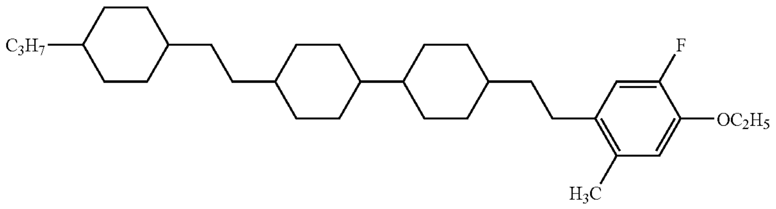
(1-6-1-2)
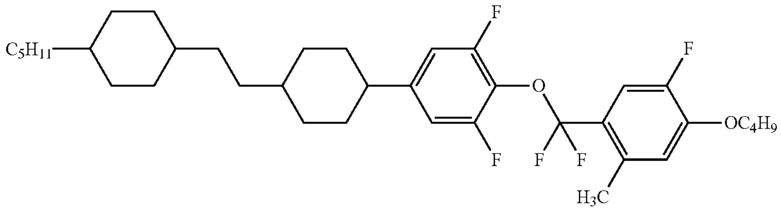
(1-6-1-3)
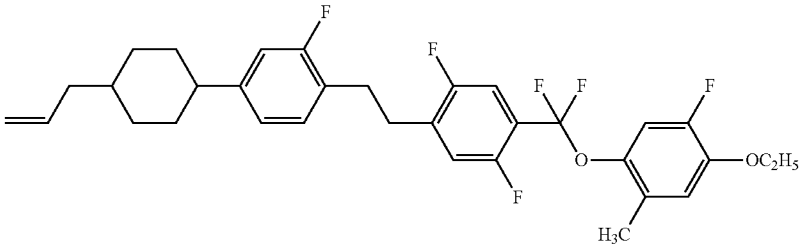
(1-6-1-4)
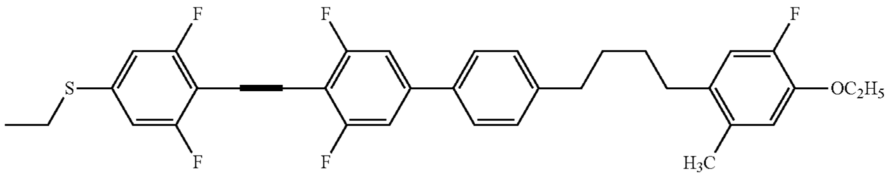
(1-6-1-5)
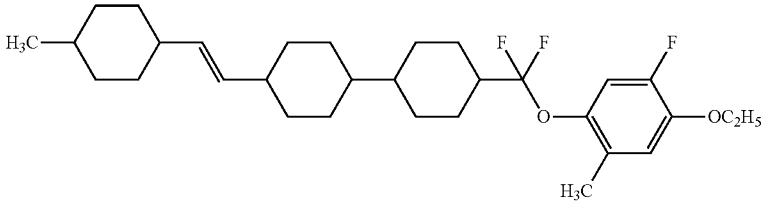
(1-6-2-1)
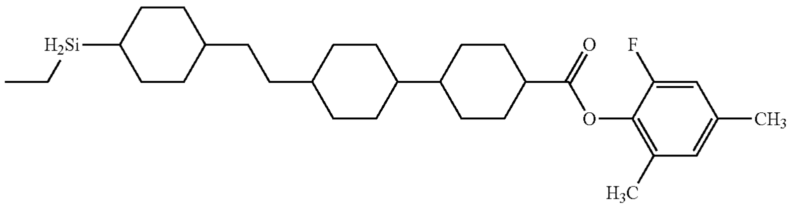
(1-6-2-2)
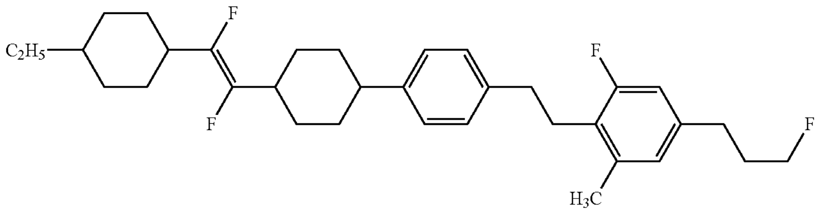

-continued
(1-6-2-3)
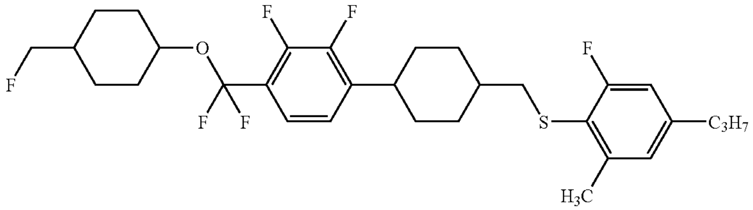
(1-6-2-4)
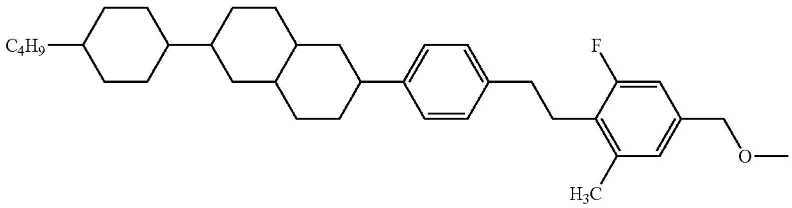
(1-6-2-5)
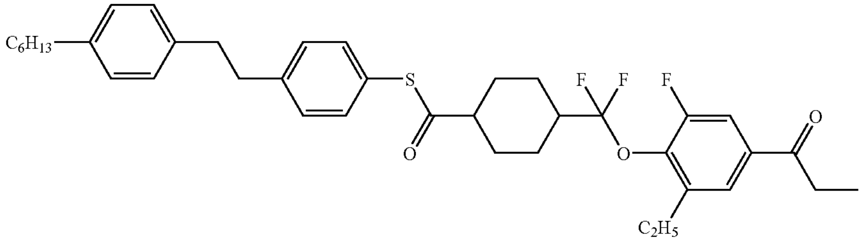
(1-6-3-1)
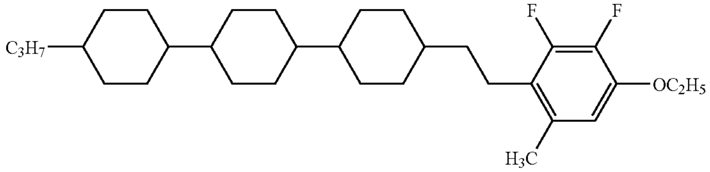
(1-6-3-2)
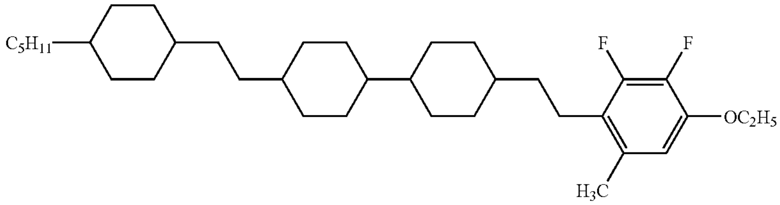
(1-6-3-3)
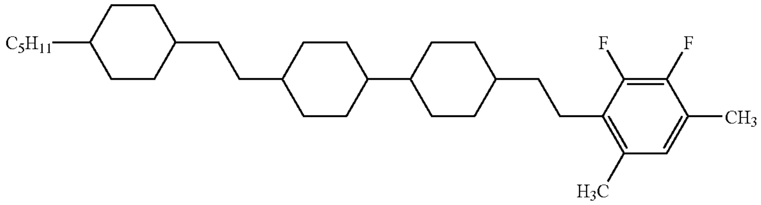
(1-6-3-4)
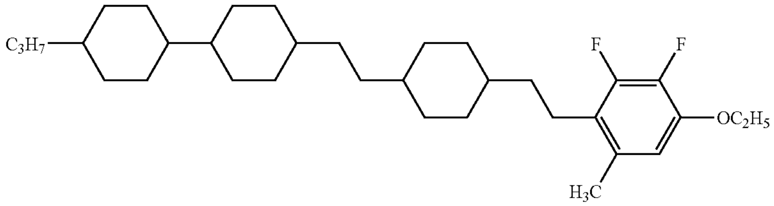

-continued
(1-6-3-5)
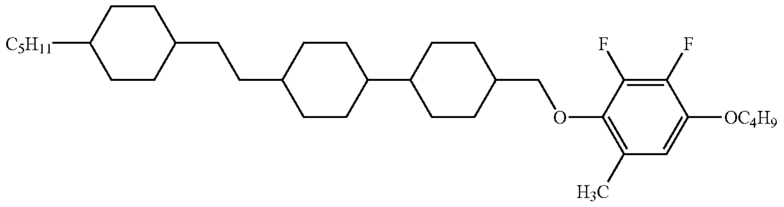
(1-6-3-6)
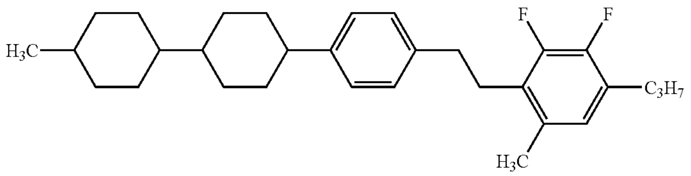
(1-6-3-7)
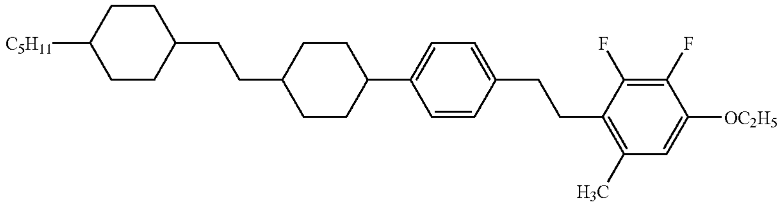
(1-6-3-8)
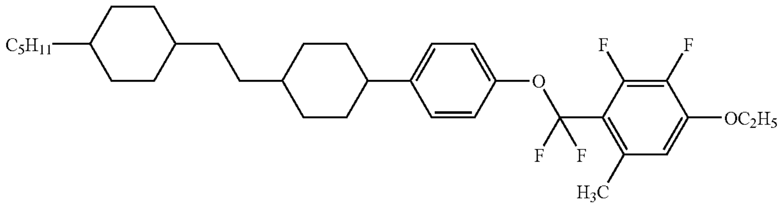
(1-6-3-9)
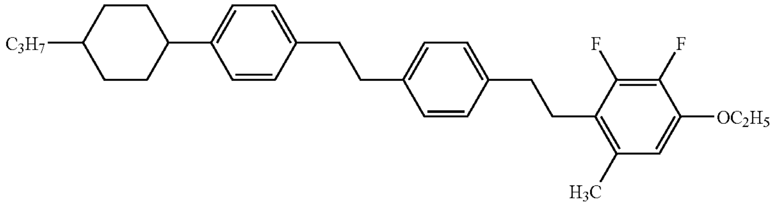
(1-6-3-10)
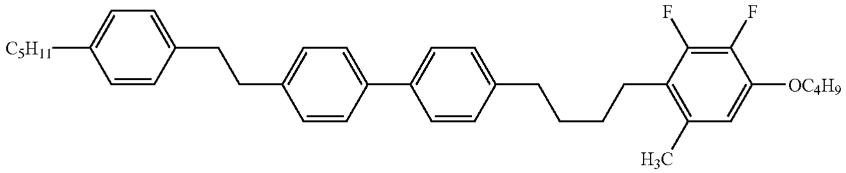
(1-6-3-11)
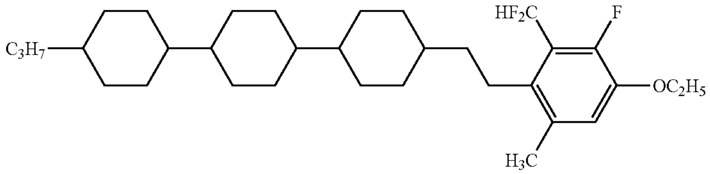
(1-6-3-12)
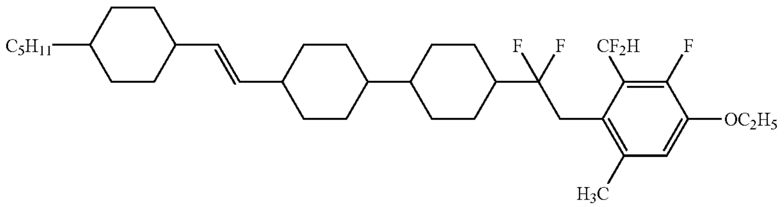

-continued
(1-6-3-13)
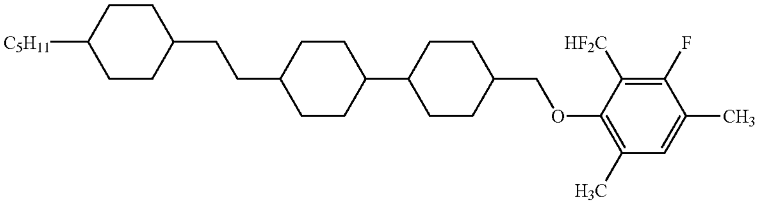
(1-6-3-14)
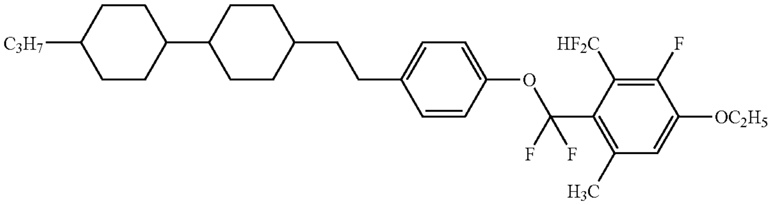
(1-6-3-15)
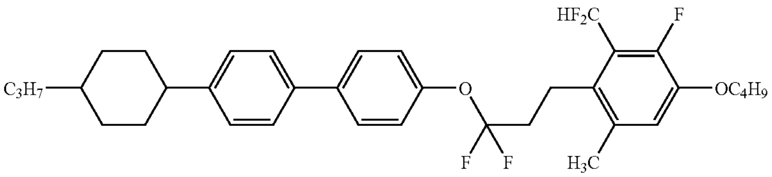
(1-6-3-16)
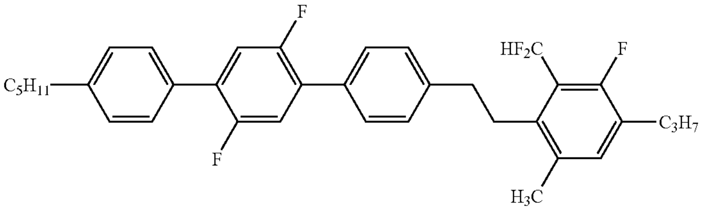
(1-6-3-17)
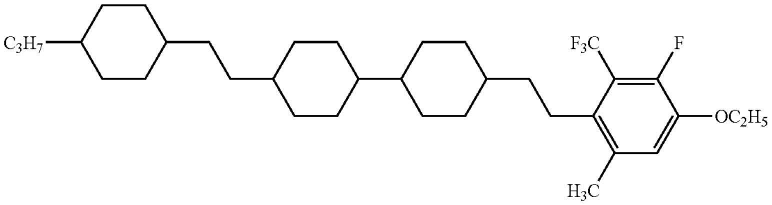
(1-6-3-18)
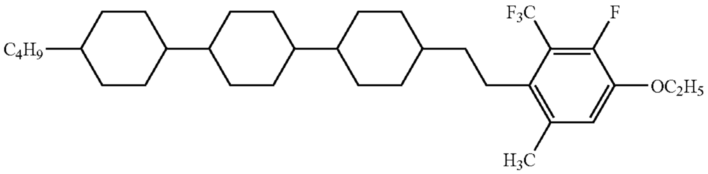
(1-6-3-19)
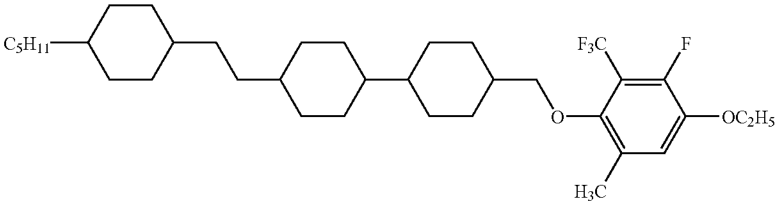
(1-6-3-20)
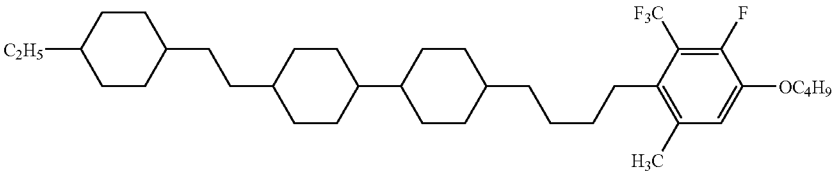

-continued
(1-6-3-21)
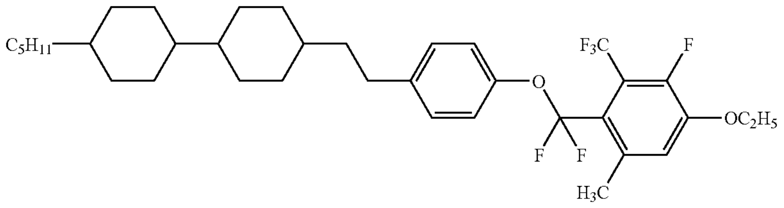
(1-6-3-22)
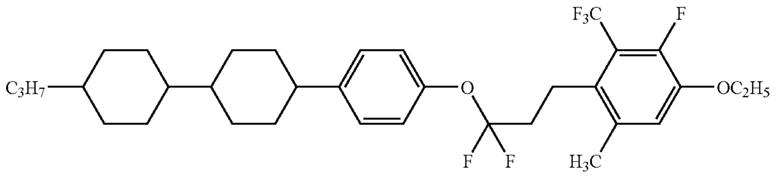
(1-6-3-23)
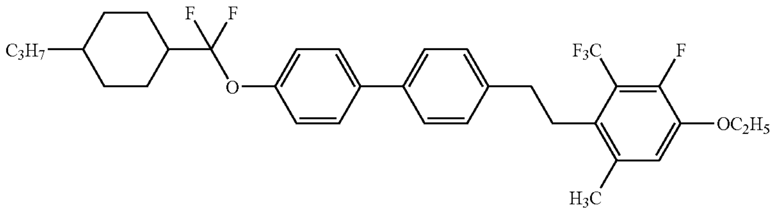
(1-6-3-24)
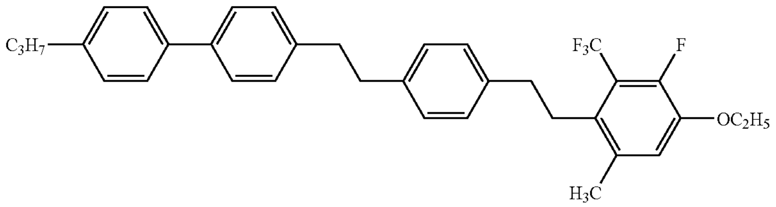
(1-6-3-25)
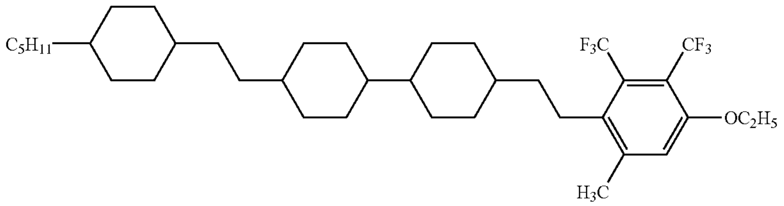
(1-6-3-26)
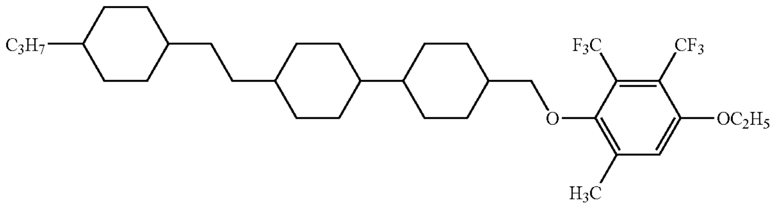
(1-6-3-27)
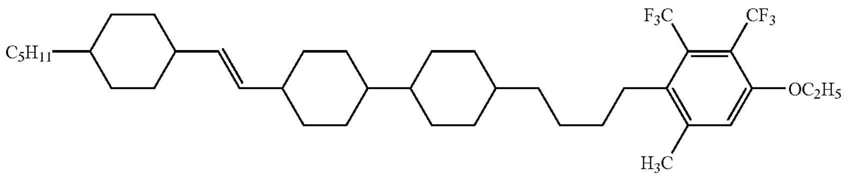

-continued (1-6-3-28)

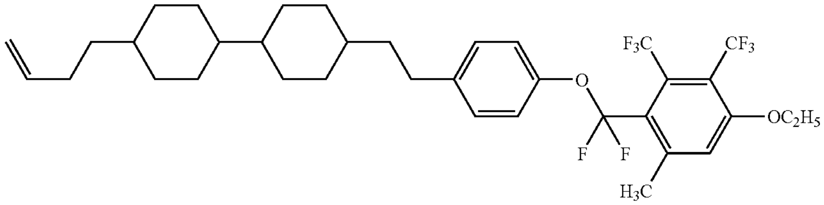

(1-6-3-29)

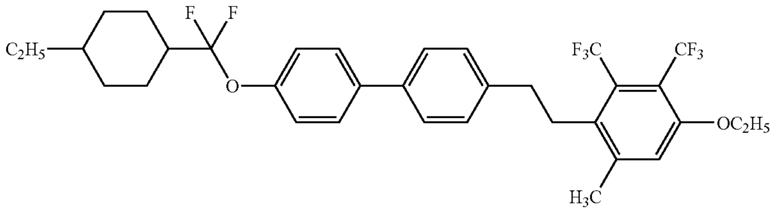

(1-6-3-30)

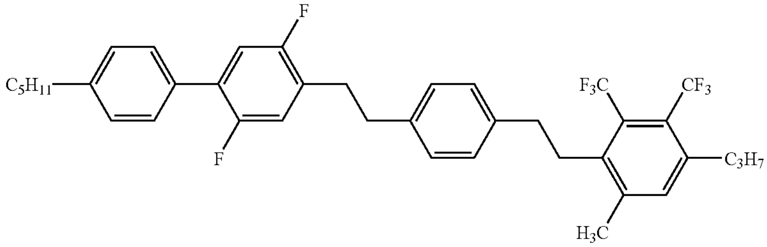

Example 15

Five compounds were mixed to prepare a composition A (mother liquid crystal B) having a nematic phase. The five compounds were 4-ethoxyphenyl 4-propylcyclohexanecarboxylate (17.2%), 4-butoxyphenyl 4-propylcyclohexanecarboxylate (27.6%), 4-ethoxyphenyl 4-propylcyclohexanecarboxylate (20.7%), 4-methoxyphenyl 4-pentylcyclohexanecarboxylate (20.7%) and 4-ethoxyphenyl 4-pentylcyclohexanecarboxylate (13.8%). The composition A had the following properties: an upper limit temperature (NI) of 74.0° C., a viscosity ($\eta_{20}$) of 18.9 mPa·s, an optical anisotropy (Δn) of 0.087 and a dielectric anisotropy (Δ∈) of −1.3.

A composition B containing 85% of the composition A and 15% of 1-ethoxy-2,3-difluoro-4-(2-(4-(4-propylcyclohexyl)cyclohexyl)ethyl)-5-methylbenzene (Compound 1-3-3-1) obtained in Example 3 was prepared. The composition B had the following properties: an optical anisotropy (Δn) of 0.088 and a dielectric anisotropy (Δ∈) of −1.93. It was found that by adding the compound 1-3-3-1, the dielectric anisotropy was negatively increased to have a low driving voltage upon fabricating a liquid crystal display device.

Example 16

A composition C containing 85% of the composition A prepared in Example 15 and 15% of 1-ethoxy-2,3-difluoro-4-(2-(4-(4-propylcyclohexyl)cyclohexyl)methoxy)-5-methylbenzene (Compound 1-3-3-5) obtained in Example 5 was prepared. The composition C had the following properties: an optical anisotropy (Δn) of 0.087 and a dielectric anisotropy (Δ∈) of −1.83. It was found that by adding the compound 1-3-3-5, the dielectric anisotropy was negatively increased to have a low driving voltage upon fabricating a liquid crystal display device.

Comparative Example 1

The properties of the compounds having a benzene ring having an alkyl group reported in Patent Document 1 (JP H10-291945) were compared to the properties of the compounds synthesized in Example 5 (Compound 1-3-3-5) and Example 6 (Compound 1-3-3-6), which were compounds analogous thereto. As a result, it was observed that the conventional compounds having a benzene ring having an alkyl group did not exhibit a liquid crystal phase, or even though it exhibited, the temperature range thereof was as extremely narrow (e.g., about 2.5° C.). On the other hand, the compounds of the invention exhibited a liquid crystal phase (nematic phase), and the temperature range thereof was as wide as about 60° C.

(1-3-3-5)

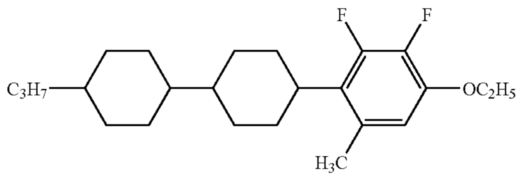

C 139.5 Iso (° C.)

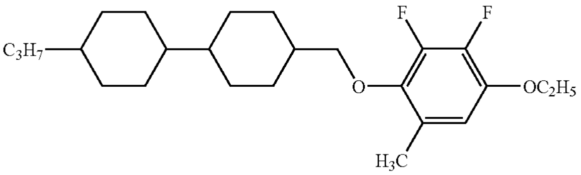

C1 33.0 C2 61.7 N 128.9 Iso (° C.)

-continued (1-3-3-6)

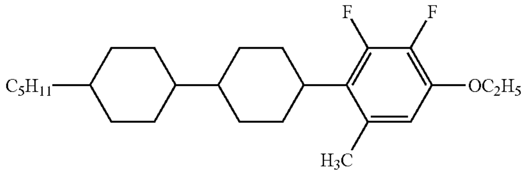

C 110.1 N 112.6 Iso (° C.)

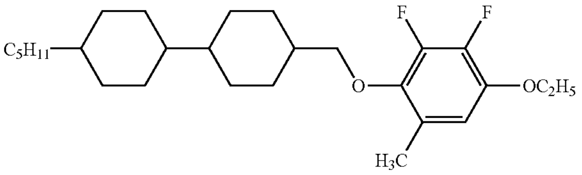

C 63.1 N 130.0 I (° C.)

Comparative Example 2

The properties of the compounds having a benzene ring having an alkyl group reported in Patent Document 1 (JP H10-291945) were compared to the properties of the compounds synthesized in Example 3 (Compound 1-3-3-1) and Example 4 (Compound 1-3-3-2), which were compounds analogous thereto. As a result, it was observed that the conventional compounds having a benzene ring having an alkyl group did not exhibit a liquid crystal phase, or even though it exhibited, the temperature range thereof was as extremely narrow (e.g., about 2.5° C.). On the other hand, the compounds of the invention exhibited a liquid crystal phase (nematic phase), and the temperature range thereof was as wide as about from 40 to 60° C.

(1-3-3-1)

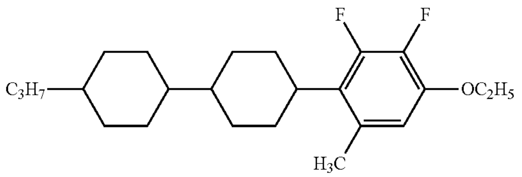

C 139.5 Iso (° C.)

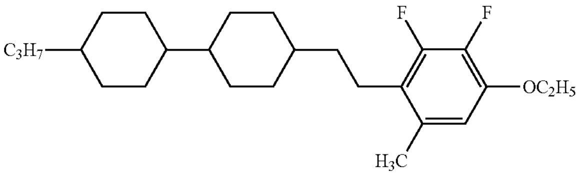

C1 68.6 C2 87.1 N 127.4 Iso (° C.)

(1-3-3-2)

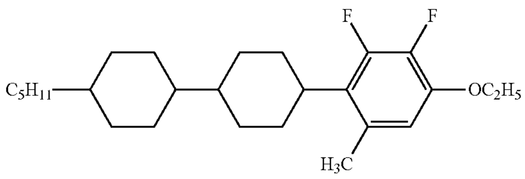

C 110.1 N 112.6 Iso (° C.)

-continued

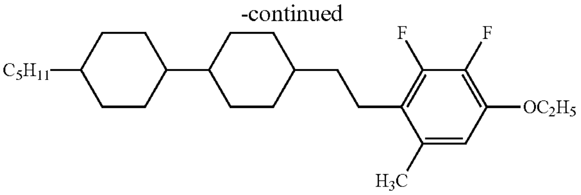

C 63.9 (SmB 63.3) N 131.8 Iso (° C.)

Comparative Example 3

The compounds having a benzene ring having an alkyl group reported in Patent Document 1 (JP H10-291945) were compared to the compounds synthesized in Example 5 (Compound 1-3-3-5) and Example 6 (Compound 1-3-3-6), which were compounds analogous thereto, in compatibility in the mother liquid crystal B at room temperature. As a result, it was observed that the conventional compounds having a benzene ring having an alkyl group were dissolved in the mother liquid crystal in only 5% or 10%. On the other hand, the compounds of the invention were dissolved in the mother liquid crystal in at least 15% to exhibit excellent compatibility.

(1-3-3-5)

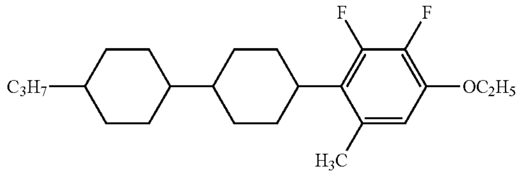

Solubility: 5%

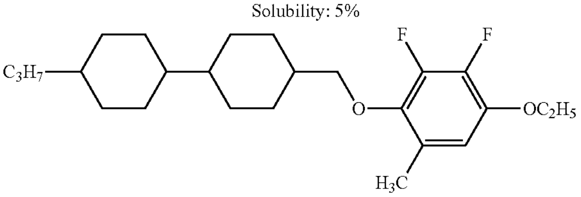

Solubility: >15%

(1-3-3-6)

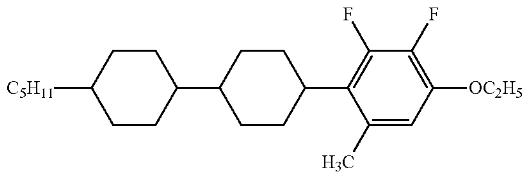

Solubility: 10%

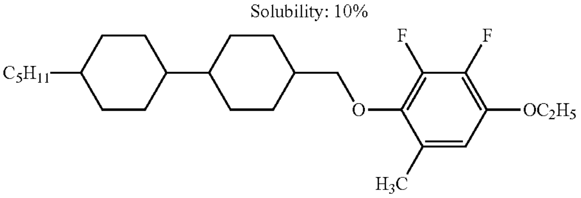

Solubility: >15%

Comparative Example 4

The compounds having a benzene ring having an alkyl group reported in Patent Document 1 (JP H10-291945) were compared to the compounds synthesized in Example 3 (Compound 1-3-3-1) and Example 4 (Compound 1-3-3-2), which were compounds analogous thereto, in compatibility in the mother liquid crystal B at room temperature. As a result, it was observed that the conventional compounds having a benzene ring having an alkyl group were dissolved in the mother liquid crystal in only 5% or 10%. On the other hand, the compounds of the invention were dissolved in the mother liquid crystal in at least 15% to exhibit excellent compatibility.

(1-3-3-1)

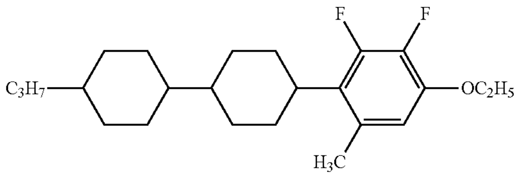

Solubility: 5%

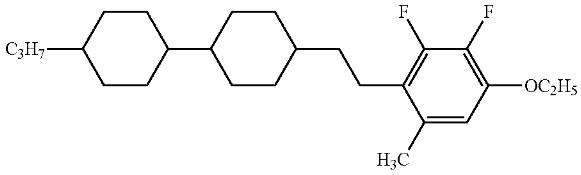

Solubility: >15%

(1-3-3-2)

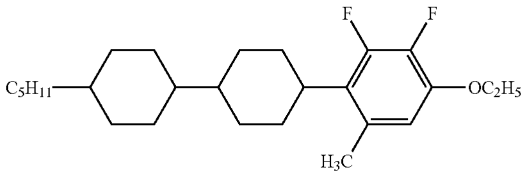

Solubility: 10%

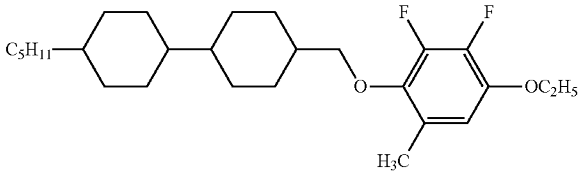

Solubility: >15%

What is claimed is:

1. A compound represented by the following formula (1):

(1)

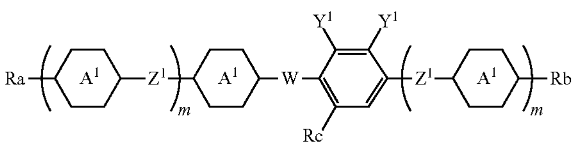

wherein Ra and Rb are independently alkyl having from 1 to 20 carbons, wherein arbitrary —$CH_2$— in the alkyl may be replaced by —O—, —S—, —CO— or —$SiH_2$—, arbitrary —$(CH_2)_2$— may be replaced by —CH═CH— or —C≡C—, and wherein arbitrary hydrogen may be replaced by halogen;

wherein ring $A^1$ is independently 1,4-cyclohexylene, 1,4-phenylene, pyridine-2,5-diyl, pyridazine-3,6-diyl, decahydronaphthalene-2,6-diyi, 1,2,3,4-tetrahydronaphthalene-2,6-diyl or naphthalene-2,6-diyl, wherein arbitrary —$CH_2$— in each of $A^1$ may be replaced by —O—, —S—, —CO— or —$SiH_2$—, and wherein arbitrary —$(CH_2)_2$— in each of $A^1$ may be replaced by —CH═CH—, and wherein arbitrary hydrogen in each of $A^1$ may be replaced by halogen, —$CF_3$, —$CHF_2$, —$CH_2F$, —$OCF_3$, —$OCHF_2$ or —$OCH_2F$;

wherein $Z^1$ is independently a single bond or alkylene having from 1 to 4 carbons, wherein arbitrary —$CH_2$— in the alkylene may be replaced by —O—, —S—, —CO— or —$SiH_2$—, wherein arbitrary —$(CH_2)_2$— in the alkylene may be replaced by —CH═CH— or and wherein arbitrary hydrogen may be replaced by halogen;

wherein W is alkylene having from 2 to 4 carbons, wherein arbitrary —$CH_2$— in the alkylene may be replaced by —O—, —S—, —CO— or —$SiH_2$—, wherein arbitrary —$(CH_2)_2$— in the alkylene may be replaced by —CH═CH— or —C≡C—, and wherein arbitrary hydrogen may be replaced by halogen;

wherein $Y^1$ is independently hydrogen, halogen, —CN, —$CF_3$, —$CHF_2$, —$CH_2F$, —$CF_3$, —$OCHF_2$ or —$OCH_2F$, but wherein at least one of $Y^1$ is chlorine, —$CF_3$, —$CHF_2$, —$CH_2F$, —$OCF_3$, —$OCHF_2$ or —$OCH_2F$;

wherein Rc is alkyl having from 1 to 4 carbons; and wherein m is independently 0, 1 or 2; but wherein the sum of plural numbers of m is 0, 1 or 2.

2. The compound according to claim 1, wherein in the formula (1), Ra and Rb are independently alkyl having from 1 to 20 carbons, alkoxy having from 1 to 19 carbons, alkoxyalkyl having from 2 to 19 carbons, alkenyl having from 2 to 20 carbons, polyfluoroalkyl having from 1 to 20 carbons or polyfluoroalkoxy having from 1 to 19 carbons;

wherein ring $A^1$ is independently 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-3,6-diyl;

wherein $Z^1$ is independently a single bond, —$(CH_2)_2$—, —COO—, —OCO—,—$CH_2O$—, —$OCH_2$—, —$CF_2O$—, —$OCF_2$—, —CH═CH—, —CF═CF—, —C≡C—, —$CH_2CO$—, —$COCH_2$—, —$CH_2SiH_2$—, —$SiH_2CH_2$—, —$(CH_2)_2COO$—, —$OCO(CH_2)_2$—, —$(CH_2)_2CF_2O$—, —$OCF_2(CH_2)_2$—, —$(CH_2)_3$—, —$O(CH_2)_3$— or —$(CH_2)_4$—; W is —COO—, —OCO—, —$CH_2$—, —$OCH_2$—, —CH═CH—, —CF═CF—, —C≡C—, —$CF_2O$—, —$OCF_2$—, —$(CH_2)_2COO$— . $OCO(CH_2)_2$—, —$(CH_2)_3$—, —$O(CH_2)_3$—, —$(CH_2)_2CF_2$—, —$OCF_2(CH_2)_2$— or —$(CH_4$—;

wherein $Y^1$ is independently hydrogen, fluorine, chlorine, —$CF_3$, —$CHF_2$, —$CH_2F$, —$OCF_3$, —$OCHF_2$ or —$OCH_2F$, but wherein at least one of $Y^1$ is chlorine, —$CF_3$, —$CHF_2$, —$CH_2F$, —$OCF_3$, —$OCHF_2$ or —$OCH_2F$; and wherein Rc is alkyl having from 2 to 4 carbons.

3. The compound according to claim 1, wherein in the formula (1), Ra and Rb are independently alkyl having from 1 to 20 carbons, alkoxy having from 1 to 19 carbons, alkoxyalkyl having from 2 to 19 carbons, alkenyl having from 2 to 20 carbons, polyfluoroalkyl having from 1 to 20 carbons or polyfluoroalkoxy having from 1 to 19 carbons;

wherein ring $A^1$ is independently 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-3,6—diyl;

wherein $Z^1$ is independently a single bond, $-(CH_2)_2-$, $-COO-$, $-OCO-$, $-CH_2O-$, $-OCH_2-$, $-CF_2O-$, $-OCF_2-$, $-CH{=}CH-$, $-CF{=}CF-$, $-C{\equiv}-$, $CH_2CO-$, $-COCH_2-$, $-CH_2SiH_2-$, $-SiH_2CH_2-$, $-(CH_2)_2COO-$, $-OCO-$, $(CH_2)_2-$, $-(CH_2)_2CF_2O-$, $-OCF_2(CH_2)_2-$, $-(CH_2)_3O-$, $-O(CH_2)_3-$ or $-(CH_2)_4-$; W is $-(CH_2-$;

wherein $Y^1$ is independently hydrogen, fluorine, chlorine, $-CF_3$, $-CHF_2$, $-CH_2F$, $-OCF_3$, $-OCHF_2$ or $-OCH_2F$, but wherein at least one of $Y^1$ is chlorine, $-CF_3$, $-CHF_2$, $-CH_2F$, $-OCF_3$, $-OCHF_2$ or $-OCH_2F$; and wherein Rc is alkyl having from 2 to 4 carbons.

4. The compound according to claim 1, wherein in the formula (1), Ra and Rb are independently alkyl having from 1 to 8 carbons, alkoxy having from 1 to 7 carbons, alkoxyalkyl having from 2 to 7 carbons or alkenyl having from 2 to 8 carbons;

wherein ring $A^1$ is independently 1,4-cyclohexylene, 1,4-phenylene, 2-fluoro-1,4-phenylene or 2,3-difluoro-1,4-phenylene;

wherein $Z^1$ is independently a single bond or $-(CH_2)_2-$;

wherein W is $-(CH_2)_4-$, $-CH_2O-$, $-OCH_2-$, $-CH{=}CH-$ or $-C{\equiv}C-C-$;

wherein $Y^1$ is independently hydrogen,, fluorine, $-CH_2F$ or $-CF_3$, but wherein at least one of $Y^1$ is $-CH_2F$ or $-CF_3$; and wherein Rc is $-CH_3$.

5. The compound according to claim 1, wherein in the formula (1), Ra and Rb is independently alkyl having from 1 to 8 carbons, alkoxy having from 1 to 7 carbons, alkoxyalkyl having from 2 to 7 carbons or alkenyl having from 2 to 8 carbons;

wherein ring $A^1$ is independently 1,4-cyclohexylene, 1,4-phenylene, 2-fluoro-1,4-phenylene or 2,3-difluoro-1,4-phenylene;

wherein $Z^1$ is independently a single bond or $-(CH_2)_2-$; W is $-(CH_2)_2-$;

wherein $Y^1$ is independently hydrogen, fluorine, $-CF_2H$ or $-CF_3$, but wherein at least one of $Y^1$ is $-CF_2H$ or $-CF_3$; and wherein Rc is $-CH_3$.

6. A compound represented by any one of the following formulae (1-1) to (1-6):

(1-1)

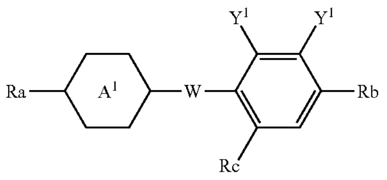

-continued (1-2)

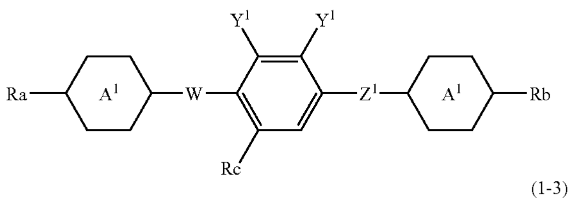

(1-3)

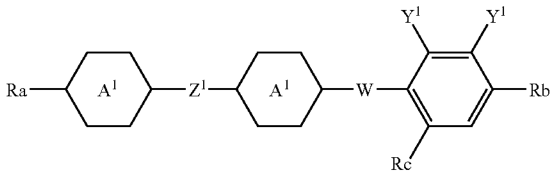

(1-4)

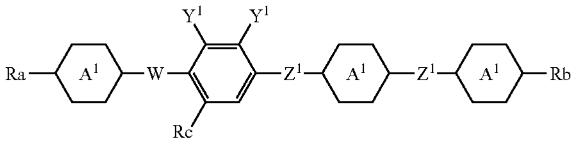

(1-5)

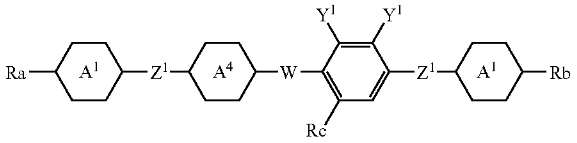

(1-6)

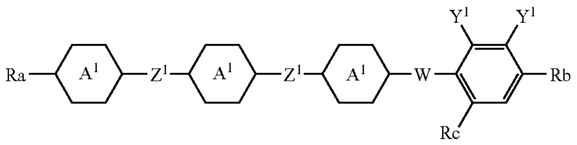

wherein Ra and Rb are independently alkyl having from 1 to 10 carbons, wherein arbitrary $-CH_2-$ in the alky may be replaced by $-O-$, wherein arbitrary $-(CH_2)_2-$ in the alky may be replaced by $-CH{=}CH-$ or $-C{\equiv}C-$, and wherein arbitrary hydrogen may be replaced by halogen;

wherein ring $A^1$ is independently 1,4-cyclohexylene, 1,4-phenylene, decahydronaphthalene-2,6-diyl, 1,2,3,4-tetrahydronaphthalene-2,6-diyl or naphthalene-2,6-diyl, wherein arbitrary $-CH_2-$ in each of $A^1$ may be replaced by $-O-$, and wherein arbitrary $-(CH_2)_2-$ in each of $A^1$ may be replaced by $-CH{=}CH-$, and wherein arbitrary hydrogen in each of $A^1$ may be replaced by halogen, $-CF_3$, $-CHF_2$ or $-CH_2F$;

wherein $Z^1$ is independently a single bond or alkylene having from 1 to 4 carbons, wherein arbitrary $-CH_2-$ in the alkylene may be replaced by $-O-$ or $-CO-$, wherein arbitrary $-(OH_2)_2-$ in the alkylene may be replaced by $-CH{=}CH-$or and wherein arbitrary hydrogen may be replaced by halogen;

wherein W is $-(CH_2)_2-$, $-COO-$, $-OCO-$, $-CH_2-$, $-OCH_2-$, $-CH{=}CH-$, $-CF{=}CF-$, $-C{\equiv}C-$, $-CF_2O-$, $-OCF_2-$, $-(CH_2)_2COO-$, $-OCO(CH_2)_2-$, $-(CH_2)_3O-$, $-O(CH_2)_3-$, $-(CH_2)_2CF_2O-$, $-OCF_2(CH_2)_2-$ or $-(CH_2)_4-$;

wherein $Y^1$ is independently hydrogen, halogen, $-CF_3$, $-CHF_2$ or $-CH_2F$, but wherein at least one of $Y^1$ is chlorine, $-CF_3$, $-CHF_2$ or $-CH_2F$; and wherein Rc is alkyl having from 1 to 4 carbons, wherein arbitrary —$CH_2$— in the alkyl may be replaced by —O—, and wherein arbitrary —$(CH_2)_2$— in the alkyl may be replaced by —CH═CH— or —C≡C—.

7. The compound according to claim 6, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons, polyfluoroalkyl having from 1 to 10 carbons or polyfluoroalkoxy having from 2 to 10 carbons;

wherein ring $A^1$ is independently 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene or 2,6-difluoro-1,4-phenylene;

wherein $Z^1$ is independently a single bond, —$(CH_2)_2$—, —COO—, —OCO—, —$CH_2$O—, —$OCH_2$—, —$CF_2$O—, —$OCF_2$—, —CH═CH—, —CF═CF—, —C≡C—, —$(C_2)_2$COO—, —OCO$(CH_2)_2$—, —$(CH_2)_2CF_2$O—, —$OCF_2(CH_2)_2$—, —$(CH_2)_3$O—, —O$(CH_2)_3$— or —$(CH_2)_4$—;

wherein W is —COO—, —OCO—, —$CH_2$O—, —$OCH_2$—, —CH═CH—, —CF═CF—, —C≡C—, —$CF_2$O—, —$OCF_2$—, —$(CH_2)_2C_2$COO—, —OCO$(CH_2)_2$—, —$(CH_2)_3$O—, —O$(CH_2)_3$—, —$(CH_2)_2CF_2$O—, —$OCF_2(CH_2)_2$— or —$(CH_2)_4$—;

wherein $Y^1$ is independently hydrogen, fluorine, chlorine, —$CF_3$, —$CHF_2$ or —$CH_2$F, but wherein at least one of $Y^1$ is chlorine, —$CF_3$, —$CHF_2$ or —$CH_2$F; and wherein Rc is alkyl having from 1 to 4 carbons, alkoxy having from 2 to 4 carbons, alkoxyalkyl having from 2 to 4 carbons or alkenyl having from 2 to 4 carbons.

8. The compound according to claim 6, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons, polyfluoroalkyl having from 1 to 10 carbons or polyfluoroalkoxy having from 2 to 10 carbons;

wherein ring $A^1$ is independently 1,4-cyclohexylene, 1,3-dioxane-2,5-diyl, 1,4-phenylene, 2-fluoro-1,4-phenylene, 2, 3— difluoro-1,4-phenylene, 2,5-difluoro-1,4-phenylene or 2,6-difluoro-1,4-phenylene;

wherein $Z^1$ is independently a single bond, —$(CH_2)_2$—, —COO—, —OCO—, —$CH_2$O—, —$OCH_2$—, —$CF_2$O—, —$OCF_2$—, —CH═CH—, —CF═CF—, —C≡C—, $(CH_2)_2$COO—, —OCO$(CH_2)_2$—, —$(CH_2)_2$ $CF_2$O—, —$OCF_2(CH_2)_2$—, —$(CH_2)_3$O—, —O$(CH_2)_3$— or —$(CH_2)_4$—; W is —$(CH_2)_2$—;

wherein $Y^1$ is independently hydrogen, fluorine, chlorine, —$CF_3$, —$CHF_2$ or —$CH_2$F, but wherein at least one of $Y^1$ is chlorine, —$CF_3$, —$CHF_2$ or —$CH_2$F; and and wherein Rc is alkyl having from 1 to 4 carbons, alkoxy having from 2 to 4 carbons, alkoxyalkyl having from 2 to 4 carbons or alkenyl having from 2 to 4 carbons.

9. The compound according to claim 7, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons, —$CH_2$F or —$OCH_2$F;

wherein ring $A^1$ is independently 1,4-cyclohexylene, 1,4-phenylene, 2-fluoro-1,4-phenylene, 2,3-difluoro-1,4-phenylene, 2,5-difluoro-1,4-phenylene or 2,6-difluoro-1,4-phenylene;

wherein $Z^1$ is independently a single bond, —$(CH_2)_2$—, —COO—, —OCO—, —$CH_2$O—, —$OCH_2$—, —$CF_2$O—, —$OCF_2$—, —CH═CH— or —CC—; W is —COO—, —OCO—, —$CH_2$O—, —$OCH_2$—, —CH═CH—, —CF═CF—, —C≡C—, —$(CH_2)_2$ COO —, —OCO$(CH_2)_2$—, —$(CH_2)_3$O—, —O$(CH_2)_3$— or —$(CH_2)_4$—;

wherein $Y^1$ is independently fluorine, chlorine, —$CF_3$ or —$CHF_2$, but wherein at least one of $Y^1$ is chlorine, —$CF_3$ or —$CHF_2$; and wherein Rc is alkyl having from 1 to 4 carbons.

10. The compound according to claim 7, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons;

wherein ring $A^1$ is independently 1,4-cyclohexylene, 1,4-phenylene, 2-fluoro-1,4-phenylene or 2,3-difluoro-1,4-phenylene;

wherein $Z^1$ is independently a single bond or —$(CH_2)_2$—; W is —$(CH_2)_4$—, —$CH_2$O—, —$OCH_2$—, —CH═CH— or —C≡C—;

wherein $Y^1$ is independently fluorine, hydrogen, —$CF_2$H or —$CF_3$, but wherein at least one of $Y^1$ is —$CF_2$H or —$CF_3$; and wherein Rc is —$CH_3$.

11. The compound according to claim 7, wherein in the formulae (1-1) to (1-6), W is —$CH_2$O—; and wherein $Y^1$ is independently —$CF_3$ or —$CF_2$H.

12. The compound according to claim 8, wherein in the formulae (1-1) to (1-6), Ra and Rb are independently alkyl having from 1 to 10 carbons, alkoxy having from 1 to 9 carbons, alkoxyalkyl having from 2 to 9 carbons, alkenyl having from 2 to 10 carbons, —$CH_2$F or —$OCH_2$F;

wherein ring $A^1$ is independently 1,4-cyclohexylene, 1,4-phenylene, 2-fluoro-1,4-phenylene, 2,3-difluoro-1,4-phenylene, 2,5-difluoro-1,4-phenylene or 2,6-difluoro-1,4-phenylene;

wherein $Z^1$ is independently a single bond, —$(CH_2)_2$—, —COO—, —OCO—, —$CH_2$O—, —$OCH_2$—,, —$CF_2$O—, —$OCF_2$—, —CH═CH— or —C≡C—; wherein $Y^1$ is independently fluorine, chlorine, —$CF_3$ or —$CHF_2$, but wherein at least one of $Y^1$ is chlorine, —$CF_3$ or —$CHF_2$; and wherein Rc is alkyl.

13. The compound according to claim 8, wherein in the formulae (1-1) to (1-6), Ra and Rb are independently alkyl having from 1 to 8 carbons, alkoxy having from 1 to 7 carbons, alkoxyalkyl having from 2 to 7 carbons or alkenyl having from 2 to 8 carbons;

wherein ring $A^1$ is independently 1,4-cyclohexylene, 1,4-phenylene, 2-fluoro-1,4-phenylene or 2,3-difluoro-1,4-phenylene;

wherein $Z^1$ is independently a single bond or —$(CH_2)_2$—;

wherein $Y^1$ is independently hydrogen, fluorine or —$CF_3$, but wherein at least one of $Y^1$ is —$CF_3$; and wherein Rc is $CH_3$.

14. A compound represented by any one of the following formulae (I) to (IX):

(I)

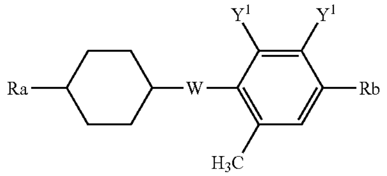

-continued (II)

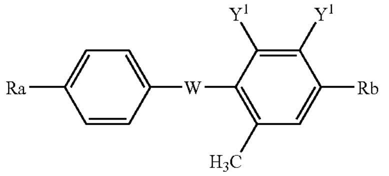

(III)

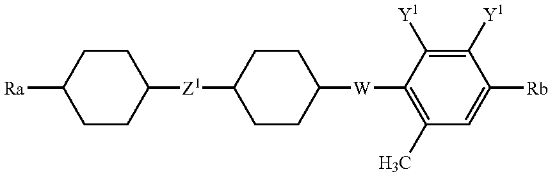

(IV)

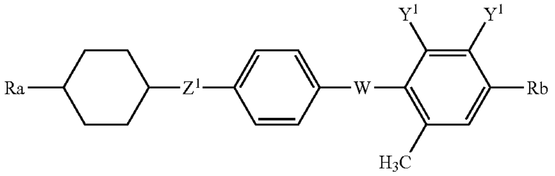

(V)

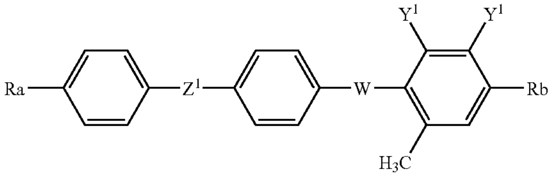

(VI)

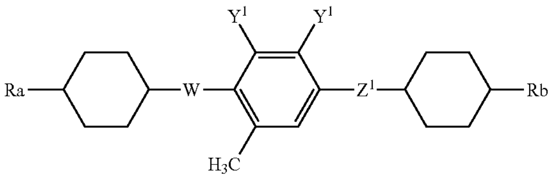

(VII)

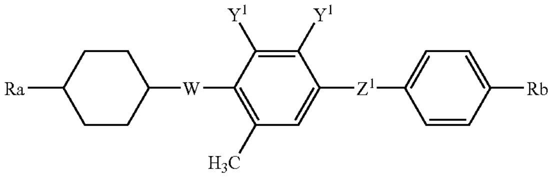

(VIII)

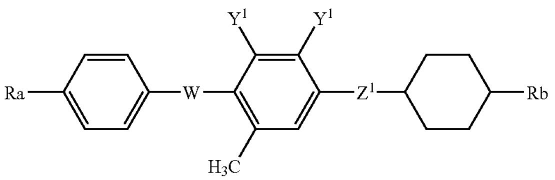

(IX)

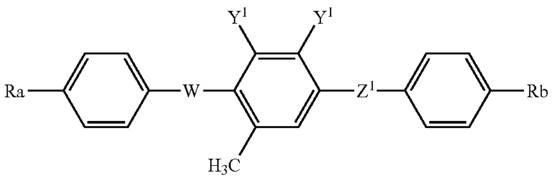

wherein Ra and Rb are independently alkyl having from 1 to 10 carbons, wherein arbitrary $—CH_2—$ in the alkyl may be replaced by —O—, and wherein arbitrary $—(CH_2)_2—$ in the alkyl may be replaced by —CH═CH—;

wherein $Z^1$ is independently a single bond, $—(CH_2)_2—$, —COO—, —OCO—, $—CH_2O—$, $—OCH_2—$, $—CF_2O—$, $—OCF_2—$, —CH═CH—, —CF═CF—, —C≡C—, $—(CH_2)_2COO—$, $—OCO(CH_2)_2—$, $—(CH_2)_2CF_2O—$, $—(CH_2)_3O—$, $—O(CH_2)_3—$ or $—(CH_2)_4—$;

wherein W is $—(CH_2)_2—$, $—(CH_2)_4—$, $—CH_2O—$, $—OCH_2—$, —CH═CH— or —C≡C—; and wherein $Y^1$ is independently hydrogen, fluorine, chlorine, $—CF_3$ or $—CF_2H$, but wherein at least one of $Y^1$ is chlorine, $—CF_3$, or $—CF_2H$.

15. The compound according to claim 14, wherein in the formulae (I) to (IX), Ra and Rb are independently alkyl having from 1 to 10 carbons, alkoxy having from 1 to 9 carbons or alkenyl having from 2 to 10 carbons;

wherein $Z^1$ is independently a single bond, $—(CH_2)_2—$, —CH═CH— or $—(CH_2)_4—$;

wherein W is $—CH_2O—$ or —CH═CH—; and wherein $Y^1$ is independently hydrogen, fluorine, chlorine, $—CF_3$, or $—CHF_2$, but wherein at least one of $Y^1$ is chlorine, $—CF_3$, or $—CHF_2$.

16. The compound according to claim 14, wherein in the formulae (I) to (IX), Ra and Rb are independently alkyl having from 1 to 10 carbons, alkoxy having from 1 to 9 carbons or alkenyl having from 2 to 10 carbons;

wherein $Z^1$ is independently a single bond, $—(CH_2)_2—$, —CH═CH— or $—(CH_2)_4—$;

wherein W is $—(CH_2)_2—$; and wherein $Y^1$ are independently hydrogen, fluorine, $—CF_3$ or $—CF_2H$, but wherein at least one of $Y^1$ is $—CF_3$ or $—CF_2H$.

17. The compound according to claim 15, wherein in the formulae (I) to (IX), $Z^1$ is independently a single bond or —CH═CH—;

wherein W is $—CH_2O—$; and wherein $Y^1$ is independently hydrogen, fluorine or $—CF_3$, but wherein at least one of $Y^1$ is $—CF_3$.

18. The compound according to claim 15, wherein in the formulae (I) to (IX), $Z^1$ is a single bond; and wherein $Y^1$ is independently fluorine or $—CF_3$, but wherein at least one of $Y^1$ is $—CF_3$.

19. The compound according to claim 15, wherein in the formulae (I) to (IX), $Z^1$ is a single bond; and wherein each $Y^1$ is $—CF_3$.

20. A liquid crystal composition comprising at least one compound according to claim 1.

21. The liquid crystal composition according to claim 20, wherein the liquid crystal composition further comprises at least one compound represented by formulae (2), (3) and (4):

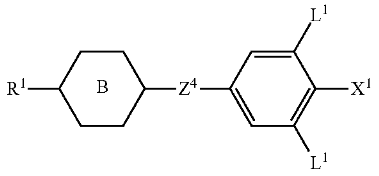

(2)

-continued (3)

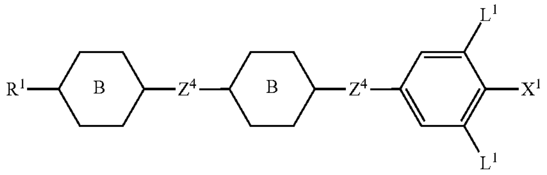

(4)

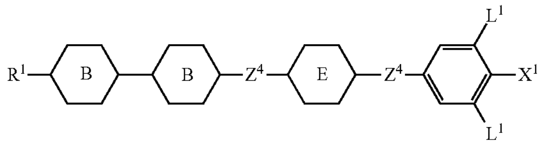

wherein $R^1$ is alkyl having from 1 to 10 carbons, wherein arbitrary $—CH_2—$ in the alkyl may be replaced by —O— or —CH═CH—, and wherein arbitrary hydrogen may be replaced by fluorine;

wherein $X^1$ is fluorine, chlorine, $—OCF_3$, $—OCHF_2$, $—CF_3$, $—CHF_2$, $—CH_2F$, $—OCF_2CHF_2$ or $—OCF_2CHFCF_3$;

wherein ring B is independently 1,4-cyclohexylene, 1,3-dioxane-2,5-diyl or 1,4-phenylene, wherein arbitrary hydrogen of ring B may be replaced by fluorine;

wherein ring E is 1,4-cyclohexylene or 1,4-phenylene, wherein arbitrary hydrogen of ring E may be replaced by fluorine;

wherein $Z^4$ is independently $—(CH_2)_2—$, $—(CH_2)_4—$, —COO—, $—CF_2O—$, $—OCF_2—$, —CH═CH— or a single bond; and wherein $L^1$ is independently hydrogen or fluorine.

22. The liquid crystal composition according to claim 20, wherein the liquid crystal composition further comprises at least one compound represented by formulae (5) and (6):

(5)

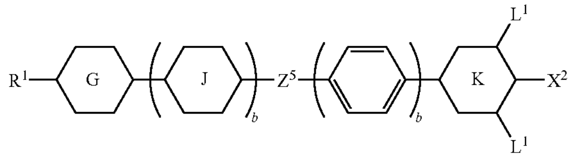

(6)

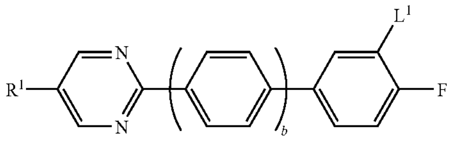

wherein $R^1$ is alkyl having from 1 to 10 carbons, wherein arbitrary $—CH_2—$ in the alkyl may be replaced by —O— or —CH═CH—, and wherein arbitrary hydrogen may be replaced by fluorine;

wherein $X^2$ is —CN or —C≡C—CN;

wherein ring G is 1,4-cyclohexylene, 1,4-phenylene, 1,3-dioxane-2,5-diyl or pyrimidine-2,5-diyl;

wherein ring J is 1,4-cyclohexylene, pyrimidine-2,5-diyl or 1,4-phenylene, wherein arbitrary hydrogen of ring J may be replaced by fluorine;

wherein ring K is 1,4-cyclohexylene or 1,4-phenylene; $Z^5$ is $—(CH_2)_2—$, —COO—, $—CF_2O—$, $—OCF_2—$ or a single bond;

wherein $L^1$ is independently hydrogen or fluorine; and wherein b is independently 0 or 1.

23. The liquid crystal composition according to claim 20, wherein the liquid crystal composition further comprises at least one compound represented by formulae (7), (8), (9), (10) and (11):

(7)

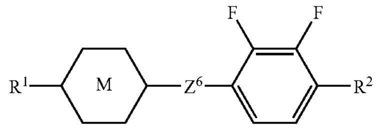

(8)

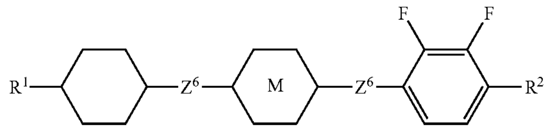

(9)

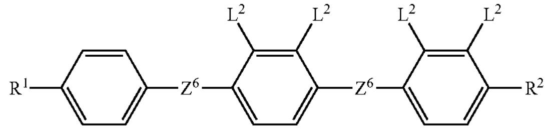

(10)

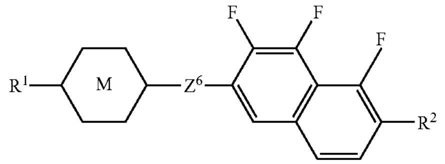

(11)

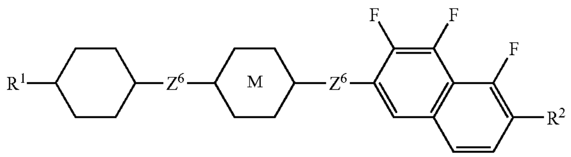

wherein $R^1$ is alkyl having from 1 to 10 carbons, wherein arbitrary $—CH_2—$ in the alkyl may be replaced by —O— or —CH═CH—, and wherein arbitrary hydrogen may be replaced by fluorine;

wherein $R^2$ is fluorine or alkyl having from 1 to 10 carbons, wherein arbitrary $—CH_2—$ in the alkyl may be replaced by —O— or —CH═CH—, and wherein arbitrary hydrogen may be replaced by fluorine;

wherein ring M is independently 1,4-cyclohexylene, 1,4-phenylene or decahydro-2,6-naphthalene;

wherein $Z^6$ is independently $—(CH_2)_2—$, —COO— or a single bond; and wherein $L^2$ is independently hydrogen or fluorine, but wherein at least one of $L^2$ is fluorine.

24. The liquid crystal composition according to claim 20, wherein the liquid crystal composition further comprises at least one compound represented by formulae (12), (13) and (14):

(12)

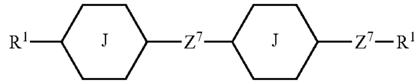

-continued (13)

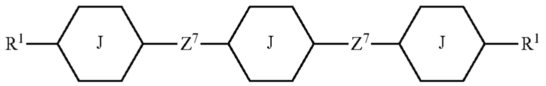

(14)

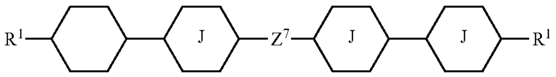

wherein $R^1$ is alkyl having from 1 to 10 carbons, wherein arbitrary $—CH_2—$ in the alkyl may be replaced by —O— or —CH═CH—, and wherein arbitrary hydrogen may be replaced by fluorine;

wherein ring J is independently 1,4-cyclohexylene, pyrimidine-2,5-diyl or 1,4-phenylene, wherein arbitrary hydrogen of ring J may be replaced by fluorine; and wherein $Z^7$ is independently —C≡C—, —COO—, $—(CH_2)_2—$, —CH═CH— or a single bond.

25. The liquid crystal composition according to claim 21, wherein the liquid crystal composition further comprises at least one compound represented by formulae (5) and (6):

(5)

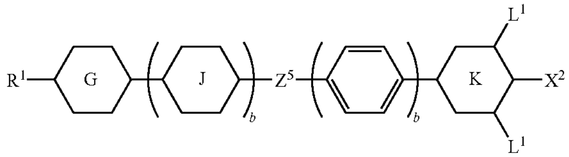

(6)

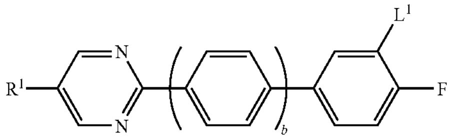

wherein $R^1$ is alkyl having from 1 to 10 carbons, wherein arbitrary $—CH_2—$ in the alkyl may be replaced by —O— or —CH═CH—, and wherein arbitrary hydrogen may be replaced by fluorine;

wherein $X^2$ is —CN or —C≡C—CN;

wherein ring G is 1,4-cyclohexylene, 1,4-phenylene, 1,3-dioxane-2,5-diyi or pyrimidine -2,5-diyl;

wherein ring J is 1,4-cyclohexylene, pyrimidine-2,5-diyl or 1,4-phenylene, wherein arbitrary hydrogen of ring J may be replaced by fluorine;

wherein ring K is 1,4-cyclohexylene or 1,4-phenylene; $Z^5$ is $—(CH_2)_2—$, —COO—, $—CF_2O—$, $—OCF_2—$ or a single bond;

wherein $L^1$ is independently hydrogen or fluorine; and wherein b is independently 0 or 1.

26. The liquid crystal composition according to claim 21, wherein the liquid crystal composition further comprises at least one compound represented by formulae (12), (13) and (14):

(12)

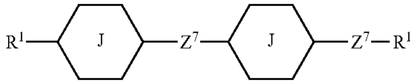

-continued (13)

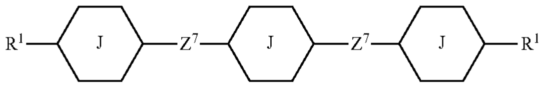

(14)

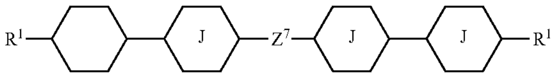

wherein $R^1$ is alkyl having from 1 to 10 carbons, wherein arbitrary $—CH_2—$ in the alkyl may be replaced by —O— or —CH═CH—, and wherein arbitrary hydrogen may be replaced by fluorine;

wherein ring J is independently 1,4-cyclohexylene, pyrimidine-2,5-diyl or 1,4-phenylene, wherein arbitrary hydrogen of ring J may be replaced by fluorine; and wherein $Z^7$ is independently —C≡C—, —COO—, $—(CH_2)_2—$, —CH═CH— or a single bond.

27. The liquid crystal composition according to claim 22, wherein the liquid crystal composition further comprises at least one compound represented by formulae (12), (13) and (14):

(12)

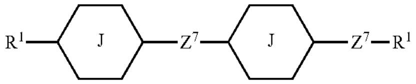

(13)

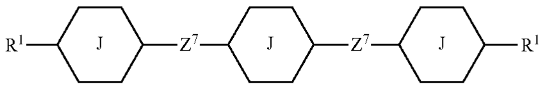

(14)

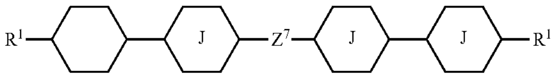

wherein $R^1$ is alkyl having from 1 to 10 carbons, wherein arbitrary $—CH_2—$ in the alkyl may be replaced by —O— or —CH═CH—, and wherein arbitrary hydrogen may be replaced by fluorine;

wherein ring J is independently 1,4-cyclohexylene, pyrimidine-2,5-diyl or 1,4-phenylene, wherein arbitrary hydrogen of ring J may be replaced by fluorine; and wherein $Z^7$ is independently —C≡C—, —COO—, $—(CH_2)_2—$, —CH═CH— or a single bond.

28. The liquid crystal composition according to claim 23, wherein the liquid crystal composition further comprises at least one compound represented by formulae (12), (13) and (14):

(12)

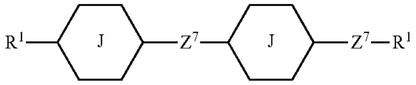

(13)

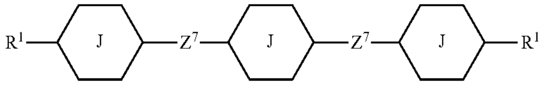

-continued (14)

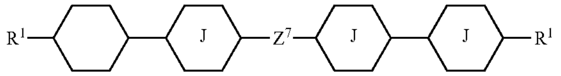

wherein $R^1$ is alkyl having from 1 to 10 carbons, wherein arbitrary —$CH_2$— in the alkyl may be replaced by —O— or —CH═CH—, and wherein arbitrary hydrogen may be replaced by fluorine;

wherein ring J is independently 1,4-cyclohexylene, pyrimidine-2,5-diyl or 1,4-phenylene, wherein arbitrary hydrogen of ring J may be replaced by fluorine; and wherein $Z^7$ is independently —C≡C—, —COO—, —$(CH_2)_2$—, —CH═CH— or a single bond.

29. The liquid crystal composition according to claim 20, wherein the liquid crystal composition further comprises at least one optically active compound.

30. A liquid crystal display device comprising at least one liquid crystal composition according to claim 20.

* * * * *